(12) United States Patent
Chapman, Jr.

(10) Patent No.: US 10,947,867 B2
(45) Date of Patent: Mar. 16, 2021

(54) LIGHTWEIGHT GEARDRIVE SYSTEMS

(71) Applicant: William Cullen Chapman, Jr., Ogden, UT (US)

(72) Inventor: William Cullen Chapman, Jr., Ogden, UT (US)

(*) Notice: Subject to any disclaimer, the term of this patent is extended or adjusted under 35 U.S.C. 154(b) by 0 days.

(21) Appl. No.: 16/566,586

(22) Filed: Sep. 10, 2019

(65) Prior Publication Data

US 2020/0003083 A1 Jan. 2, 2020

Related U.S. Application Data

(63) Continuation-in-part of application No. 16/331,932, filed as application No. PCT/US2017/050674 on Sep. 8, 2017, now Pat. No. 10,738,661, which is a continuation of application No. 15/261,667, filed on Sep. 9, 2016, now Pat. No. 9,759,098.

(60) Provisional application No. 62/729,277, filed on Sep. 10, 2018.

(51) Int. Cl.
| | |
|---|---|
| *F01L 1/02* | (2006.01) |
| *F01L 1/053* | (2006.01) |
| *F01M 9/10* | (2006.01) |
| *F01M 11/02* | (2006.01) |

(52) U.S. Cl.
CPC ............. *F01L 1/026* (2013.01); *F01L 1/053* (2013.01); *F01M 9/105* (2013.01); *F01M 9/106* (2013.01); *F01M 11/02* (2013.01); *F01L 2301/00* (2020.05); *F01L 2303/00* (2020.05); *F01L 2810/02* (2013.01)

(58) Field of Classification Search
CPC ....... F01L 1/026; F01L 1/053; F01L 2301/00; F01L 2303/00; F01L 2810/02; F01L 2250/02; F01M 9/105; F01M 9/106; F01M 11/02; F16N 7/00; F16N 2210/12
See application file for complete search history.

(56) References Cited

U.S. PATENT DOCUMENTS

2015/0258642 A1* 9/2015 Killian ................ B23K 20/127
29/893.34

* cited by examiner

*Primary Examiner* — Zelalem Eshete
(74) *Attorney, Agent, or Firm* — Knobbe, Martens, Olson & Bear, LLP

(57) ABSTRACT

An improved, lightweight gear drive having a rim gear mounted on a shaft, the shaft formed of one or more shaft segments, each of the shaft segments supporting a segregated arc. The segregated arcs forming a circumferential portion of a bearing surface of the shaft.

24 Claims, 45 Drawing Sheets

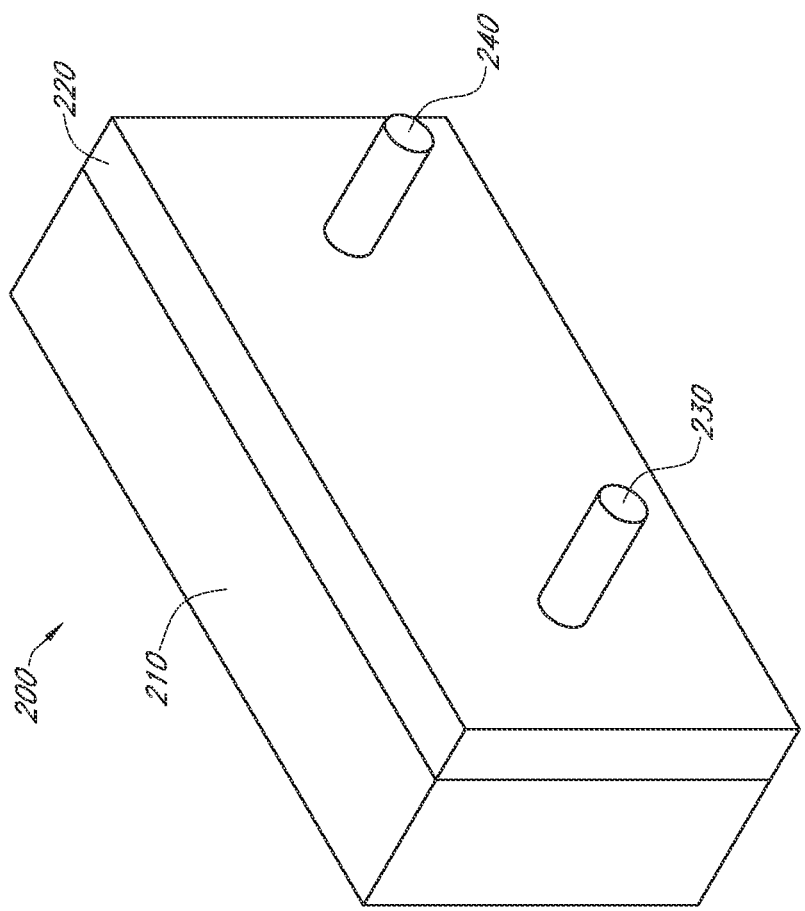

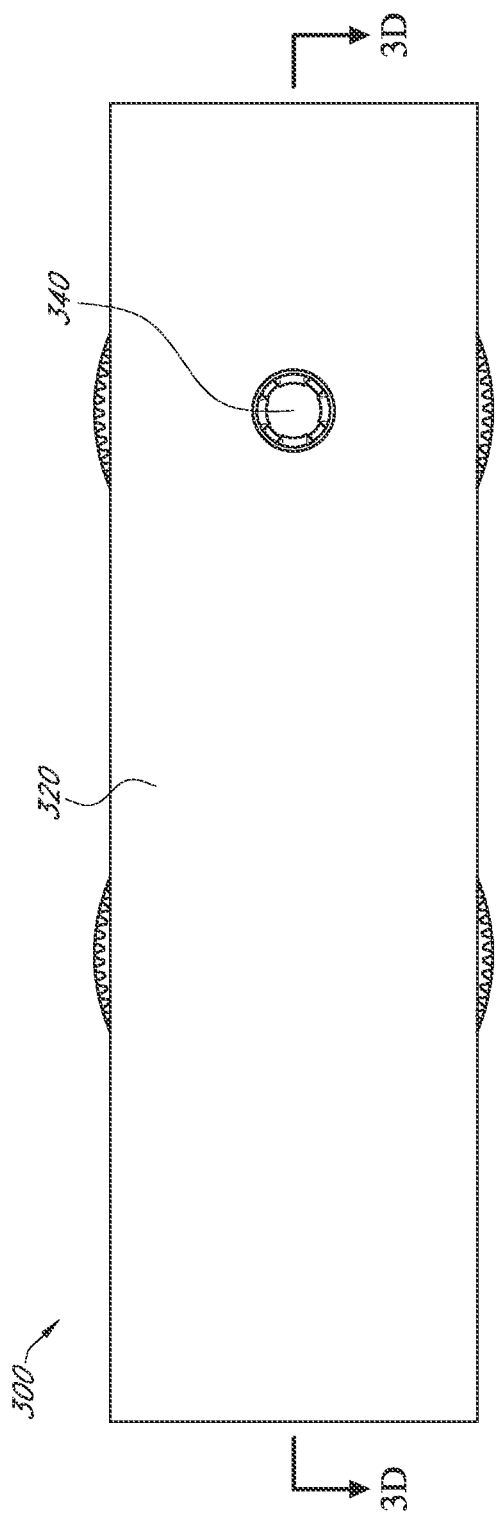

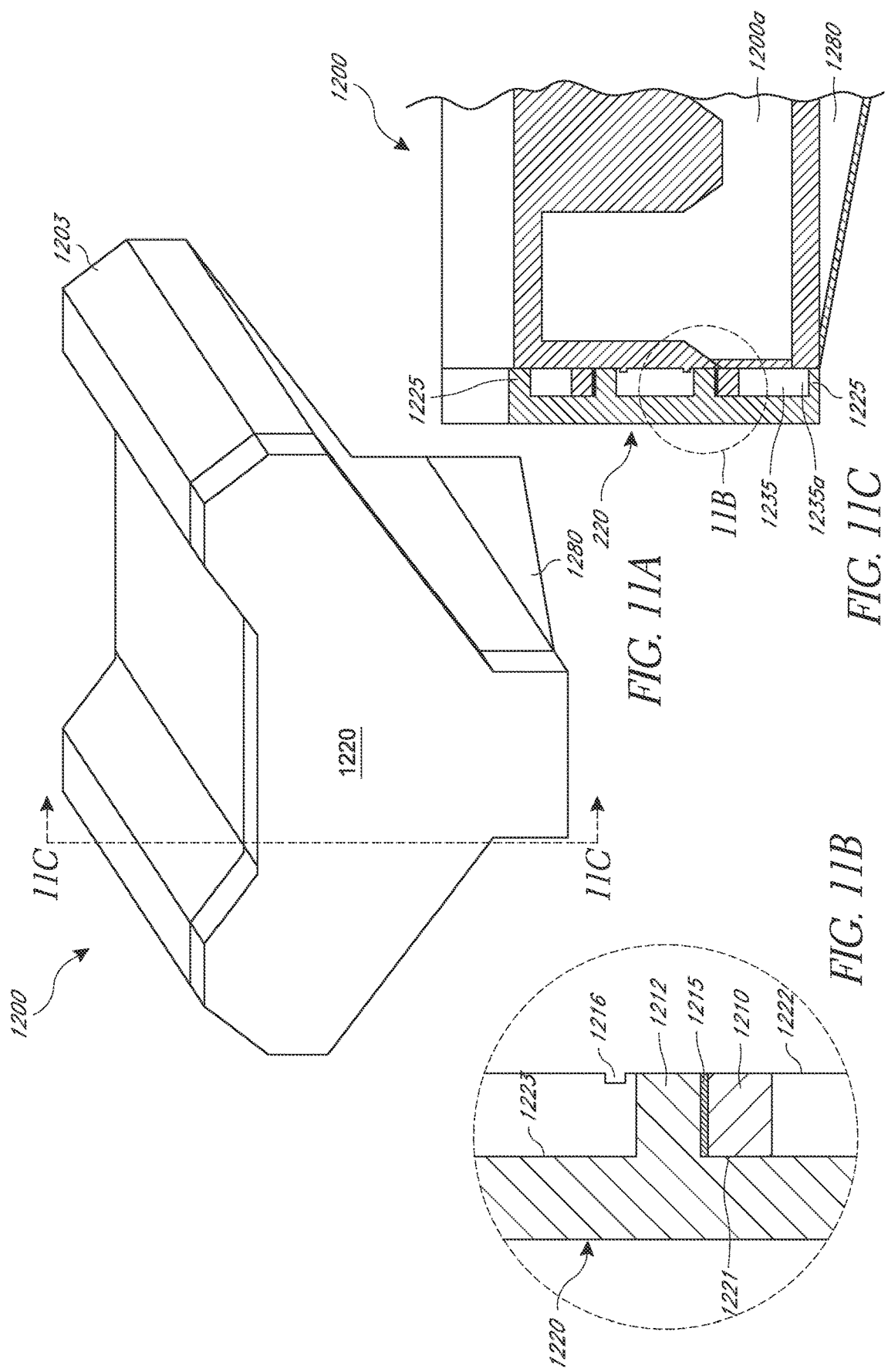

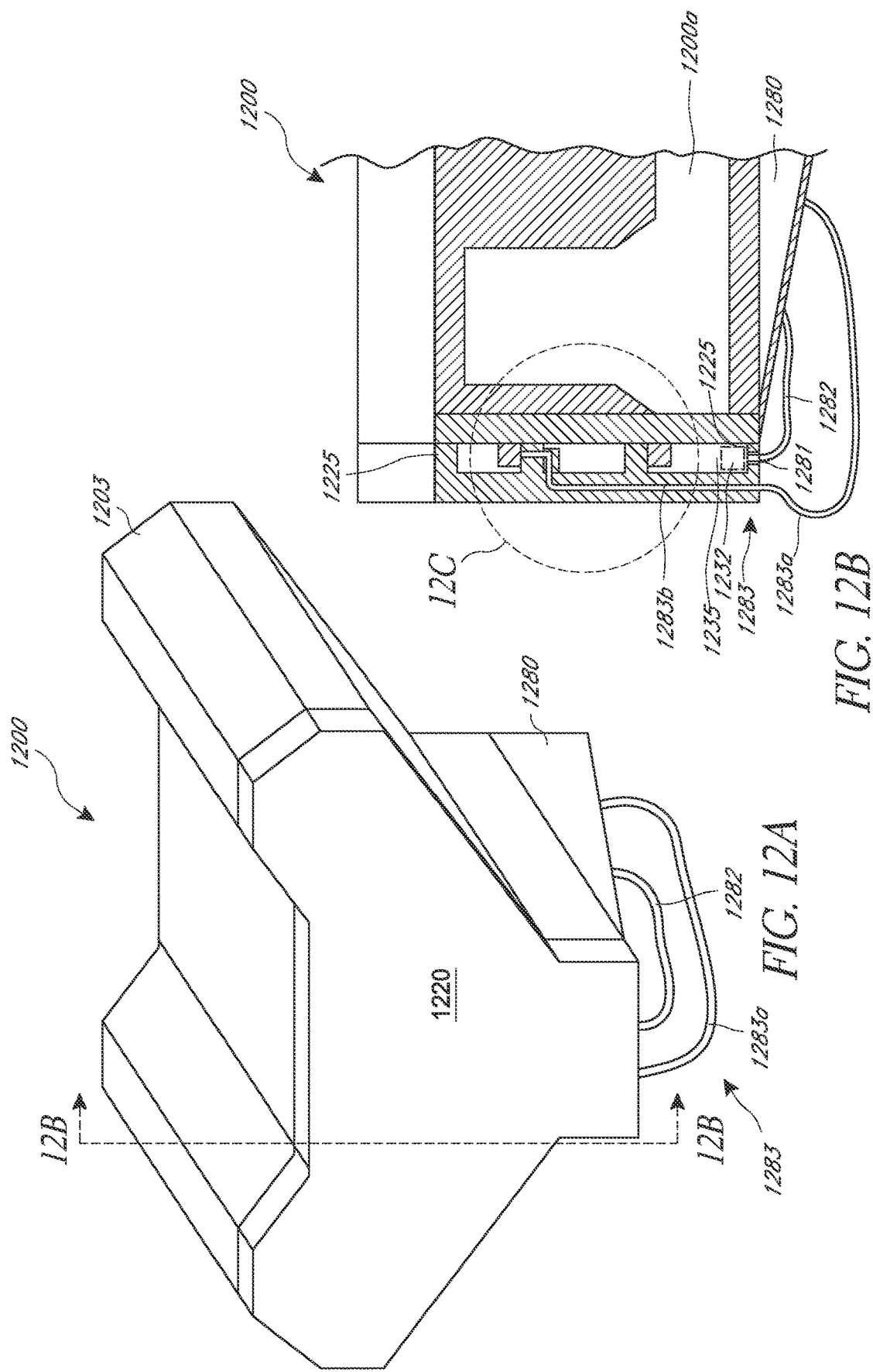

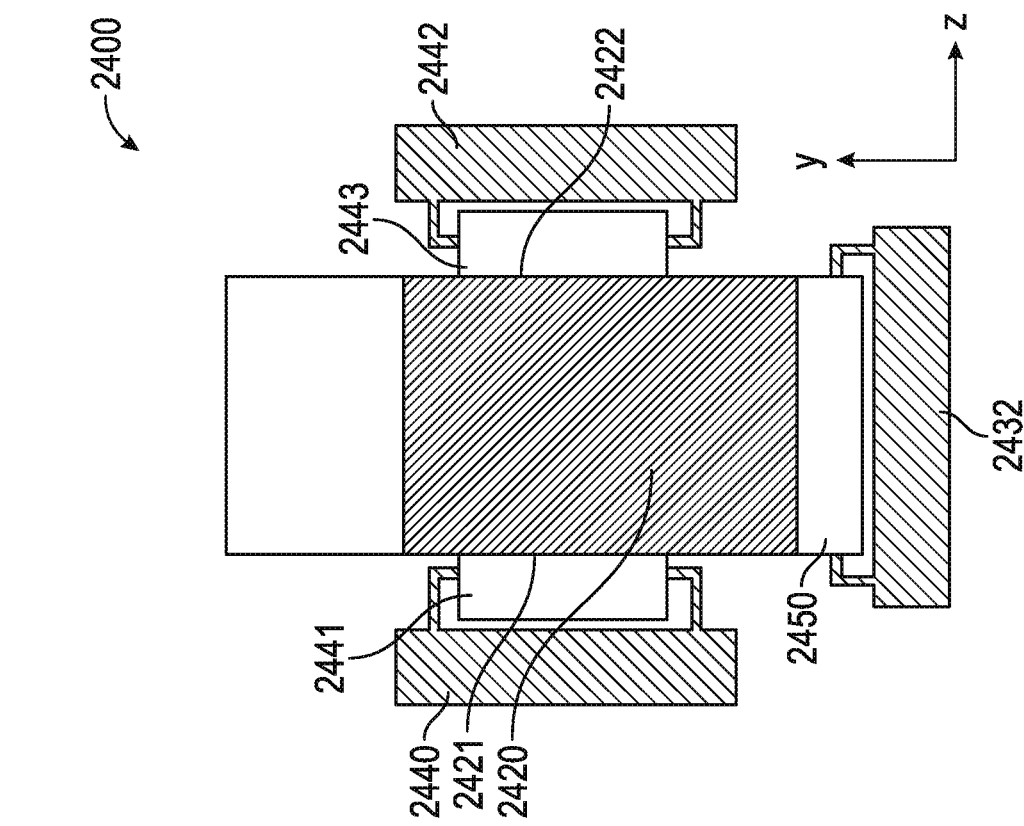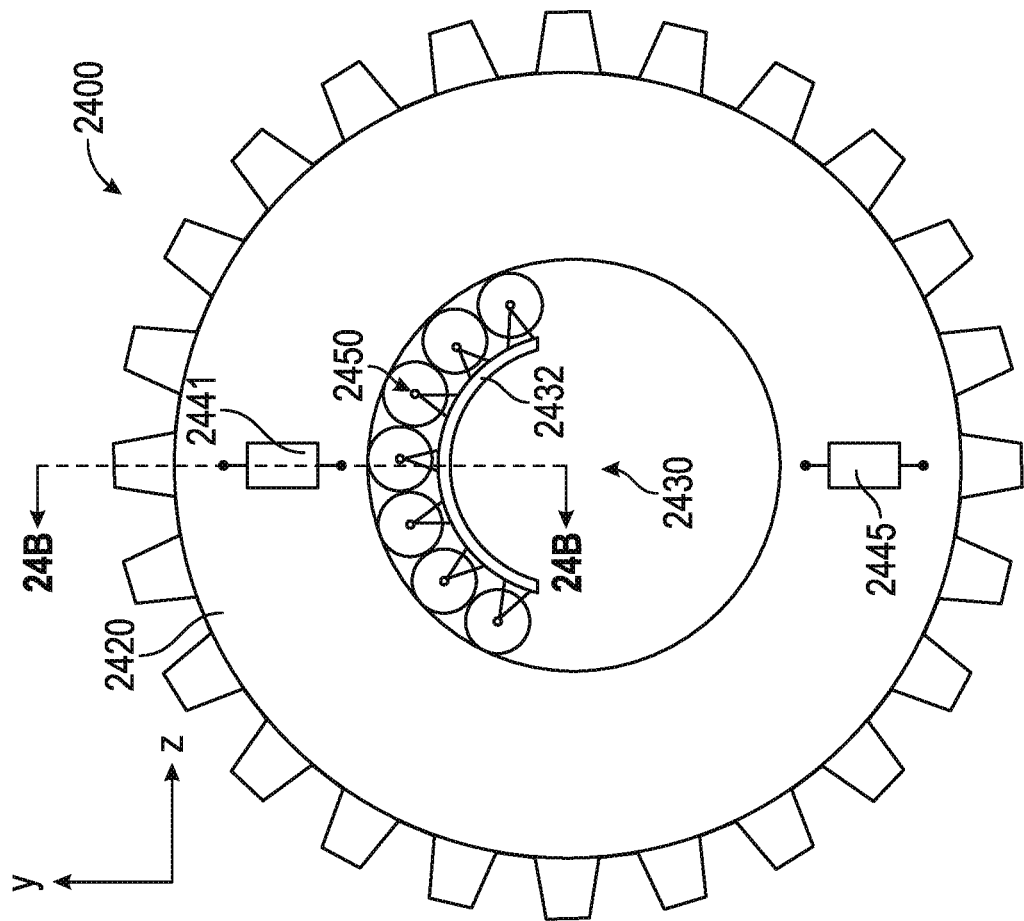

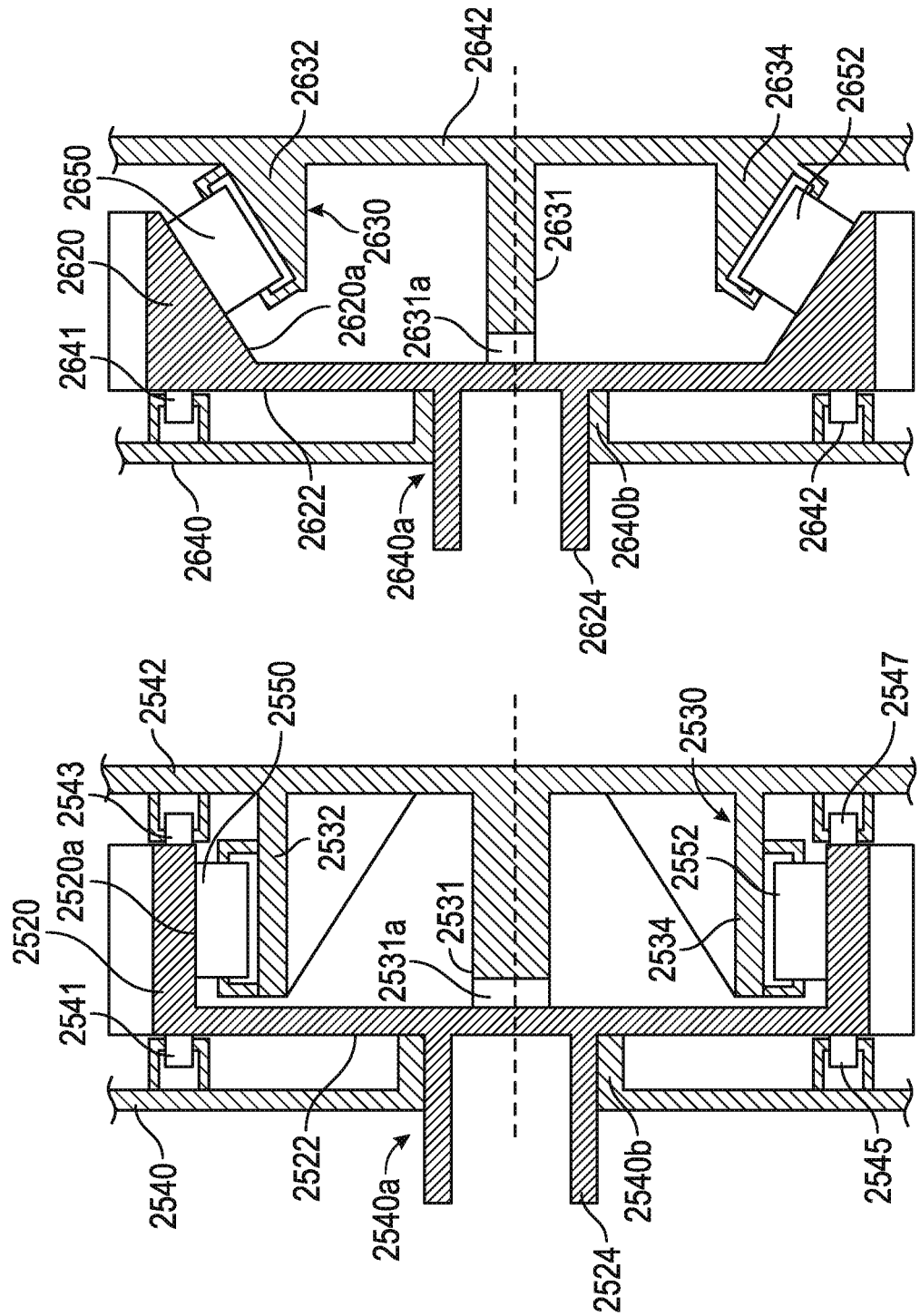

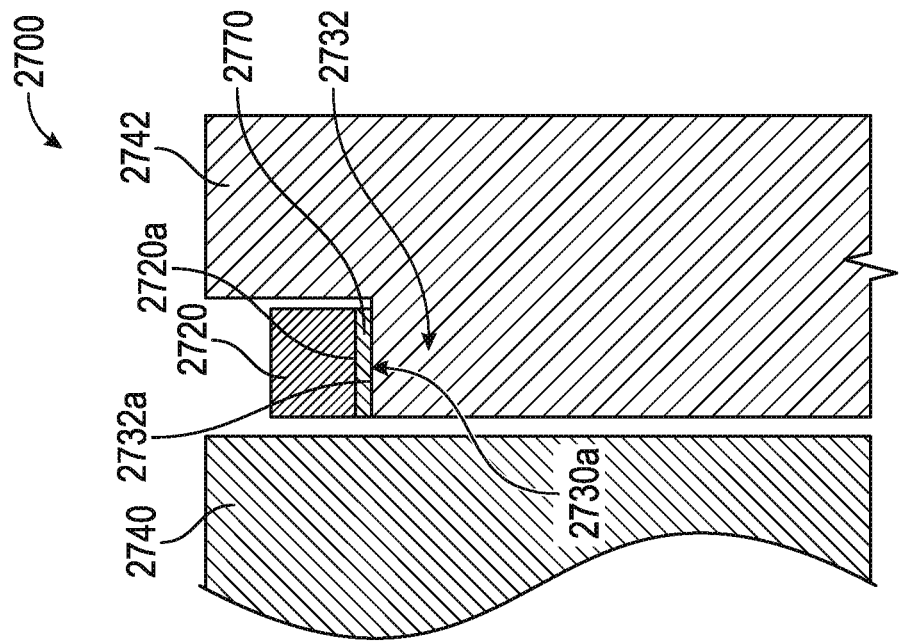
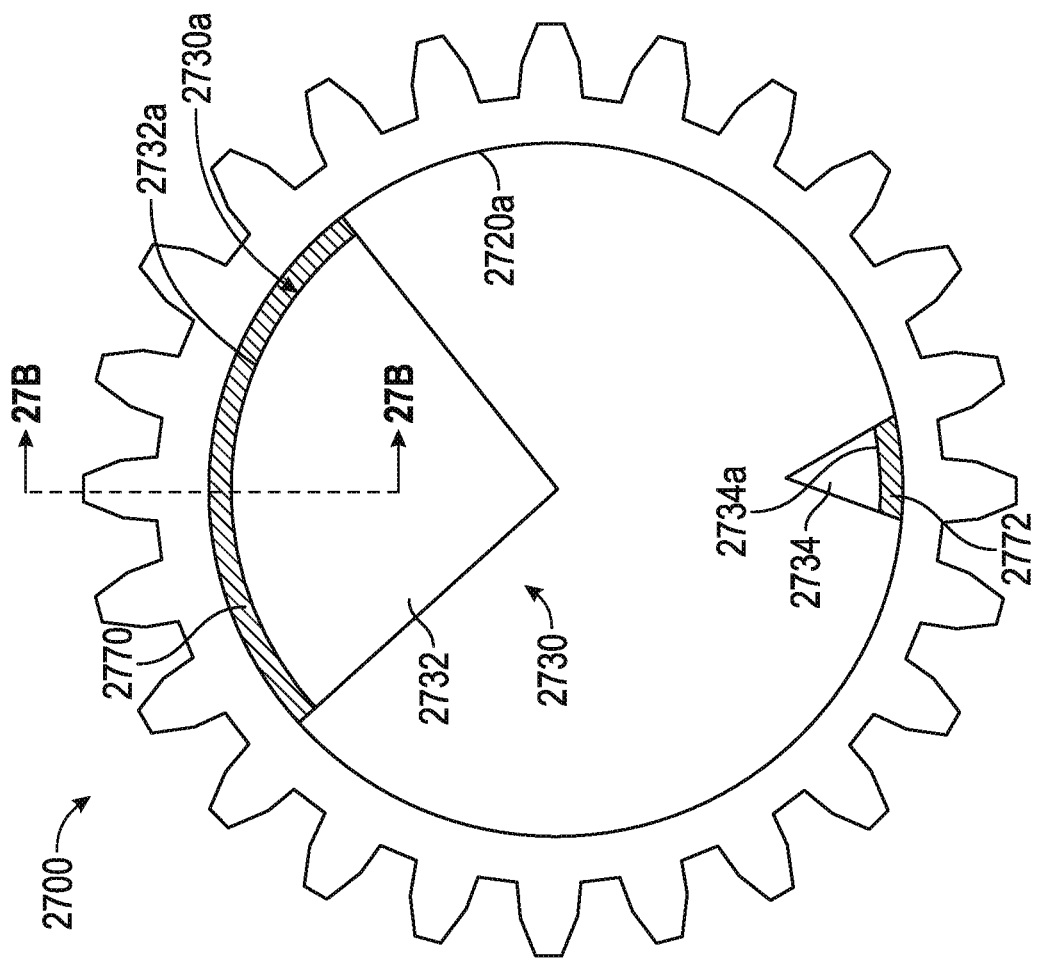

LIGHTWEIGHT GEARDRIVE SYSTEMS

CROSS REFERENCE

Any and all applications for which a foreign or domestic priority claim is identified in the Application Data Sheet as filed with the present application are hereby incorporated by reference under 37 CFR 1.57.

BACKGROUND

Field

The present disclosure relates to an improved gear drive systems.

Related Art

The design of modern gears is based on the original design of the wheel, dating back millennia. The design of the wheel greatly reduces friction by allowing the wheel to rotate with respect to another surface (i.e., roll over a supporting ground surface). A wheel includes a circular outer rim designed to rotate and an axle to provide support and orientation to the wheel. Conventional wheel design includes a central hub at the center of the circular wheel. The central hub is coupled with the axle. The axle may either be fixed with the wheel, allowing the wheel to rotate with the axle, or the wheel may be rotatably coupled with the axle, allowing the wheel to rotate about the axle while the axle remains fixed. A webbing or a plurality of spokes extend from the central hub to support the circular outer rim of the wheel.

All of the loading and impacts imparted onto the wheel are transmitted to the axle in the form of shear loads, lateral loads, and bending moments. As a result, desirable axle and central hub properties include high strength, impact resistance, high bending strength, and high fracture toughness. Depending on the application, central hubs, webbings and axles are typically heavily reinforced and made from durable materials (e.g., steel) so that they can reliably withstand loads applied to the circular outer rim or other portions of the wheel.

Another element of wheel design is lubrication of the axle. Conventionally, the central hub rotates on an outer surface of the axle. An oil-based or other loss-type lubricant can be applied to lubricate the axle and the central hub. The typical lubricant slowly seeps from the wheel and/or the material integrity of the lubricant degrades over time, creating the regular need for re-application of the lubricant. Re-application of the lubricant often require stopping of the wheel and any associated machinery followed by manual disassembly and reassembly of the wheel after the lubricant is re-applied. Despite these drawbacks and the ongoing expense of re-application, lubrication is necessary in many wheels because it reduces friction and prolongs service life of both the wheel and axle.

A conventional axle is much smaller in diameter than the rim of the wheel. As a result, the linear velocity of the central hub rotating about the axle is much smaller than the linear velocity of the outer rim with rotating with respect to the axle. Mounting the central hub on the axle, instead of mounting the rim on the axle, thus minimizes wear between the axle and the wheel. It also increases effectiveness of the lubricant by generating less heat, which can degrade the material integrity of the lubricant. Thus, another desirable axle property is a smaller-diameter shaft because it yields less wear from friction and requires less material. As materials and manufacturing techniques improved over time, axles became both smaller and stronger following conventional wheel design principles. Accordingly, the conventional axle is many times smaller than the wheel it supports.

One implementation of a wheel is a gear drive system or geartrain such as those found in a transmission or gearbox. A gearbox is generally used to provide speed and torque conversions from a rotating input shaft to a rotating output shaft. For example, a step-down gearbox can include a geartrain for lowering the rotational speed of an input shaft and increasing the output torque at an output shaft; a step-up gearbox can include a geartrain for increasing the rotational speed of an input shaft which decreases the torque at an output shaft. Some known gearboxes rely on a series of meshed gears (e.g., spur, helical, herringbone, or compound gears) that include gear teeth mounted on an outer rim supported by a webbing and a hub mounted on a smaller-diameter or conventional shaft or axle. By varying the sizes of the gears within the series of meshed gears and/or using compound gears of varying sizes, a mechanical advantage can be obtained between an input side and an output side of the gearbox.

One type of geartrain that uses gears such as those noted above is the valvetrain system of an internal combustion engine (ICE). The valvetrain system of an ICE performs an important function in the operation of an engine and can affect performance of the engine. In many current commercial engines, the valvetrain system includes one or more camshafts driving one or more intake valves and one or more exhaust valves for each cylinder. Generally, in a four-stroke engine having an intake stroke, a compression stroke, a power stroke and an exhaust stroke, the intake valves open during the intake stroke and close during the compression stroke and the exhaust valves open during the exhaust stroke and close during the intake stroke. The intake valves control the ingress of combustion reactants, such as air and/or fuel, into the combustion chamber and exhaust valves control the egress of combustion products, such as $H_2O$, $CO$, $CO_2$, $NO_x$, and unburned hydrocarbons out of the combustion chamber.

The timing and movement of the intake valve and exhaust valve can play a significant role in the overall performance of an engine, such as the volumetric efficiency and maximum engine speed. Accordingly, precise synchronization of the piston and crankshaft movements with the valve and camshaft movements is of paramount importance to an engine. The camshafts are generally configured to control the timing and movement of the valves and are generally timed in accordance with movement of the pistons by means of a crankshaft coupled with the camshafts through a drivetrain. Existing drivetrains include serpentine belts, chains, and geartrains which transmit rotational energy from the crankshaft of the engine to the camshafts.

SUMMARY OF CERTAIN FEATURES

An aspect of at least one of the embodiments disclosed herein includes the realization that the performance of a geartrain can be improved by incorporating one or more rim gears (a gear having the hub and/or webbing removed) as an idler gear or a compound gear within a geartrain. The rim gear can include gear teeth mounted outwardly on a rim. Using a rim gear can provide the benefit of reduced weight and inertia of individual gears within the geartrain and thereby reduced the weight and inertia of the overall geartrain. Reducing the weight and inertia of the geartrain can increase the efficiency of the power being transferred through the geartrain. For example, lowering the weight or inertia of the geartrain can reduce the overall the power required to accelerate and/or decelerate the geartrain and to maintain the geartrain in motion. Where the geartrain is used in conjunction with an engine or other powered input, this can improve fuel efficiency of the powered input. Additionally, lower inertia in the geartrain can allow the powered input to increase or decrease the speed (RPM) of input and output shafts more quickly.

Another aspect of at least one of the embodiments disclosed herein includes the realization that a geartrain can include a shaft according to the present disclosure for rotatably supporting a rim gear. The rim gear can be supported directly on an outer surface of the shaft without the need for a conventional or small-diameter shaft or axle. Moreover, the shaft can extend from a wall or chamber member of an engine or a gearbox. The shaft can either be made integrally with the wall or chamber member or otherwise mechanically fastened thereto, such as through welding or mechanical fasteners. In some embodiments, the shaft can include a central hollow space, making the shaft essentially a thin-walled tube having an outer cylindrical surface. Such a configuration provides further weight reduction of the geartrain.

Another aspect of at least one of the embodiments disclosed herein includes the realization that shear and lateral forces acting on gears in a geartrain can be better accommodated by geartrain components with the use of rims gears. As noted above, for a conventional gear that is mounted on a conventional shaft, these lateral and shear forces result in a bending moment on the conventional shaft. As a result, the conventional shaft must be sufficiently robust (i.e. heavy) to prevent deflection of the gear and any structure supporting the gear must be sufficiently reinforced (i.e. heavy) to withstand the lateral, shear, and bending forces. In contrast, the incorporation of a rim gear mounted on a shaft, although it is still subject to lateral and shear forces, the bending moment can be significantly reduced by replacing the conventional shaft with a larger-diameter shaft and rim gear according to some embodiments disclosed herein. Thus, in some embodiments disclosed herein, a rim gear can be rotatably mounted directly on a proportionately larger-diameter shaft (as compared with conventional shafts).

Another aspect of at least one of the embodiments disclosed herein includes contacting or stabilizing an end face of the rim gear against an internal surface of a gearbox or on two internal surfaces. The shear and lateral forces on the axle and rim gear can be counteracted d by equivalent reactionary forces from the at least one internal surface (such as rotational support surfaces on the walls or chamber members of the engine) thereby significantly reducing the need for heavy shafts and heavily reinforced supporting structure. The at least one internal surface can also restrain lateral deflection of the rim gear on one or both sides of the rim gear. In some embodiments, the at least one internal surface can include honed surfaces, bearings, bushings, and/or lubrication delivered through an internal lubrication system to reduce friction between the rim gear and the at least one internal surface. In some embodiments, the at least one internal surface can include one or more bearings to contact the side of the rim gear.

Another aspect of at least one of the embodiments disclosed herein includes the realization that a shaft can include the internal lubrication system having an internal lubrication line for delivering a lubricant to a lubrication space between the rim gear and the shaft. Lubrication can be applied within the lubrication space between an internal surface of the rim gear and an outer surface of the shaft on which the rim gear is rotatably mounted. In some embodiments, the internal lubrication line extends within or through at least a portion of the shaft. A first end of the internal lubrication line can be communicatively coupled with the outer surface of the shaft. A second end of the internal lubrication line can be communicatively coupled with a pressurized source of lubricant. Rotation of the rim gear on the outer surface of the shaft can distribute the lubricant within the lubrication space. The rim gear can be configured to rotate on a thin-sheen of lubricant (e.g., oil) disposed within the lubrication space. Such a configuration provides the advantages of reducing the need for bearings to support the rim gear. In some embodiments, the lubricant can seep from the lubrication space and be captured and re-circulated through the lubrication line by a lubrication system. In some embodiments, the outer surface and/or internal surface of the rim gear can include one or more bearings (i.e., needle bearings). To allow the rim gear to rotate on the shaft.

Another aspect of at least one of the embodiments disclosed herein includes the realization that a rim gear can be used as an idler gear of a geartrain in a valvetrain of an engine. Using a rim gear can provide the benefit of reducing weight and inertia in the geartrain and thereby increase engine efficiency. For example, lowering the inertia of a geartrain can reduce the power required to accelerate an engine improving fuel efficiency. Additionally, lower inertia can allow the engine to increase crankshaft speed (RPM) more quickly. Faster engine speed acceleration can be beneficial, for example, in racing and other applications. Thus, in some embodiments, the geartrain can include a rim gear meshed with other gears in the geartrain as an idler gear. In some embodiments, a geartrain for an internal combustion engine can include a rim gear and an idler gear shaft configured to rotatably support the rim gear.

Another aspect of at least one of the embodiments disclosed herein includes the realization that existing engine blocks, including cam-in-block engines, can be converted to an overhead cam engine using a conversion kit to for converting a push-rod engine to an overhead cam engine. In some embodiments, the kit can include at least one chamber member, at least one timing idler gear, and at least one corresponding idler gear shaft extending from the chamber member. The kit can be configured such that the chamber member mounts to the engine and provides a replacement drivetrain between at least one cam shaft and a crank shaft of the engine. The use of such a conversion kit can provide the advantage of a convenient means of converting an existing engine into an overhead cam engine using a geartrain without the need to physically embed gear shafts into the engine block or head and without the added maintenance of a belt or chain tensioner. Moreover, in some embodiments, the chamber member can be configured to provide convenient access to the geartrain for maintenance.

Another aspect of at least one of the embodiments disclosed herein includes the realization of the advantages of replacing an existing drivetrain such as a serpentine belt or timing chain with a timing geartrain. A timing geartrain can withstand much greater forces and stresses and still operate with minimal required maintenance and with a low risk of failure as compared to a belt or chain.

Another aspect of at least one of the embodiments disclosed herein includes the realization that a timing idler gear can comprise a power takeoff shaft (PTO). In some embodiments, the power takeoff shaft can be rigidly fixed to an idler gear and/or a rim gear and provide a location to power various engine components including an alternator, water pump, supercharger, air conditioner, oil pump, or power steering, etc. In some embodiments, the rim gear provides the advantage of reducing the overall weight and inertia of the power takeoff gear, but also can evenly distribute the stress from the power takeoff shaft through the rim shape. In some embodiments, the timing idler gear comprising at least one PTO can reduce the overall footprint of the engine.

Another aspect of at least one of the embodiments disclosed herein includes the realization that the chamber member can provide a plurality of locations for mounting various engine components. Often, engine components are mounted around the sides and top of an engine because there is insufficient space to mount them near the crankshaft. Often these components are powered by lengthy belts and chains that require manual or automatic tensioning and regular maintenance and replacement. As such, in some embodiments, the chamber member can provide space for engine components to be mounted directly to the chamber member, optionally, near the crankshaft, and/or use at least one power takeoff coupled with the timing idler gear. The timing geartrain also offers more precise synchronization of the valvetrain than a timing chain or serpentine belt because it does not have slack from any lack of tension as found in the belt or chain.

In some embodiments disclosed herein, a valvetrain conversion kit for an engine comprises at least one timing idler rim gear configured to be meshed with at least one of a crank gear of the engine and a cam gear of the engine. The kit further comprises a first timing gear chamber member having an interior surface and an exterior surface. The first timing gear chamber member can have a plurality of engine mounting locations corresponding to a plurality of corresponding cover mounting locations on an internal combustion engine body. The first timing gear chamber member can be rigidly attached to an engine body at the plurality of mounting locations. The first timing gear chamber member can further comprise a timing idler rim gear shaft supported by the interior surface, the timing idler rim gear shaft having an exterior shaft surface where the exterior shaft surface is configured to rotatably support the timing idler rim gear. Optionally, an oil passageway extends at least partially through a boss on the timing idler rim gear shaft to the exterior shaft surface and is configured to guide a lubricant to a lubrication space between the exterior shaft surface and a support surface of the timing idler rim gear when the at least one timing idler rim gear is positioned about the exterior shaft surface.

In some embodiments disclosed herein, the valvetrain conversion kit comprises a second timing gear chamber member configured to engage the first timing gear chamber member to define an enclosed timing gear chamber about the at least one timing idler rim gear and the timing idler rim gear shaft. Optionally, the first timing gear chamber member faces towards the engine when assembled with the internal combustion engine or the first timing gear chamber member faces away from the engine when assembled with the internal combustion engine.

In some embodiments disclosed herein, an internal combustion engine comprises an engine block, the engine block including an engine body supporting a crank shaft, an overhead valve camshaft, and a timing geartrain disposed on a first side of the engine body and configured to transmit torque from the crankshaft to the overhead valve camshaft. The timing geartrain can include a crank gear coupled with the crankshaft, a cam gear coupled with the overhead valve camshaft, and an idler rim gear meshed with at least one of the crank gear and the cam gear. An idler rim gear shaft can be disposed on the first side of the engine body and rotatably support the idler rim gear.

These and other embodiments of the disclosure will become readily apparent to those skilled in the art from the following detailed description of the preferred embodiments having reference to the attached Figures, the disclosure not being limited to any particular preferred embodiment disclosed.

BRIEF DESCRIPTION OF THE DRAWINGS

FIG. 2A is a perspective view of a schematic embodiment of a gearbox.

FIG. 3B is a front view of the gearbox of FIG. 3A.

FIG. 11A is a schematic, perspective view of an assembled kit.

FIG. 11B is a detailed view of FIG. 11C.

FIG. 11C is a sectional view taken along the line 11C in FIG. 11A.

FIG. 12A is a schematic, perspective view of another embodiment of a partially assembled kit.

FIG. 12B is a sectional view taken along the line 12B in FIG. 12A.

FIG. 24A is a schematic elevational view of another embodiment of a rim gear mounted on a shaft;

FIG. 24B is a sectional view taken along the line 24B-24B in FIG. 24A showing the rim gear positioned between a pair of walls having rollers;

FIG. 25 is a sectional view of a rim gear including a power take-off shaft;

FIG. 26 is a sectional view of a helical rim gear including a power take-off shaft;

FIG. 27A is a schematic elevational view of embodiment of a rim gear mounted on a shaft and including a solid lubricant;

FIG. 27B is a sectional view taken along the line 27B-27B in FIG. 27A.

DETAILED DESCRIPTION

Figure 1A:
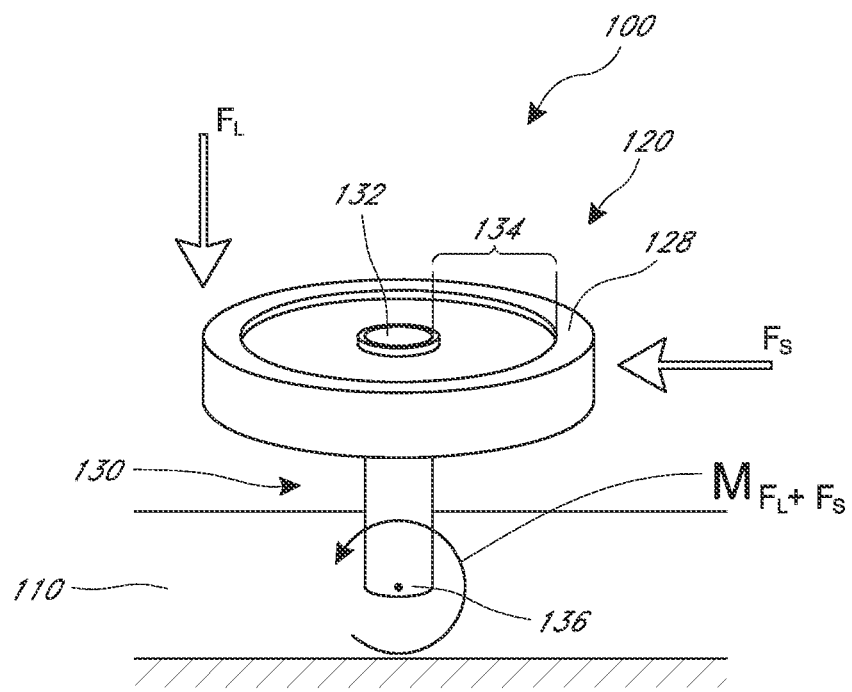
FIG. 1A is a schematic view of a conventional wheel.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the proceeding technical field, background, brief summary, or the following detailed description.

Certain terminology can be used in the following description for the purpose of reference only, and thus are not intended to be limiting. For example, terms such as "upper", "lower", "above", and "below" refer to directions in the drawings to which reference is made. Terms such as "front", "back", "rear", "left side," and "right side" describe the orientation and/or location of portions of the component within a consistent but arbitrary frame of reference which is made clear by reference to the text and the associated drawings describing the component under discussion. Such terminology can include the words specifically mentioned above, derivatives thereof, and words of similar import. Similarly, the terms "first", "second", and other such numerical terms referring to structures do not imply a sequence or order unless clearly indicated by the context.

Gear Drive Systems

FIG. 1A illustrates a single gear 120 of a conventional wheel or gear drive 100. The single gear 120 can rotate on a conventional shaft 130. The single gear 120 can be coupled with a fixed surface 110. A webbing 134 extends between a central hub 132 of the gear 120 and provides support to an outer rim 128 of the gear 120. Either the gear 120 can rotate with respect to shaft 130 and shaft 130 is fixedly coupled with the fixed surface or the shaft 130 and gear 120 can be coupled together and the shaft 130 is rotatably coupled with respect to the fixed surface 110. The gear 120 can be of any type of conventional gear including spur, helical, herringbone, or compound gear. The gear 120 can be a part of a larger geartrain (not shown). In a conventional geartrain, gear teeth of the gear 120 can be meshed with gear teeth of one more adjacent gears to transfer rotation from the gear 120 to the adjacent gear or vice-versa.

Through interactions with adjacent gears, as well as contact with other objects, both lateral $F_L$ and shear forces $F_S$ are exerted on the gear 120. Lateral forces $F_L$ (or thrust forces) are directed parallel to the conventional shaft 130 and shear forces $F_S$ are exerted in a direction parallel to the gear 120 and perpendicular to the lateral forces $F_L$. For example, lateral forces $F_L$ are exerted against the gear 120 by adjacent helical gears. Similarly, shear forces $F_S$ are exerted against the gear 120 through interactions with the teeth of any adjacent gear. As noted above, the conventional shaft 130 is designed to accommodate stresses associated with the normal operation of the geartrain, including both lateral $F_L$ and shear forces $F_S$.

The lateral $F_L$ and shear forces $F_S$, either individually or together, can create a bending moment $M_{FL+FS}$ at the base 136 of the conventional shaft 130 at its connection point with the fixed surface 110. The bending moment $M_{FL+FS}$ on the conventional shaft 130 can bend or deflect the gear and the conventional shaft 130. The longer the length of the conventional shaft 130, the greater the deflection from bending. Too much bending or deflection can interfere with the operation of the geartrain. For example, the gear teeth of the gear 120 and the teeth of an adjacent gear can be subject to undesirable stress if the gear 120 is moved from its designed position, which can affect the mesh of the gear teeth and the operation of the gears.

The conventional shaft 130 must be designed to accommodate the lateral $F_L$, shear forces $F_S$, and bending moment $M_{FL+FS}$ on the conventional shaft 130 and maintain operation of the geartrain. In a conventional geartrain, this can include reinforcement of the fixed surface 110 at its rotatable attachment point with the conventional shaft 130 and/or reinforcing the conventional shaft 130 by making it from a stronger material and/or larger in diameter. Both of these solutions can add additional weight and bulk to the geartrain, which negatively affect the ability of the geartrain to efficiently transmit power. In addition, design options for the conventional shaft 130 are limited in terms of geometry and materials because the larger the diameter of the conventional shaft 130, the greater the rotational velocity of the surface of the shaft 130 with respect to the fixed surface 110. Simply increasing the diameter of the shaft 130 is contrary to conventional design of gear trains because larger-diameter shafts lead to greater wear on the surface of the shaft 130 from the high rotational velocity.

Figure 1B:
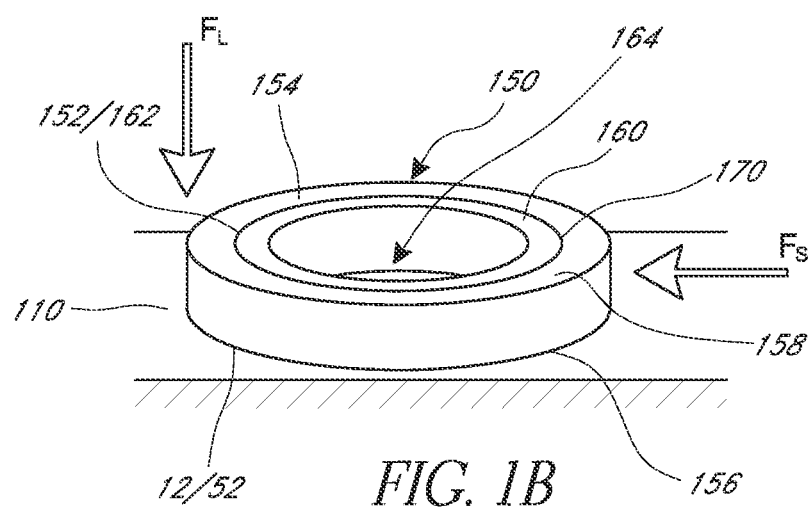
FIG. 1B is a schematic view of a rim gear.

FIG. 1B illustrates a single rim gear 150 of a wheel or gear drive system according to the present disclosure. As used herein, the term "rim gear" is intended to mean 1) a gear without a webbing connecting an outer rim of the gear with outwardly extending gear teeth and without a central a hub for connecting with a shaft or axle; or 2) a gear with an outer rim that has an interior surface for slidingly engaging the shaft or axle and the interior surface has an interior diameter that is equal to or greater than approximately 50%, 60%, 75%, 80%, or 90% of the outside diameter of the rim gear. Additional embodiments of a rim gear are described below in relation to FIG. 10D and timing idler gear 1210. The rim gear 150 can comprise a rim 154 with outwardly extending gear teeth. The rim 154 of the rim gear 150 need only be thick enough to withstand the torque or stress applied to it (with an acceptable amount of deflection) for a particular application, which may include a safety factor. Selection of the ratio of the interior diameter to the outside diameter of the rim 154 can be performed by a person of ordinary skill in the art in view of the present disclosure. Rim gear 150 provides the benefit of reducing weight and inertia of the geartrain. Reducing the weight and inertia of the geartrain can increase the efficiency of the transmission of power through the geartrain. For example, lowering the weight and inertia of the rim gear 150 by eliminating or reducing the size of the central hub and/or web can reduce the overall the power required to accelerate and/or decelerate the rim gear 150 and to maintain the rim gear 150 in motion. The power required to rotate the geartrain is reduced and its responsiveness to power inputs is increased.

The rim gear 150 can be rotatably mounted on a ring shaft or shaft 160. The shaft 160 can be fixedly coupled with or formed integrally with the fixed surface 110. The shaft 160 can include an outer surface 162 on which an inner surface 152 of the rim gear 150 rotates. A lubrication space 170 for providing a lubricant can be disposed between the inner and outer surfaces 152, 162. In any of the embodiments described herein, the rim gear can rotate about the shaft 160 on a thin sheen of lubricant and/or on a bearing disposed on either of the inner or outer surfaces 152, 162.

In some embodiments, the shaft 160 includes an inner hollow space 164. The hollow space 164 can be used to reduce the weight of the shaft 160. The hollow space 164 can be sized to make the shaft 160 into substantially a thin-walled tube, in some embodiments. The shaft 160, which can comprise the hollow space 164, can reduce the weight of the geartrain.

The rim gear 150, when used in a geartrain, can be subject to the same lateral $F_L$ and shear forces $F_S$ that the conventional gear 120 is subject to when rotating on the conventional shaft 130. The rim gear 150 rotatably mounted on the shaft 160, however, solves many of the problems associated with lateral $F_L$ and shear forces $F_S$ in conventional geartrains, such as those discussed above. For example, by shortening the extension the shaft 160 (as compared with the conventional shaft 130), the lateral $F_L$ and shear forces $F_S$ acting on the rim gear 150 and on the shaft 160 create a reduced bending moment on the shaft 160 compared to the bending moment $M_{FL+FS}$ on the shaft 130. In some embodiments, an end face 156 of the rim gear 150 is supported by being placed in contact with a rotation surface 112 on the fixed surface 110, such that the end face 156 is slidingly engaged with the rotation surface 112. This can also reduce the bending moment on the shaft 160. The rotation surface 112 can comprise a honed or otherwise smoothed portion of the fixed surface 110 correspond to the size (e.g., outer diameter) of the rim 154. As described in some embodiments below, a lubricant can also be applied between the rotation surface 112 and the end face 156 to further reduce friction.

A reactionary lateral force from the rotation surface 112, equivalent in magnitude and opposite in direction to the lateral force $F_L$, counteracts the lateral forces on the rim gear 150. A reactionary shear force from the shaft 160, equivalent in magnitude and opposite in direction to the shear force $F_S$, counteracts the shear forces on the rim gear 150. This configuration can provide the advantage of significantly reducing any moment on the shaft 160. In some embodiments, a second fixed surface (not shown) including a second rotation surface can be in contact with a second end face 158 of the rim gear 150 such that the second end face 158 is slidingly engaged with the second rotation surface. This arrangement can provide additional counteracting lateral forces to further reduce any bending moment on the shaft 160. Furthermore, the shaft 160 reduces the magnitude of shear stress on the shaft 160 as compared with the conventional shaft 130. For example, the shaft 160 can include a larger cross-sectional area than a conventional shaft, resulting in lower shear stress. Accordingly, in certain embodiments, the shaft 160 provides the advantages of significantly reducing the need for structural reinforcement of the fixed surface 110 to provide support to a conventional shaft, such as shaft 130. In certain embodiments, the geometry and reduced stress on shaft 160 also provides the advantage of allowing for a greater diversity of materials to be used as material for shaft 160 as compared with the materials commonly used for the conventional shaft 130. For example, the shaft 160 can be made from aluminum or magnesium alloys.

Figure 2B:
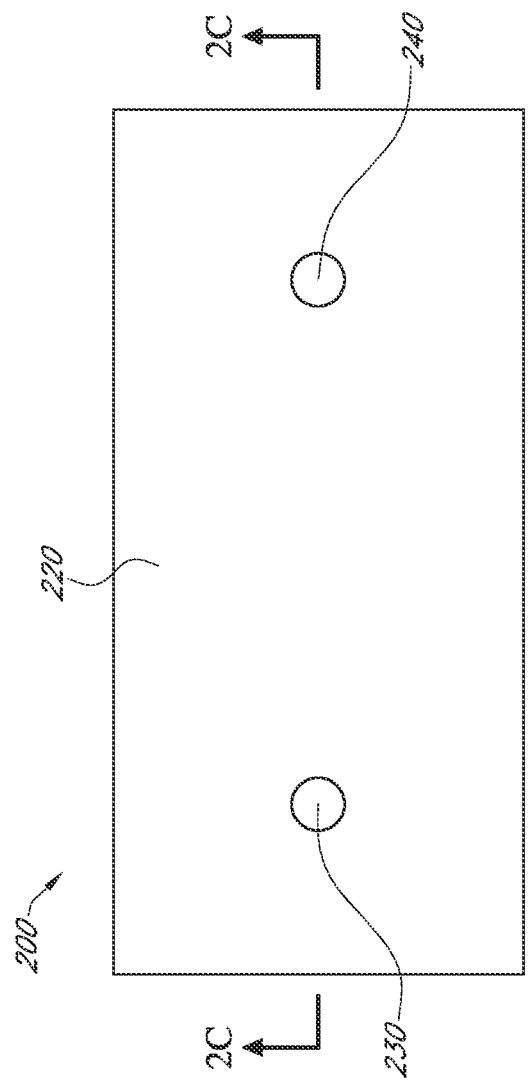
FIG. 2B is a front view of the gearbox of FIG. 2A.
Figure 2C:
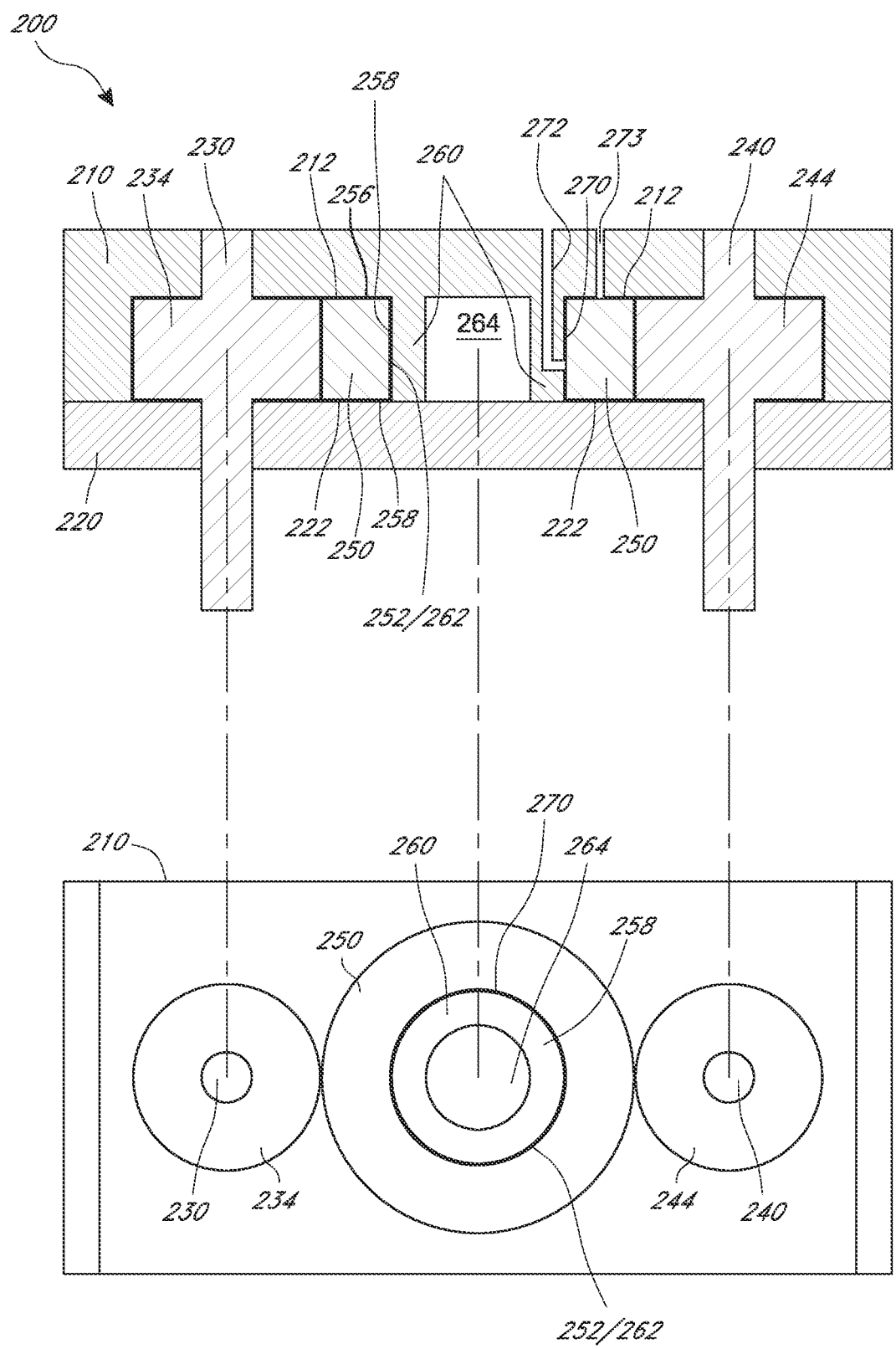
FIG. 2C includes a cross-sectional view taken along the line 2C-2C in FIG. 2A and a front view of the gearbox of FIG. 2A with a chamber member removed.

FIGS. 2A-2C illustrate an embodiment of the present disclosure in the form of a gearbox 200. The gearbox 200 can comprise a first chamber member 210 and a second chamber member 220. The first and second chamber members 210, 220 can fully enclose the internal components of the gearbox 200, as illustrated. Alternatively, the first and second chamber members 210, 220 can provide support to the gearbox components and leave the gearbox 200 open on one or more ends. In some embodiments, the gearbox 200 can include only a single chamber member. A geartrain of the gearbox 200 can include an input shaft 230 and an output shaft 240 can extend from the gearbox 200 such as through the walls of either of the first and second chamber members 210, 220.

The input shaft 230 can be coupled with a first gear 234. The input shaft 230 and the first gear 234 can rotate together with respect to the gearbox 200. A first end of the input shaft can be coupled with the first gear 234. A second end of the input shaft 230 can extend through an aperture of the second chamber member 220. In some embodiments, the input shaft 230 can be rotatably coupled with the first chamber member 210 to provide additional support and stability to the rotation of the input shaft 230. The first gear 234 can be any type of gear including a spur gear, helical gear, herringbone gear, or rim gear as described herein.

The output shaft 240 can be coupled with a second gear 244. The output shaft 240 and the second gear 244 can rotate together with respect to the gearbox 200. A first end of the output shaft can be coupled with the second gear 244. A second end of the output shaft 240 can extend through an aperture of the second chamber member 220. In some embodiments, the output shaft 240 can be rotatably coupled with the first chamber member 210 to provide additional support and stability to the rotation of the input shaft 230. The second gear 244 can be any type of gear.

The input shaft 230 can be used in a conventional manner such as receiving rotational motion and energy from an engine or the like and translating that rotational motion through the geartrain of the gearbox 200 to the output shaft 240. The geartrain can be either a step-up or a step-down transmission, depending on the diameters of the first and second gears 234, 244.

A rim gear 250 can be disposed within the gearbox 200 between the first gear 234 and the second gear 244. In some alternative embodiments, the geartrain includes additional gears. The rim gear 250 can include a rim 254 and outwardly facing gear teeth (not illustrated). The rim gear 250 can be formed without a webbing or central hub for providing structural support to the rim 254. Each of the gears in the geartrain of the gearbox 200, including the first and second gears 234, 244, can include gear teeth and the gear teeth of the gears adjacent the rim gear 250 can be meshed with the gear teeth of the rim gear 250. The gear teeth of the first and second gears 234, 244 are meshed with the gear teeth of the rim gear 250. In this configuration, the rim gear 250 functions as an idler gear.

The rim gear 250 can be rotatably mounted on a ring shaft or rim gear shaft 260. The shaft 260 can extend from either of the first and second chamber members 210, 220. As illustrated, the shaft 260 extends from an interior surface of the first chamber member 210 and is formed integrally therewith. In other embodiments, the shaft 260 can be mechanically coupled with either of the first and second chamber members 210, 220. The shaft 260 can contain a hollow space 264 such as for the purposes of lightening the overall weight of the gearbox 200. In some embodiments, the shaft 260 extends all the way through the rim gear 250. In some embodiments, the shaft 260 extends from the first chamber member 210 into contact with the second chamber member 220.

The rim gear 250 can provide the benefit of reducing weight and inertia of the geartrain. Reducing the weight and inertia of the geartrain can increase the efficiency of the transmission of power through the geartrain. For example, where the input shaft 230 is coupled with a rotating shaft of an engine for stepping down the speed of the rotating shaft, the power consumed in starting, stopping, and maintaining rotation of the rim gear 250 and first and second gears 234, 244 of the gearbox 200 is reduced because of the reduced weight and inertia of the rim gear 250. Moreover, any of the rim gear shafts described herein can include (but are not required to include) the hollow space 264 to further reduce the weight of the gearbox 200.

The rim gear 250 can be rotatably mounted on the shaft 260. A cylindrical inner surface 252 of the rim gear 250 can be slidingly engaged with a cylindrical outer surface 262 of the shaft 260. The outer surface 262 can be smoothed such as to provide a surface with as little friction as possible. A lubrication space 270 can be disposed between the inner surface 252 and the outer surface 262. In some embodiments, the lubrication space 270 can have a clearance of between about 0.001" to 0.004", as is known in the art. In some embodiments, the lubrication space 270 can have larger clearance. In some embodiments, the clearance of the lubrication space 270 can be approximately 0.001" for every 1.0" of the diameter of the outer surface 262. A lubrication line 272 can extend through at least a portion of the shaft 260 and a first end of the lubrication line 272 can extend to the outer surface 262 such that a lubricant can flow through the lubrication line 272 and into the lubrication space 270. The lubricant (e.g., oil) can be dispersed over the outer surface 262 and the inner surface 252 by the rotation of the inner surface 252 over the outer surface 262. The rim gear 250 can rotate on a thin coat of lubricant as it rotates about the shaft 260. In some embodiments, the inner surface 252 or the outer surface 262 can include a circumferential groove for distributing the lubricant.

The lubrication line 272 can be coupled with an internal lubrication system for pumping the lubricant through the lubrication lines 272. The internal lubrication system can recapture lubricant as it drips from out of the lubrication space 270. The collected lubricant can be recirculated through the internal lubrication system. For example, the enclosure of the first and second chamber members 210, 220 can include a drain for collecting the lubricant. In some embodiments, a reservoir connected with the drain can store the lubricant until it is recirculated through the lubrication line 272 by the internal lubrication system.

The first and second chamber members 210, 220 can comprise rotation surfaces 212, 222 that can be in contact with end faces 256, 258 of the rim gear 250, respectively. The rotation surfaces 212, 222 can correspond to the size (e.g., outer diameter) of the end faces 256, 258 (e.g., a circular portion of each of the end faces 256, 258). The rotation surfaces 212, 220 can be honed to reduce friction with the end faces 256, 258 of the rim gear 250. In some embodiments, an additional lubrication line 273 can extend to one or both of these rotation surfaces 212, 222. In some embodiments, the rotation surfaces 212, 220 can include a bearing (e.g., needle bearing) or bushing for reducing friction between the end faces 256, 258 of the rim gear 250 and the chamber members 210, 220. In some embodiments, the lubricant flowing through the lubrication line 272 and into the lubrication space 270 can flow out of the lubrication space 270 and into one or both of the rotation surfaces 212, 222. For example, the rotation of the rim gear 250 can cause the lubricant to flow to either of both of the end faces 256, 258 and the centripetal acceleration can spread the lubricant across the end faces 256, 258 and thereby lubricate the rotation surfaces 212, 222. Any of the rotational surfaces described herein can be lubricated in this manner.

Reactionary forces from the rotation surfaces 212, 222 and the shaft 260 can counteract the lateral and thrust forces that the rim gear 250 is subject to. These lateral and thrust forces can be created by, for example, interaction of the rim gear 250 with adjacent gears, such as the first and second gears 234, 244. In some embodiments, the reactionary forces from the rotation surfaces 212, 222 counteract the lateral forces such that the bending moment on the shaft 260 is reduced or eliminated. Accordingly, the rotation surfaces 212, 222 can provide the advantage of reducing the need for heavy reinforcing structure on the chamber members 210, 220 to support rotation of a conventional shaft for idler gears.

FIGS. 3A-3F illustrate an embodiment of the present disclosure in the form of a gearbox 300. The gearbox 300 can comprise a first chamber member 310 and a second chamber member 320. The first and second chamber members 310, 320 can fully enclose the internal components of the gearbox 300. Alternatively, the first and second chamber members 310, 320 can provide support to the gearbox components and leave the gearbox 300 open on one or more ends, as illustrated. An input shaft 330 and an output shaft 340 can extend from the gearbox 300 such as through the walls of either of the first and second chamber members 310, 320. As illustrated, the input shaft 330 extends through an aperture 310a of the first chamber member 310 and the output shaft 340 extends through an aperture 320a of the second chamber member 320. The input shaft 330 can be used in a conventional manner such as receiving rotational motion and energy from an engine or the like and translating that rotational motion through the gearbox 300 to the output shaft 340. The gearbox 300 can be either a step up or a step-down transmission.

The input shaft 330 can be coupled with a first gear 334. The first gear 334 can be rotatably mounted on a shaft 332, similar to the shaft 260. The first gear 334 can be a rim gear, similar to rim gear 250. In other embodiments, the input shaft 330 and the first gear 334 can be a conventional type of gear, similar to the input shaft 230 and the first gear 234. The first gear 334 can include a faceplate 336. The input shaft 330 can be coupled at a first end 330a with the faceplate 336 such that the first gear 334 can rotate together with the input shaft 330. A second end 330b of the input shaft 330 can extend through the first chamber member 310. The second end of the input shaft 330 can be coupled with a powered input (e.g., an engine).

Figure 3A:
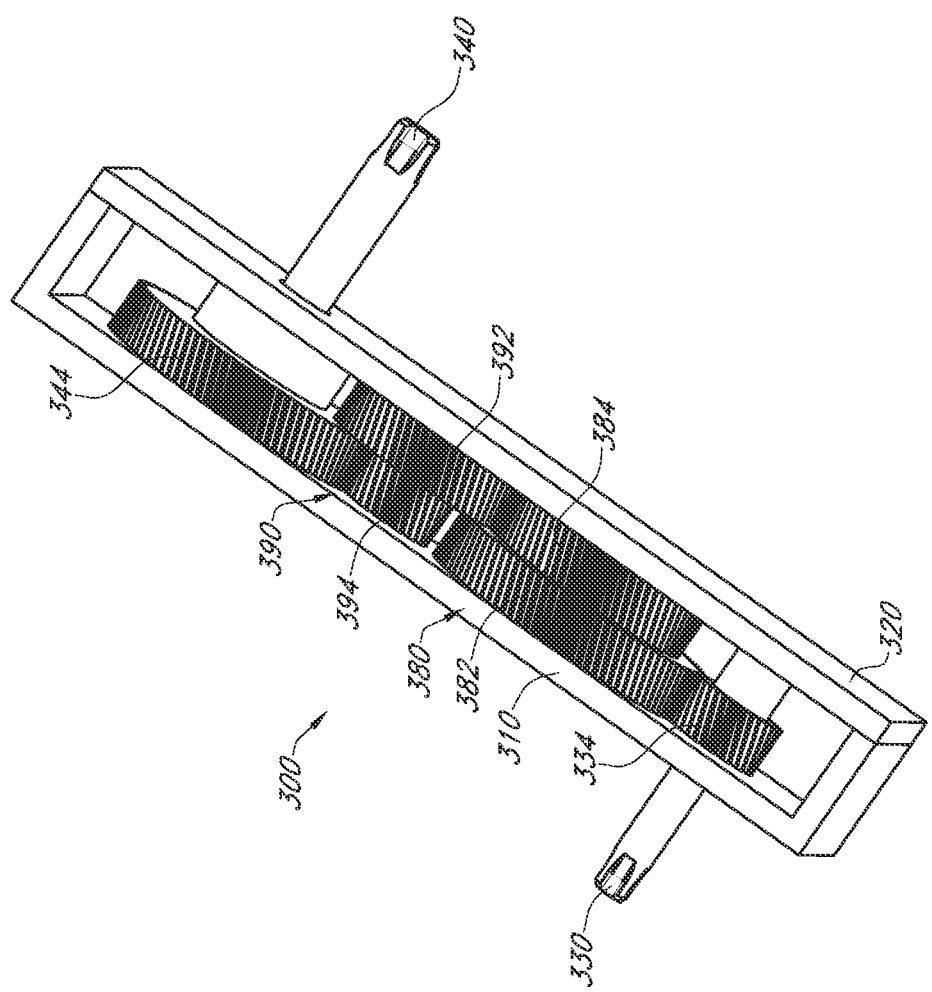
FIG. 3A is a perspective view of another embodiment of a gearbox.
Figure 3C:
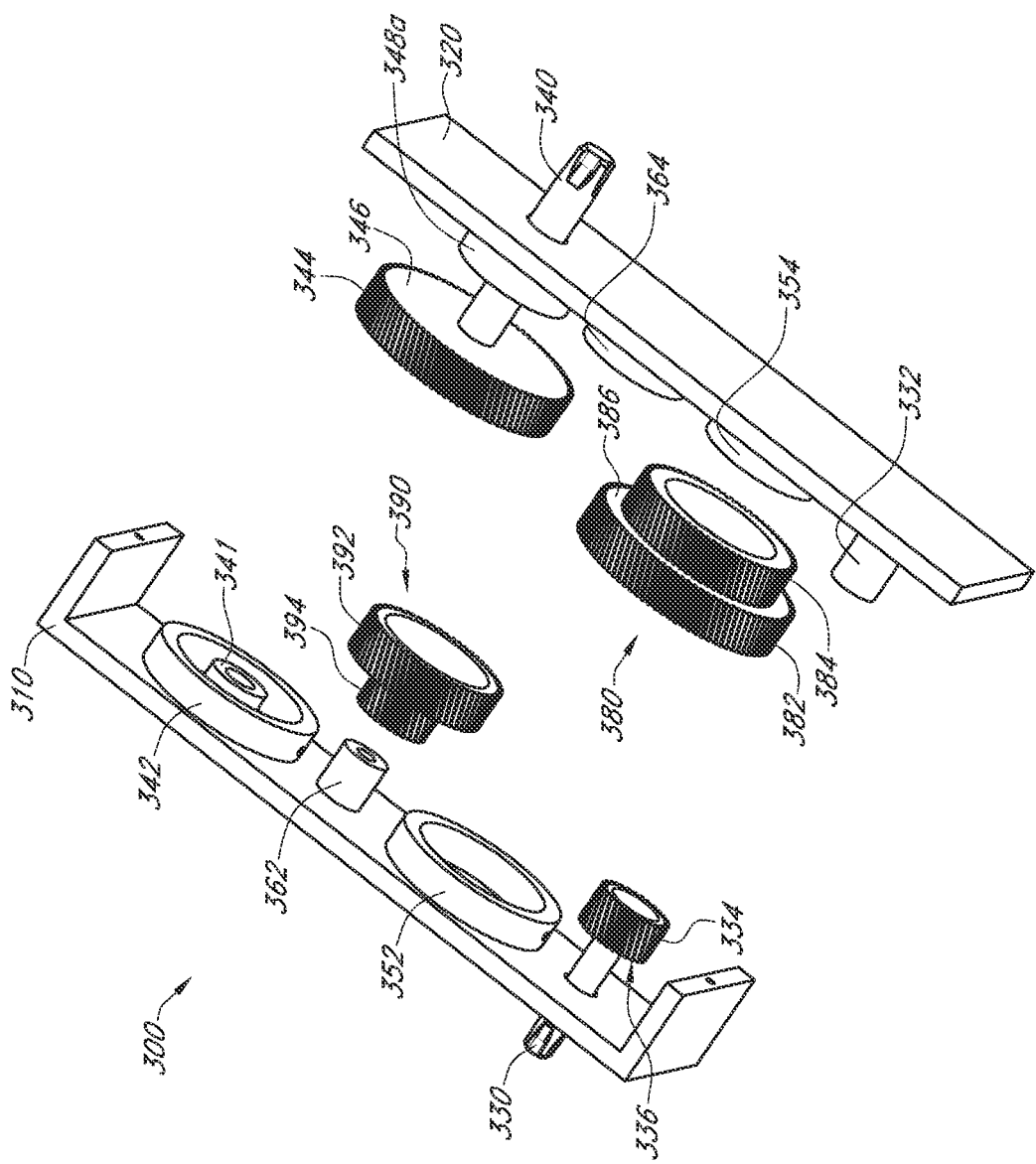
FIG. 3C is an exploded perspective view of the gearbox of FIG. 3A.
Figure 3D:
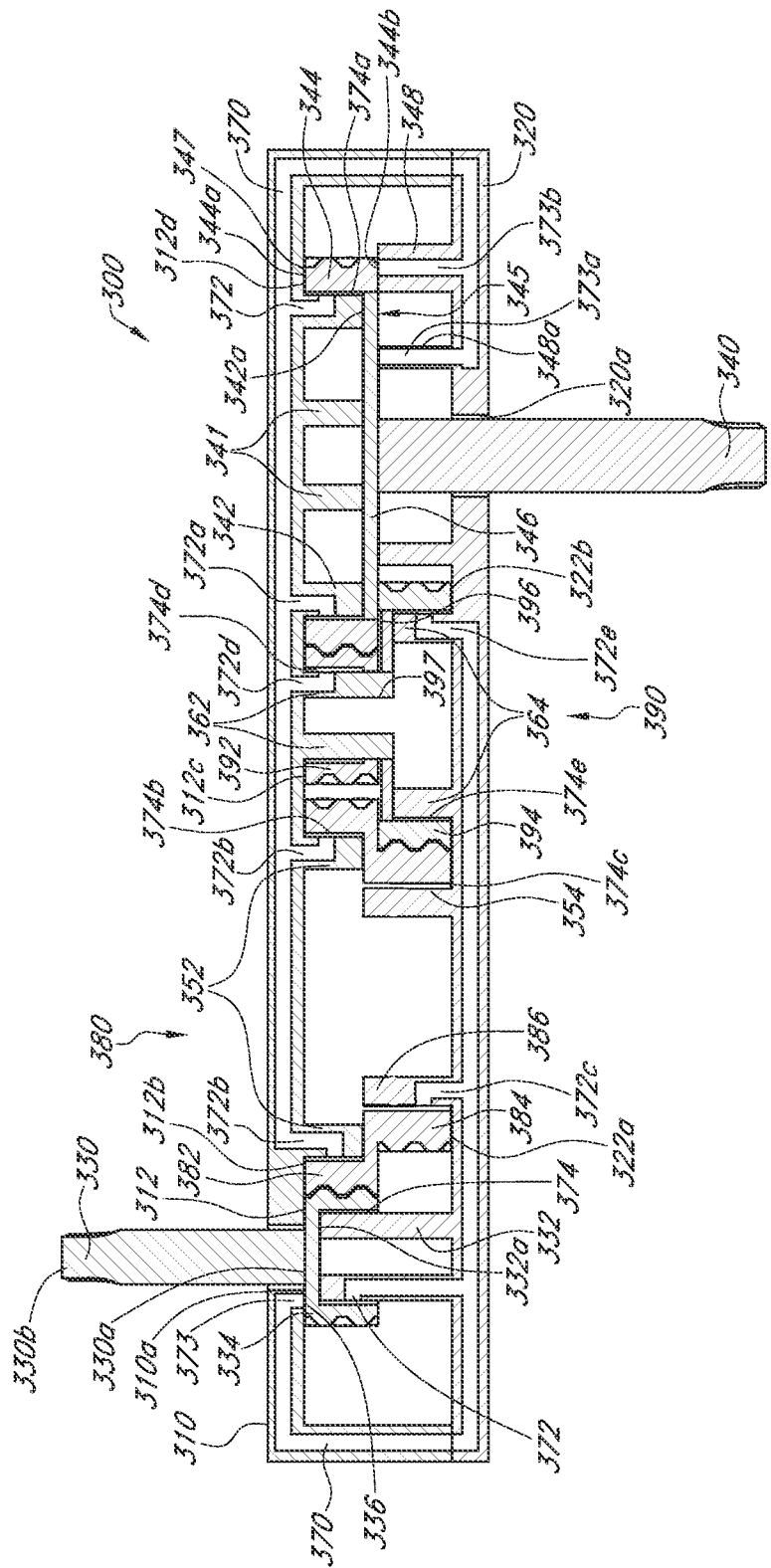
FIG. 3D is a cross-sectional view of the gearbox of FIG. 3A.
Figure 3E:
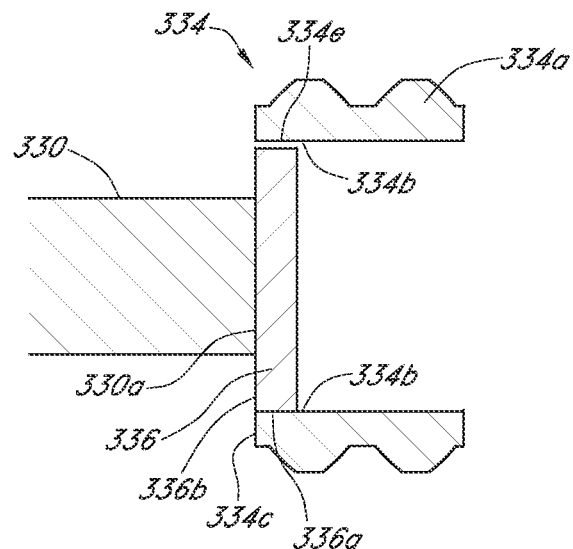
FIG. 3E is a detail view of a first gear shown in FIG. 3D.
Figure 3F:
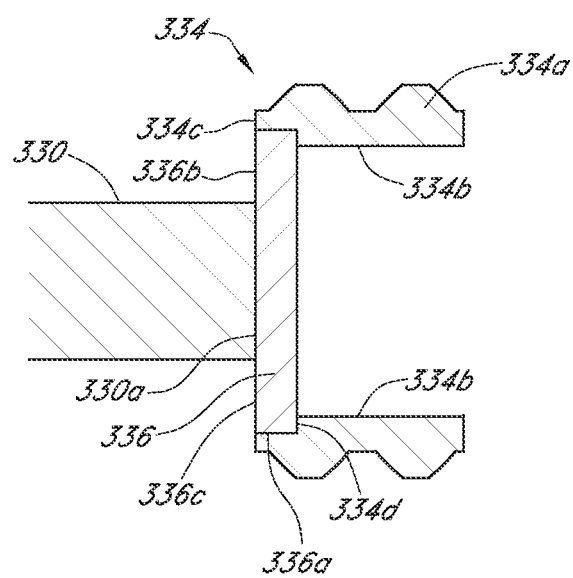
FIG. 3F is a detail view of an alternative embodiment of the first gear shown in FIG. 3E.
Figure 4A:
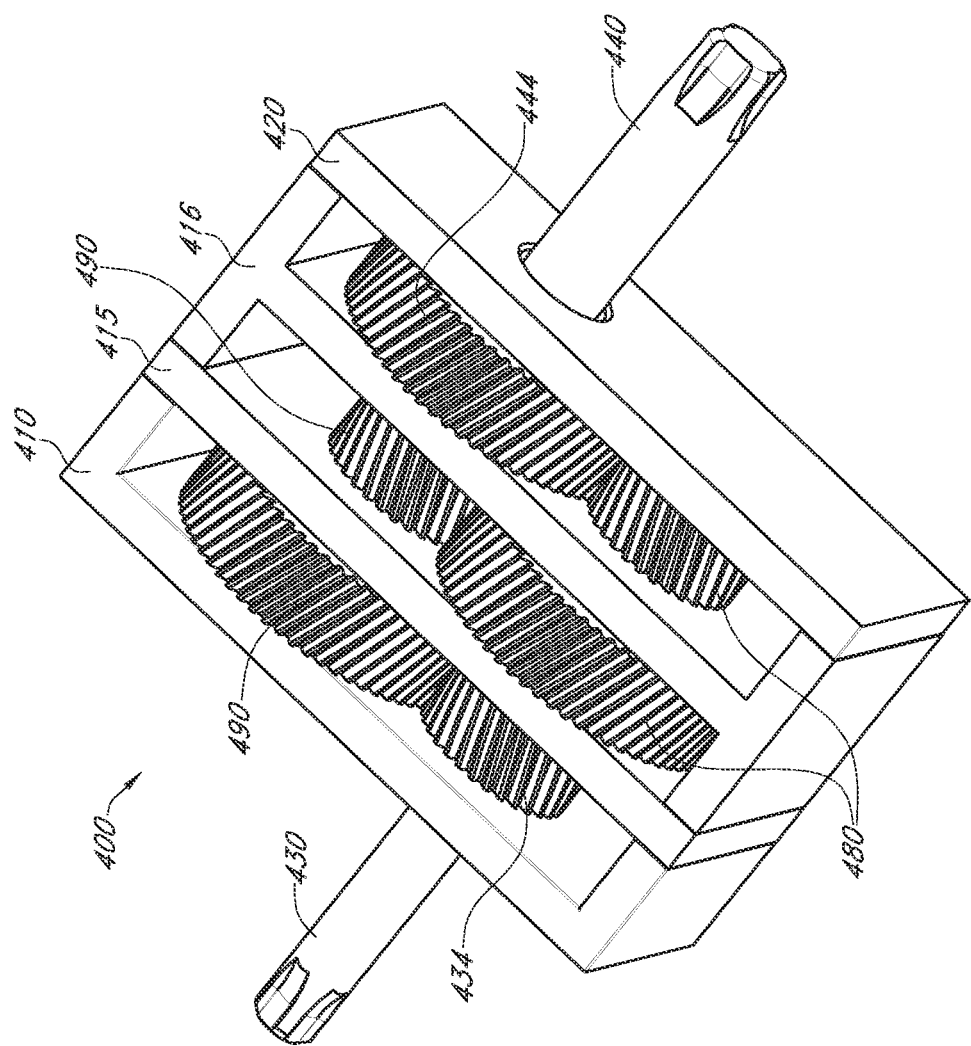
FIG. 4A is a perspective view of another embodiment of a gearbox.
Figure 4B:
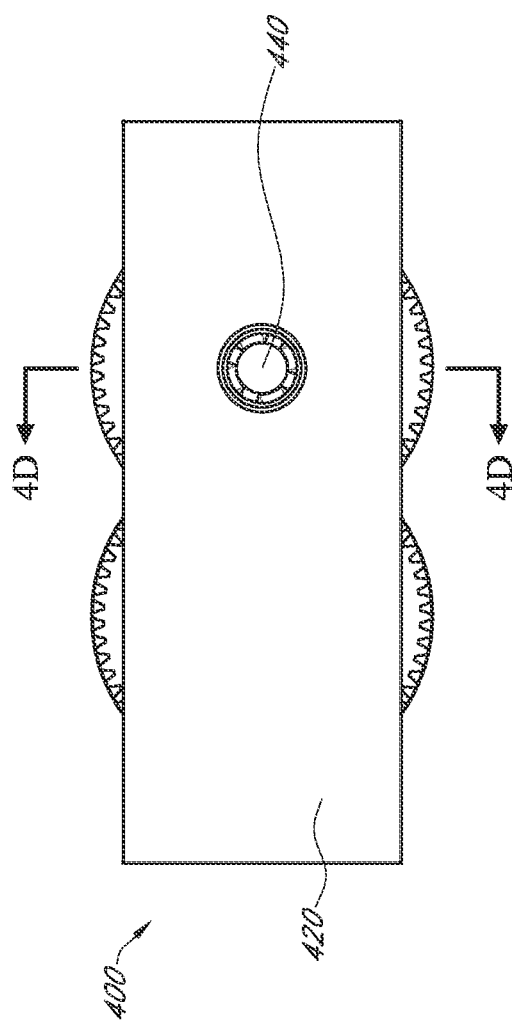
FIG. 4B is a front view of the gearbox of FIG. 4A.
Figure 4C:
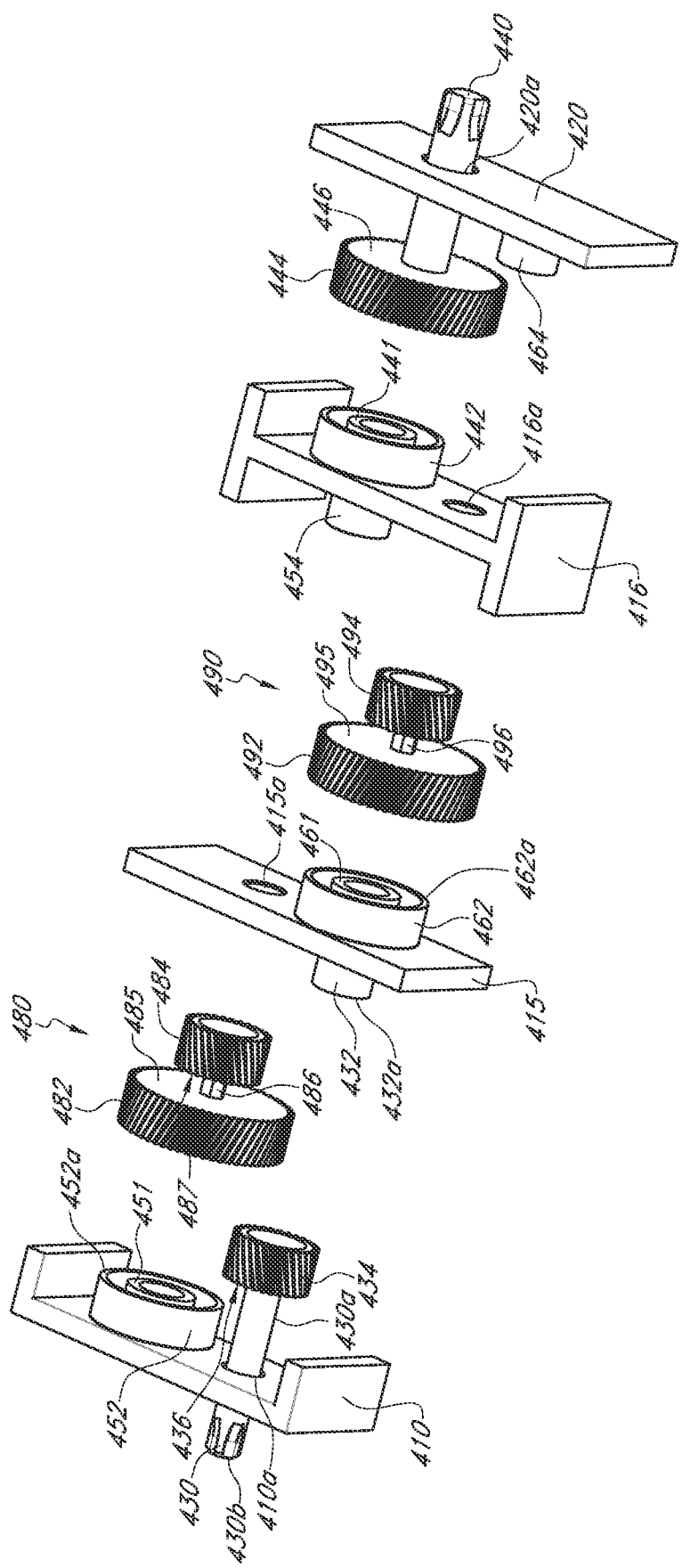
FIG. 4C is an exploded perspective view of the gearbox of FIG. 4A.
Figure 4D:
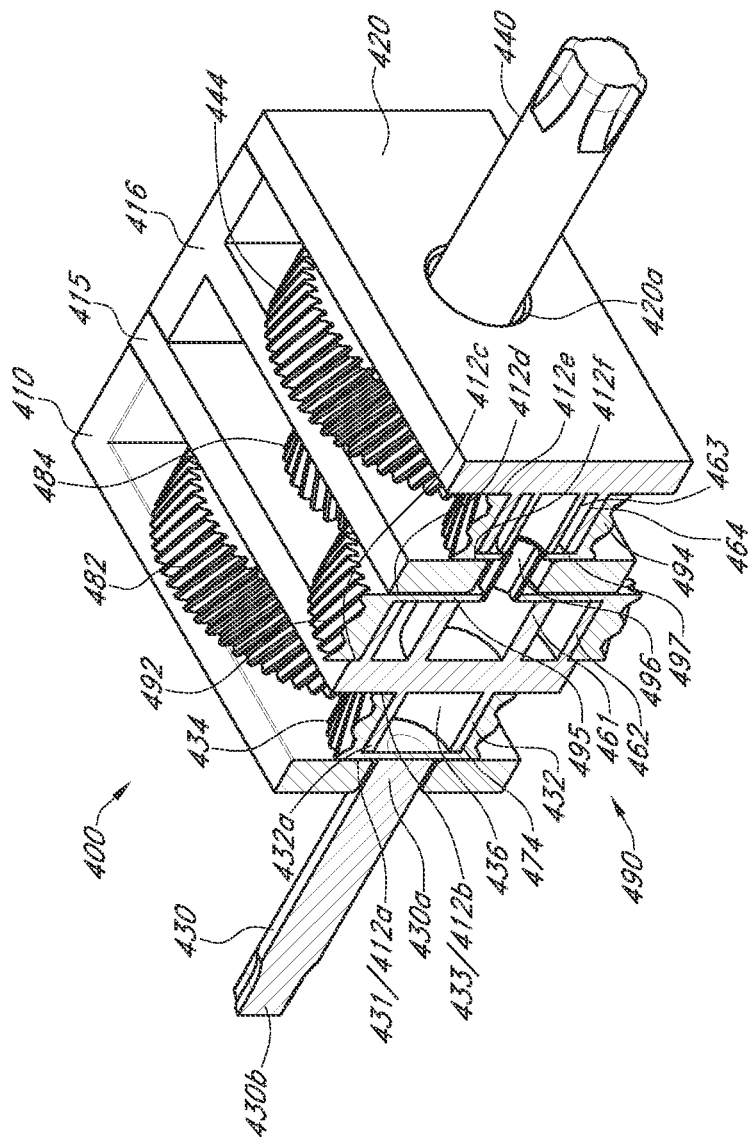
FIG. 4D is a partial cross-sectional view taken along the line 4D-4D in FIG. 4B.

In one embodiment illustrated in FIG. 3E, the faceplate 336 can be disposed within a rim 334a of the first gear 334. An circumferential surface 336a of the faceplate 336 can be coupled with an inner surface 334b of the rim 334a. For example, the circumferential surface 336a can be press-fit, welded, or otherwise mechanically fastened with inner surface 334b. In another example, the faceplate 336 and the rim 334a can be of a monolithic structure. A face 336b of the faceplate 336 can be even with an end face 334c of the rim 334a. In another embodiment, as illustrated in FIG. 3F, the rim 334a can include a shelf 334d on which the faceplate 336 can be mounted within the first gear 334.

The aperture 310a, through which the second end 330b of the input shaft 330 can extend, can be slidingly engaged with and provide support for rotation of the input shaft 330. For example, the aperture 310a can include a bearing engaged with an outer surface of the input shaft 330. The first end 330a of the input shaft 330 can be mechanically fastened or monolithically formed with the faceplate 336 and axially aligned with the first gear 334. For example, in some embodiments, the first end 330a can be butt-welded with the faceplate 336. In some embodiments, rotation of the input shaft 330 and the first gear 334 can be facilitated by using a transverse tongue-and-groove or Oldham-type joint between the faceplate 336 and the first end 330a. This arrangement can allow rotation of the input shaft 330 and the first gear 334 despite minor misalignments between the aperture 330a with the shaft 332.

The shaft 332 can extend from either of the first and second chamber members 310, 320. As illustrated, the shaft 332 extends from the second chamber member 320 and is formed integrally therewith. A distal end 332a of the shaft 332 can extend adjacent to and/or in contact with the faceplate 336. In other embodiments, the shaft 332 can be mechanically coupled with the second chamber member 320. The shaft 332 can contain a hollow space such as for the purposes of lightening the overall weight of the gearbox 300. The cylindrical inner surface 334b of the first gear 334 can be slidingly engage or mounted on a cylindrical outer surface of the shaft 332. The inner and outer surfaces can be smooth to reduce friction.

A lubrication space 374 can be disposed between the inner surface 334b of the first gear 334 and the outer surface of the shaft 332 and/or between the distal end 332a of the shaft 332 and the faceplate 336. A lubrication line 372 of a lubrication system 370 can extend through at least a portion of the shaft 332 such that a lubricant can flow through the lubrication line 372 and into the lubrication space 374. The lubricant (e.g., oil) can be dispersed through the lubrication space 374 by the rotation of the first gear 334 about the shaft 332.

The lubrication system 370 of the gearbox 300 can recapture lubricant as it drips from out of the lubrication space 374 or any other lubrication space of any of the gears of the gearbox 300. The collected lubricant can be recirculated through the lubrication system 370. For example, the enclosure of the first and second chamber members 310, 320 can include a sump reservoir or a drain connected with an external reservoir. Either reservoir can store the lubricant until it is recirculated through the lubrication lines 372 by the lubrication system 370. In some embodiments, a pump (either internal or external to the enclosure) can provide pressure to deliver the lubricant through the lubrication line 372.

The end face 334c of the first gear 334 and/or the face 336b can contact a rotation surface 312 of the chamber member 310. The rotation surface 312 can correspond to the size (e.g., outer diameter) of the first gear 334. The rotation surface 312 can be honed to reduce friction with the end face 334c. In some embodiments, the rotation surface 312 can include a bearing or bushing for reducing friction between the end faces of the first gear 334 and the chamber member 310. In some embodiments, a lubrication line 373 extends to the rotation surface 312. In some embodiments, the pump of the lubrication system 370 can provide pressure to deliver the lubricant through the lubrication line 373. In other embodiments, the lubricant can be delivered through the lubrication line 372 to the lubrication space 374. From the lubrication space 374, the lubricant can flow into an internal lubrication line 334e disposed through the faceplate 336 of the first gear 334. The internal lubrication line 334e can be communicatively coupled between the lubrication space 374 and the end face 334c. Rotation of the first gear 334 can deliver the lubricant to the rotation surface 312 by the centripetal acceleration of the first gear 334.

The output shaft 340 can be coupled with a second gear 344. The second gear 344 can include a faceplate 346. The output shaft 340 can be coupled with the faceplate 346 such that the second gear 344 can rotate together with the output shaft 340 and is axially aligned therewith. The second gear 344 and the output shaft 340 can have a structure similar to the first gear 334 and the input shaft 330. For example, in some embodiments, the output shaft 340 can be butt-welded or otherwise mechanically fastened with the faceplate 346. In some embodiments, the output shaft 340 can be coupled using a transverse tongue-and-groove or Oldham-type joint between the faceplate 346 and the output shaft 340. In some embodiments, the output shaft 340 and the faceplate 346 can be formed of a monolithic structure. In some embodiments, the aperture 320a can include a bearing or otherwise provide rotational stability to the shaft 340.

The second gear 344 can be rotatably mounted on a shaft 342, similar to the shaft 260. The shaft 342 can extend from either of the first and second chamber members 310, 320. As illustrated, the shaft 342 extends from the first chamber member 310 and is formed integrally therewith. In other embodiments, the shaft 342 is mechanically coupled with the first chamber member 310. A distal end 342a of the shaft 342 can extend adjacent to and/or in contact with the faceplate 346. The second gear 344 can be rotatably mounted on an outer surface of the shaft 342.

A lubrication space 374a can be disposed between an inner surface of the second gear 344 and the outer surface of the shaft 342 and/or between the distal end 342a of the shaft 342 and the faceplate 346. A lubrication line 372a of the lubrication system 370 can extend through at least a portion of the shaft 342 such that a lubricant can flow through the lubrication line 372a and into the lubrication space 374a.

In some embodiments, an end face 344a of the second gear 344 can contact a rotation surface 312a of the chamber member 310. The rotation surface 312a can be similar to the rotation surface 312 of the first gear 334. For example, rotation surface 312a can include a lubrication line, similar to lubrication line 373 and/or can include a honed surface, bearing or bushing.

In some embodiments, one or more support shafts 341, 348a or posts 348b can provide support to the faceplate 346 and/or a second end face 344b of the second gear 344. The support shaft 341 extend from the first chamber member 310 and a distal end thereof can be adjacent to and/or in contact with the faceplate 346. In some embodiments, the support shaft 341 can include a lubrication line (not shown) for delivering a lubricant to the interface of the faceplate 346 and the support shaft 341. In some embodiments, the second gear 344 can be large in diameter and the faceplate 346 may deflect easily due to axially aligned forces on the shaft 340. The support shaft 341 can be axially aligned with the output shaft 340 and substantially prevent deflection of the faceplate 346 towards the chamber member 310.

The support shaft 348a can extend from the second chamber member 320 and a distal end thereof can be adjacent to and/or in contact with the faceplate 346. In some embodiments, the support shaft 348a can include a lubrication line 373a for delivering the lubricant to the interface of the faceplate 346 and the support shaft 348a. The post 348b can extend from the second chamber member 320 and a distal end thereof can be adjacent to and/or in contact with the faceplate 346 and/or the second end face 344b of the second gear 344. In some embodiments, the post 348b can include a lubrication line 373b for delivering the lubricant to the interface of the faceplate 346 or second gear 344 and the post 348. The shafts 341 and 348a and the post 348b can function to maintain the second gear on the shaft 342. The shafts 341 and 348a and the post 348b can be used with any of the rim gears described within this disclosure.

A first compound rim gear 380 can be disposed within the gearbox 300 between the first gear 334 and the second gear 344. One of the first and second gears 334, 344 can be larger in diameter than the other gear. In some embodiments, the gearbox 300 includes additional gears, including a second compound rim gear 390. The first compound rim gear 380 can include a first rim 382 coaxially coupled with a second rim 384, each comprising outwardly facing gear teeth. The first compound rim gear 380 can be formed without webbings providing structural support to the first and second rims 382, 384 of the first compound rim gear 380. The first rim 382 can be coupled with the second rim 384. For example, an end face of the first rim 382 and an end face of the second rim 384 can be coupled with a faceplate 386. In some embodiments, each of the first and second rims 382, 384 include a faceplate and the faceplates are coupled together to form the compound rim gear 380. Thus, the first and second rims 382, 384 can be fixedly coupled to rotate together and about the same axis of rotation. In some embodiments, the first and second rims 382, 384 can be formed (e.g., cast and/or machined) of a monolithic structure.

The gear teeth of the first compound rim gear 380 can be meshed with the gear teeth of adjacent gears and thereby transmit rotational motion and energy. For example, the gear teeth of the first rim 382 can be meshed with the gear teeth of the first gear 334. The gear teeth of the second rim 384 can be meshed with the gear teeth of the second compound rim gear 390. A diameter of the first rim 382 can be different from a diameter of the second rim 384. Accordingly, the rotation of the first compound rim gear 380 can act to step-up or step-down the rotational motion and energy input into the first compound rim gear 380.

The first rim 382 can be rotatably mounted on a shaft 352, similar to the shaft 332. The shaft 352 can extend from either of the first chamber member 310. As illustrated, the shaft 352 can extend adjacent to and/or in contact with the faceplate 386. The shaft 352 can contain a hollow space such as for the purposes of lightening the overall weight of the gearbox 300. The first rim 382 can be rotatably mounted on an outer surface of the shaft 352. An end face of the first rim 382 can contact a rotation surface 312b of the chamber member 310, similar to rotation surface 312.

A lubrication space 374b of the first rim 382 can be disposed between an inner surface of the first rim 382 and the outer surface of the shaft 352. A lubrication line 372b of the lubrication system 370 can extend through at least a portion of the shaft 352 such that a lubricant can flow through the lubrication line 372 and into the lubrication space.

The second rim 384 can be rotatably mounted on a shaft 354, similar to the shaft 332. The shaft 354 can extend from the second chamber member 320. The shaft 354 can be formed integrally or mechanically coupled with the chamber member 320. The shaft 354 can contain a hollow space. An end face of the second rim 384 can contact a rotation surface 322a of the chamber member 320 that can be similar to the rotation surface 312. The second rim 384 can be rotatably mounted on an outer surface of the shaft 354. A lubrication space 374c can be disposed between an inner surface of the second rim 384 and the outer surface of the shaft 354. A lubrication line 372c of the lubrication system 370 can extend through at least a portion of the shaft 354 such that a lubricant can flow through the lubrication line 372 and into the lubrication space 374c.

A second compound rim gear 390 can be disposed within the gearbox 300 between the first compound rim gear 380 and the second gear 344. The second compound rim gear 390 can include a third rim 392 coaxially coupled with a fourth rim 394 by a faceplate 396. One of the third and fourth rims 392, 394 can be larger in diameter than the other rim. The gear teeth of the fourth rim 394 can be meshed with the gear teeth of the second rim 384 and thereby transmit rotational motion and energy between the first and second compound rim gears 380, 390. The gear teeth of the third rim 392 can be meshed with the gear teeth of the second gear 344.

An end face of the third rim 392 and an end face of the fourth rim 394 can be coupled with the faceplate 396. In some embodiments, each of the third and fourth rims 392, 394 includes a faceplate and the faceplates are coupled together to form the compound rim gear 390. In some embodiments, the third and fourth rims 392, 394 can be formed (e.g., cast and/or machined) of a monolithic structure with the faceplate 396.

The third rim 392 can be rotatably mounted on a shaft 362, similar to the shaft 332. The shaft 362 can extend from the first chamber member 310. The shaft 362 can contain a hollow space. An end face of the third rim 392 can contact a rotation surface 312c of the chamber member 310 that can be similar to the rotation surface 312. The shaft 362 can be formed integrally or mechanically coupled with the chamber member 310. The shaft 362 can extend through an aperture 397 of the faceplate 396. The aperture 397 can be sized such that it can provide additional stability to the compound rim gear 390 during rotation by slidingly engaging the faceplate 396. Alternatively, the faceplate 396 is continuous without an aperture 397. In other embodiments, a distal end of the shaft 362 contacts a surface of the faceplate 396 to provide stability thereto and/or prevent deflection thereof.

A lubrication space 374d of the third rim 392 can be disposed between an inner surface of the third rim 392 and the outer surface of the shaft 362. A lubrication line 372d of the lubrication system 370 can extend through at least a portion of the shaft 362 such that a lubricant can flow through the lubrication line 372d and into the lubrication space 374d.

The fourth rim 394 can be rotatably mounted on a shaft 364, similar to the shaft 260. The shaft 364 can extend from the second chamber member 320. An end face of the fourth rim 394 can contact a rotation surface 322b of the chamber member 310 that can be similar to the rotation surface 312. The fourth rim 394 can be rotatably mounted on an outer surface of the shaft 364. A lubrication space 374e can be disposed between an inner surface of the fourth rim 394 and the outer surface of the shaft 364. A lubrication line 372e of the lubrication system 370 can extend through at least a portion of the shaft 364 such that a lubricant can flow through the lubrication line 372d and into the lubrication space 374d.

FIGS. 4A-4D illustrate another embodiment of the present disclosure in the form of a gearbox 400. The gearbox 400 is similar to the gearbox 300, with the addition of the features and layout differences noted below. The gearbox 400 can comprise a first chamber member 410, a second chamber member 420, and at least one intermediate chamber member disposed between the first and second chamber members 410, 420. For example, the gearbox 400 can include first intermediate chamber member 415 and second intermediate chamber member 416. The first, second, and first and second intermediate chamber members 410, 420, 415, 416 can fully enclose the internal components of the gearbox 400. Alternatively, the chamber members 410, 420, 415, 416 can leave the gearbox 400 open on one or more ends. An input shaft 430 and an output shaft 440 can extend from the gearbox 400, such as through the walls of either of the first and second chamber members 410, 420. As illustrated, the input shaft 430 extends through the first chamber member 410 and the output shaft extends through the second chamber member 420. The input shaft 430 can be used in a conventional manner such as receiving rotational motion and energy from an engine, or the like, and translating that rotational motion through the gearbox 400 to the output shaft 440, similar to the gearboxes 200 and 300. The gearbox 400 can be either a step-up or a step-down transmission, depending on the diameters the gears of the gearbox 400.

The input shaft 430 can be coupled with a first gear 434 and have a structure similar to the input shaft 330. The first gear 434 can be a rim gear with a faceplate 436 and be similar in structure to the first gear 334. A first end 430a of the input shaft 430 can be coaxially coupled with the faceplate 436 such that the first gear 434 can rotate with the input shaft 430. A second end 430b of the input shaft 430 can extend through an aperture 410a of the first chamber member 410.

The first gear 434 can be rotatably mounted on a shaft 432, similar to the shaft 332. The shaft 432 can extend from the first intermediate chamber member 415. A distal end 432a of the shaft 432 can extend adjacent to and/or in contact with the faceplate 436. The shaft 432 can contain a hollow space.

The first gear 434 can be rotatably mounted on an outer surface of the shaft 432. A lubrication space 474 can be disposed between an inner surface of the first gear 434 and the outer surface of the shaft 432. In some embodiments, the lubricant delivered through a lubrication line can extend between the distal end 432a of the shaft 432 and the faceplate 436. A lubrication line (not shown) of a lubrication system (not shown) can extend through at least a portion of the shaft 432 such that a lubricant can flow into the lubrication space to lubricate the interface of the first gear 434 and the shaft 432. Similar to the lubrication system 370, the lubrication system of the gearbox 400 can recapture lubricant as it seeps from out of the lubrication space 474 or any other lubrication space of any of the gears of the gearbox 400. The collected lubricant can be recirculated through the lubrication system. For example, the enclosure of the first and second chamber members 410, 420 can include a drain for collecting the lubricant. In some embodiments, an internal or external reservoir connected with the drain can store the lubricant until it is recirculated through the lubrication lines by the lubrication system.

A first end face 431 of the first gear 434 can contact a rotation surface 412a of the first chamber member 410. A second end face of the first gear 434 can contact a rotation surface 412b of the first intermediate chamber member 415. The rotation surfaces 412a, 412b can be honed, include a bearing or bushing, and/or include a lubrication line, similar to the rotation surface 312 and the lubrication line 373. The rotation surfaces 412a, 412b can also function to maintain the position of the first gear 434 on the shaft 432.

The output shaft 440 can be coupled with a second gear 444. The second gear 444 can be a rim gear. The second gear 444 can include a faceplate 446 coupled with an end face of the second gear 444. The output shaft 440 can be coupled with the faceplate 446 at one end such that the second gear 444 can rotate together with the output shaft 440. An opposite end of the output shaft 440 can extend through an aperture 420a of the second chamber member 420.

The second gear 444 can be rotatably mounted on a shaft 442, similar to the shaft 342. The shaft 442 can extend from either of the second intermediate and second chamber members 416, 420. As illustrated, the shaft 442 extends from the second intermediate chamber member 416 and is formed integrally therewith. In other embodiments, the shaft 442 is mechanically coupled with the second intermediate chamber member 416. A distal end of the shaft 442 can extend adjacent to and/or in contact with the faceplate 446. The shaft 442 can contain a hollow space. The second gear 444 can be rotatably mounted on an outer surface of the shaft 442.

A lubrication space can be disposed between an inner surface of the second gear 444 and the outer surface of the shaft 442 and/or between the distal end of the shaft 442 and the faceplate 446. A lubrication line of a lubrication system can extend through at least a portion of the shaft 442 such that a lubricant can flow into the lubrication space to lubricate the interface of the second gear 444 and the shaft 442.

Similar to the first gear 434, the second gear 444 can include first and second end faces that can contact rotation surfaces, similar to rotation surface 312, on each of the second intermediate and second chamber members 416, 420. The rotation surfaces can be honed, include a bearing or bushing, and/or include a lubrication line, similar to the lubrication line 373. The rotation surfaces can maintain the position of the second gear 444 on the shaft 442.

One or more supporting shafts or posts can extend from either of the second intermediate and second chamber members 416, 420 to provide support to the faceplate 446 of the second gear 444. For example, a support shaft 441 can extend from the second intermediate chamber member 416. A distal end of the support shaft 441 can be adjacent to and/or in contact with the faceplate 446. In some embodiments, the support shaft 441 can include a lubrication line for delivering a lubricant to the interface of the faceplate 446 and the support shaft 441. The support shaft 441 can function to maintain the second gear in position on the shaft 442. The support shaft 441 can function to prevent deflection of the faceplate 446. For example, where the second gear 444 is large in diameter, the faceplate may deflect easily due to lateral forces on the shaft 440. Positioning the support shaft 441 adjacent to and/or in contact with the faceplate 446 can prevent or minimize such deflection.

A first compound rim gear 480 can be disposed within the gearbox 400. The first compound rim gear 480 can include a first rim 482 and a second rim 484, each comprising outwardly facing gear teeth. The first and second rims 482, 484 can be fixedly coupled to rotate together and about the same axis of rotation. For example, an end face of the first rim 482 can be coupled with a faceplate 485. An end face of the second rim 484 can be coupled with a faceplate 487. An extension shaft or sleeve 486 can extend from the faceplate 485 and couple with the faceplate 487 or directly with the second rim 484. In some embodiments, the first rim 482 is disposed on one side of the first intermediate chamber member 415 and the second rim 484 is disposed on the opposite side of the first intermediate chamber member 415. The sleeve 486 can extend through an aperture 415a of the first intermediate chamber member 415 to couple together the first and second rims 482, 484. In some embodiments, the first intermediate chamber member 415 can include at least two pieces that split the aperture 415a and can be assembled around the sleeve 486. In some embodiments, the first and second rims 482, 484 can be assembled with the sleeve 486 extended through the aperture 415a of the first intermediate chamber member 415.

The gear teeth of the first compound rim gear 480 can be meshed with the gear teeth of adjacent gears and thereby transmit rotational motion and energy. For example, the gear teeth of the first rim 482 can be meshed with the gear teeth of the first gear 434. The gear teeth of the second rim 484 can be meshed with gear teeth of a second compound rim gear 490. A diameter of the first rim 482 can be different from a diameter of the second rim 484. Accordingly, the rotation of the first compound rim gear 480 can act to step-up or step-down the rotational motion and energy input into the first compound rim gear 480.

The first rim 482 can be rotatably mounted on a shaft 452, similar to the shaft 352. The shaft 452 can extend from either of the first chamber member 410 and first intermediate chamber member 415. As illustrated, a distal end 452a of the shaft 452 can extend adjacent to and/or in contact with the faceplate 485. The shaft 452 can contain a hollow space. The first rim 482 can be rotatably mounted on an outer surface of the shaft 452. A lubrication space can be disposed between an inner surface of the first rim 482 and the outer surface of the shaft 452 and/or between the distal end of the shaft 452 and the faceplate 485. A lubrication line of the lubrication system can extend through at least a portion of the shaft 452 such that a lubricant can flow through the lubrication line and into the lubrication space. In some embodiments, a support shaft 451, similar to the support shaft 441 described above, can extend from either of the first and intermediate chamber members 410, 415 to provide support to the faceplate 485.

The second rim 484 can be rotatably mounted on a shaft 454, similar to the shaft 354. The shaft 454 can extend from either of the first or second intermediate chamber members 415, 416. The shaft 454 can contain a hollow space. The second rim 484 can be rotatably mounted on an outer surface of the shaft 454. A lubrication space can be disposed between an inner surface of the second rim 484 and the outer surface of the shaft 454. A lubrication line of the lubrication system can extend through at least a portion of the shaft 454 such that a lubricant can flow through the lubrication line and into the lubrication space.

The first and second rims 482, 484 can each include first and second end faces. One or both of the end faces that can contact rotation surfaces (similar to the rotation surfaces described above) on the first, first intermediate and second intermediate chamber members 410, 415, 416. The rotation surfaces can be honed, include a bearing or bushing and/or lubrication line. The rotation surfaces can maintain the positions of the first and second rims 482, 484 on the shafts 452, 454.

The second compound rim gear 490 can be disposed within the gearbox 400. The second compound rim gear 490 can include a third rim 492 and a fourth rim 494, each comprising outwardly facing gear teeth. The first and second rims 492, 494 can be fixedly coupled to rotate together and about the same axis of rotation. For example, an end face of the third rim 492 can be coupled with a faceplate 495. A sleeve 496 can extend from the faceplate 495 and couple with the fourth rim 494. In some embodiments, the fourth rim 394 includes a faceplate 497 that can couple with the sleeve 496. In some embodiments, the third rim 492 is disposed on one side of the second intermediate chamber member 416 and the second rim is disposed on the opposite side of the second intermediate chamber member 416. The sleeve 496 can extend through an aperture 416a of the second intermediate chamber member 416 to couple together the first and second rims 492, 494. In some embodiments, the second intermediate chamber member 416 can include at least two pieces that can split the aperture 416a and be assembled around the sleeve 496. In some embodiments, the first and second rims 492, 494 can be assembled with the sleeve 496 extended through the aperture of the second intermediate chamber member 416.

The gear teeth of the second compound rim gear 490 can be meshed with the gear teeth of adjacent gears and thereby transmit rotational motion and energy. For example, the gear teeth of the third rim 492 can be meshed with the gear teeth of first compound rim gear 480. The gear teeth of the fourth rim 494 can be meshed with the gear teeth of the second gear 444.

The third rim 492 can be rotatably mounted on a shaft 462, similar to the shaft 352. The shaft 462 can extend from either of the first or second intermediate chamber members 415, 416. As illustrated, the shaft 462 extends from the first intermediate chamber member 415. A distal end 462a of the shaft 462 can extend adjacent to and/or in contact with the faceplate 495. The sleeve 496 can contain a hollow space. The third rim 492 can be rotatably mounted on an outer surface of the shaft 462. A lubrication space can be disposed between an inner surface of the third rim 492 and the outer surface of the shaft 462 and/or between the distal end of the shaft 462 and the faceplate 495. The lubrication line of the lubrication system can extend through at least a portion of the shaft 462 such that a lubricant can flow through the lubrication line and into the lubrication space. In some embodiments, a support shaft 461, similar to the support shaft 441 described above, can extend from either of the first and second intermediate chamber members 415, 416 to provide support to the faceplate 495.

The fourth rim 494 can be rotatably mounted on a shaft 464, similar to the shaft 462. The shaft 464 can extend from either of the second or second intermediate chamber members 416, 420. The shaft 464 can contain a hollow space. The fourth rim 494 can be rotatably mounted on an outer surface of the shaft 464. A lubrication space can be disposed between an inner surface of the fourth rim 494 and the outer surface of the shaft 464. A lubrication line of the lubrication system can extend through at least a portion of the shaft 464 such that a lubricant can flow through the lubrication line and into the lubrication space. In some embodiments, a support shaft 465, similar to the support shafts described above, can extend from either of the second and second intermediate chamber members 416, 420 to provide support to the faceplate 497.

The third and fourth rims 492, 494 can each include first and second end faces. One or both of the end faces that can contact rotation surfaces 412c, 412d, 412e, 412f on the first intermediate, second intermediate or second chamber members 415, 416, 420. The rotation surfaces 412c, 412d, 412e, 412f can be similar to the rotation surface 312 described above. The rotation surfaces 412c, 412d, 412e, 412f can maintain the positions of the third and fourth rims 492, 494 on the shafts 462, 464.

Figure 5B:
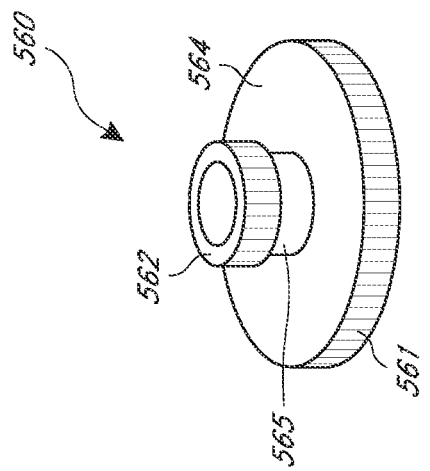
FIG. 5B is a perspective view of a compound rim gear.
Figure 5A:
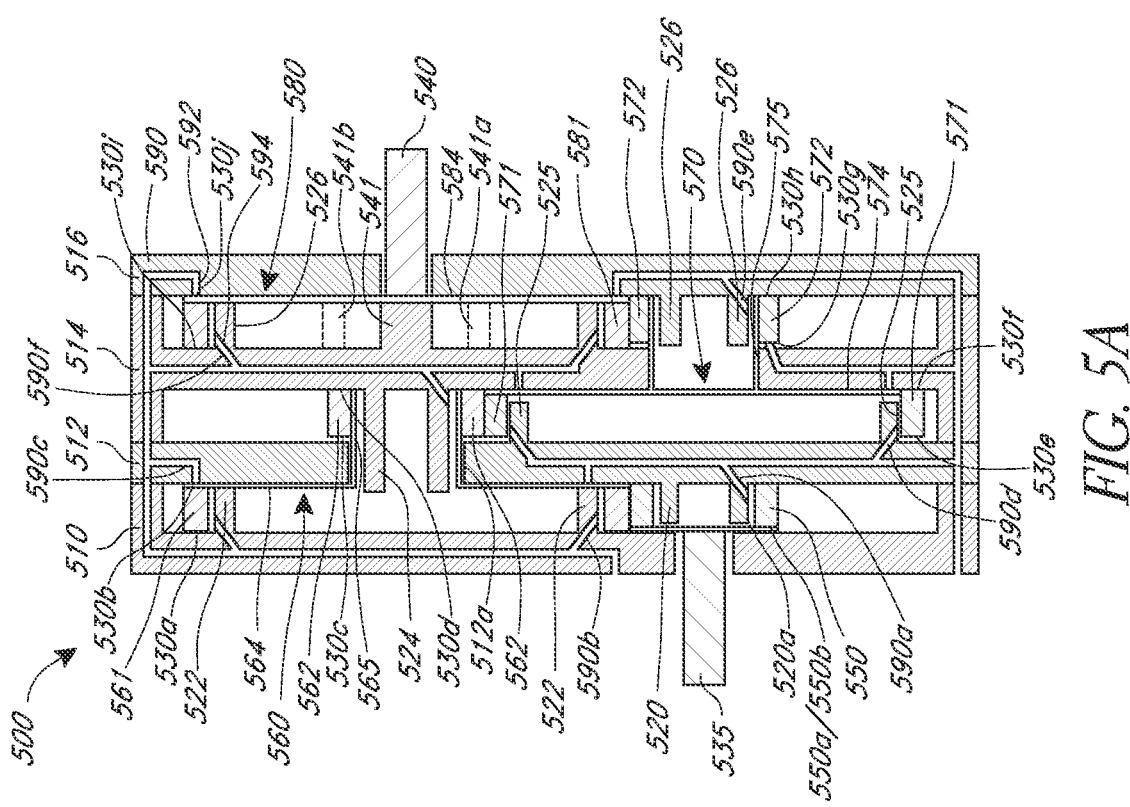
FIG. 5A is a cross-sectional view of another embodiment of a gearbox.

FIGS. 5A and 5B illustrate another embodiment of the present disclosure in the form of a gearbox 500. The gearbox 500 can comprise multiple chamber members, depending on the number of gearing stages between an input shaft 535 and an output shaft 540. For example, the gearbox 500 can include first, second, third and fourth chamber members 510, 512, 514, and 516, respectively.

An input shaft 535 can extend through an aperture of the first chamber member 510. The input shaft 535 can be coupled with a rim gear 550. The rim gear 550 can include a faceplate 550a coupled with an outer end 550b of rim gear 550. The input shaft 535 can be coupled with the faceplate 550a, as described above with reference to input shaft 330. The rim gear 550 can be rotatably mounted on a shaft 520 extending from the second chamber member 512. A lubrication line 590a can extend through the shaft 520 to a lubrication space 520a between an outer surface of the shaft 520 and an interior surface of the rim gear 550. The rim gear 550 can comprise gear teeth meshed with gear teeth of a compound rim gear 560.

The compound rim gear 560 can include a first rim 561 and a second rim 562. The first and second rims 561, 562 can be coupled together through a faceplate 564. In some embodiments, the faceplate 564 can further comprise a sleeve or neck portion 565. The neck portion 565 can extend through an aperture 512a of the second chamber member 512. The second rim 562 can be disposed on an opposite side of the second chamber member 512 as the first rim 561. The first rim 561 can be rotatably mounted on a shaft 522 extending from the first chamber member 510. In some embodiments, the shaft 522 can extend from the second chamber member 512. The configuration can require extension of the length of the neck portion 565 through the aperture 512a. The second rim 562 can be rotatably mounted on a third shaft 524 extending from the third chamber member 514. In some embodiments, the third shaft 524 can extend from the first or second chamber members 510, 512. A lubrication line 590b of a lubrication system 590 can extend through the shafts 522, 524 to a lubrication space between the shafts 522, 524 and the first and second rims 561, 562. In some embodiments, the shaft 524 can extend into or through the aperture 512a of the second chamber member 512. This configuration can provide additional stability to the compound rim gear 560 during rotation.

The first and second chamber members 510, 512 can be spaced apart such that the rim gear 550 and/or the first rim 561 can be held substantially in place by rotation surfaces 530a, 530b of the first and second chamber members 510, 512, respectively. Similarly, the second rim 562 of the compound rim gear 560 can be disposed between the second chamber member 512 and the third chamber member 514. The second rim 562 can be held in place between interior, rotation surfaces 530c, 530d of the second and third chamber members 512, 514, respectively. All of the rotational surfaces 530 described herein can be similar to the rotation surfaces (e.g., 112, 212, 312) described above and can include a circular shape corresponding to a gear or rim shape, honed surfaces, a lubrication 590c and/or bearings. Alternatively, or in addition, the first compound rim gear 560 can be held in place on the shaft 522, 524 by the rotation surfaces 530b, 530c of the second chamber member 512. For example, end faces of the first and second rims 561, 562 can be coupled with the opposite rotation surfaces 530b, 530c of the second chamber member 512.

In some embodiments, the gear teeth of the second rim 562 can be meshed with gear teeth of a second compound rim gear 570. The second compound rim gear 570 can include a structure similar to that of the first compound rim gear 560. The second compound rim gear 570 can include a first rim 571 coupled with a faceplate 574. A second rim 572 can be coupled with the faceplate 574 such that the first and second rims 571, 572 are coupled to rotate together. In some embodiments, the faceplate 574 includes a sleeve or neck portion 575 on which the second rim 572 is disposed. In some embodiments, the faceplate 574 extends across the first rim 571 with the neck portion 575 extending from the faceplate 574 in a perpendicular direction. For example, the neck portion 575 can be mechanically coupled with the faceplate 574 (e.g., welded or coupled with threaded ends).

The first rim 571 can be rotatably mounted on a fourth shaft 525 of the second chamber member 512. The lubrication line 590d can extend through the fourth shaft 525 to a lubrication space between the fourth shaft 525 and the first rim 571. In some embodiments, the fourth shaft 525 can extend from the third chamber member 514. A fifth shaft 526 can extend from the fourth chamber member 516. The second rim 572 can be rotatably mounted on the fifth shaft 526. The lubrication line 590e can extend through the fifth shaft 526 and provide lubricant to a lubrication space between the fifth shaft 526 and the second rim 572. In some other embodiments, the fifth shaft 526 can extend from the second chamber member 512 through an aperture of the third chamber member 514.

The first rim 571 can be disposed on an opposite side of the third chamber member 514 from the second rim 572. The first rim 571 can be held substantially in place between the rotational surfaces 530e, 530f of the second chamber member 512 and the third chamber member 514, respectively. Similarly, the second rim 572 can be held in place between rotational surfaces 530g, 530h of the third chamber member 514 and the fourth chamber member 516, respectively such that the second rim 572 is held substantially in place on the shaft 526. Alternatively, or in addition, the second compound rim gear can be held in place on opposite interior, rotational surfaces 530f, 530g of the third chamber member 514. For example, end faces of the first and second rims 571, 572 can be coupled with the opposite interior, rotational surfaces 530f, 530g of the third chamber member 514.

Gear teeth of the second rim 572 can be meshed with gear teeth of a second rim gear 580. The second rim gear 580 can include a rim 581 coupled with a faceplate 584 rotatably mounted on a sixth shaft 526. The sixth shaft 526 can extend from either the third or fourth chamber members 514, 516. The lubricant line 590f can extend through the shaft 526 to deliver lubricant to a lubrication space between the rim 581 and the shaft 526. The third and fourth chamber members 514, 516 can be spaced apart such that the rim gear 580 can be held substantially in place by rotational surfaces 530i, 530j of the third and fourth chamber members 514, 516. In some embodiments, a support shaft (not shown), similar to the support shaft 461 described above, can extend from either of the third or fourth chamber members 514, 516 to provide support to the faceplate 584 to aid in the prevention of deflection.

An output shaft 540 can be rotatably mounted to the faceplate 584 of the second rim gear 580. Rotation of the input shaft 535 can correspond to the rotation of the output shaft 540 through the mesh of the gears of the gearbox 500. Selection of the diameters of the first and second rim gears 550, 580 and compound rim gears 560, 570 can determine the gear ratio between the input shaft 535 and the output shaft 540. In some embodiments, the third chamber member 514 can include a support shaft 541, similar to the support shaft 341. The support shaft 541 can extend adjacent to and/or in contact with the faceplate 584. In some embodiments, the support shaft 541 can include a lubrication line (not shown) for delivering a lubricant to the interface of the faceplate 584 and the support shaft 541. In some embodiments, the faceplate 584 may deflect easily due to axially aligned forces on the shaft 540. The support shaft 541 can be axially aligned with the output shaft 540 and spaced adjacent the faceplate 584 or shaft 540 and thereby substantially prevent deflection of the faceplate 584 towards the third chamber member 514. In other embodiments, one or more support shafts 541a, 541b can extend from the third chamber member 514 in a manner similar to the support shaft 541.

These support shafts 541a, 541b can be radially offset (e.g., out of alignment) from the output shaft 540 and function in a similar manner as the support shaft 541.

Conventional Valvetrain Systems

Figure 6A:
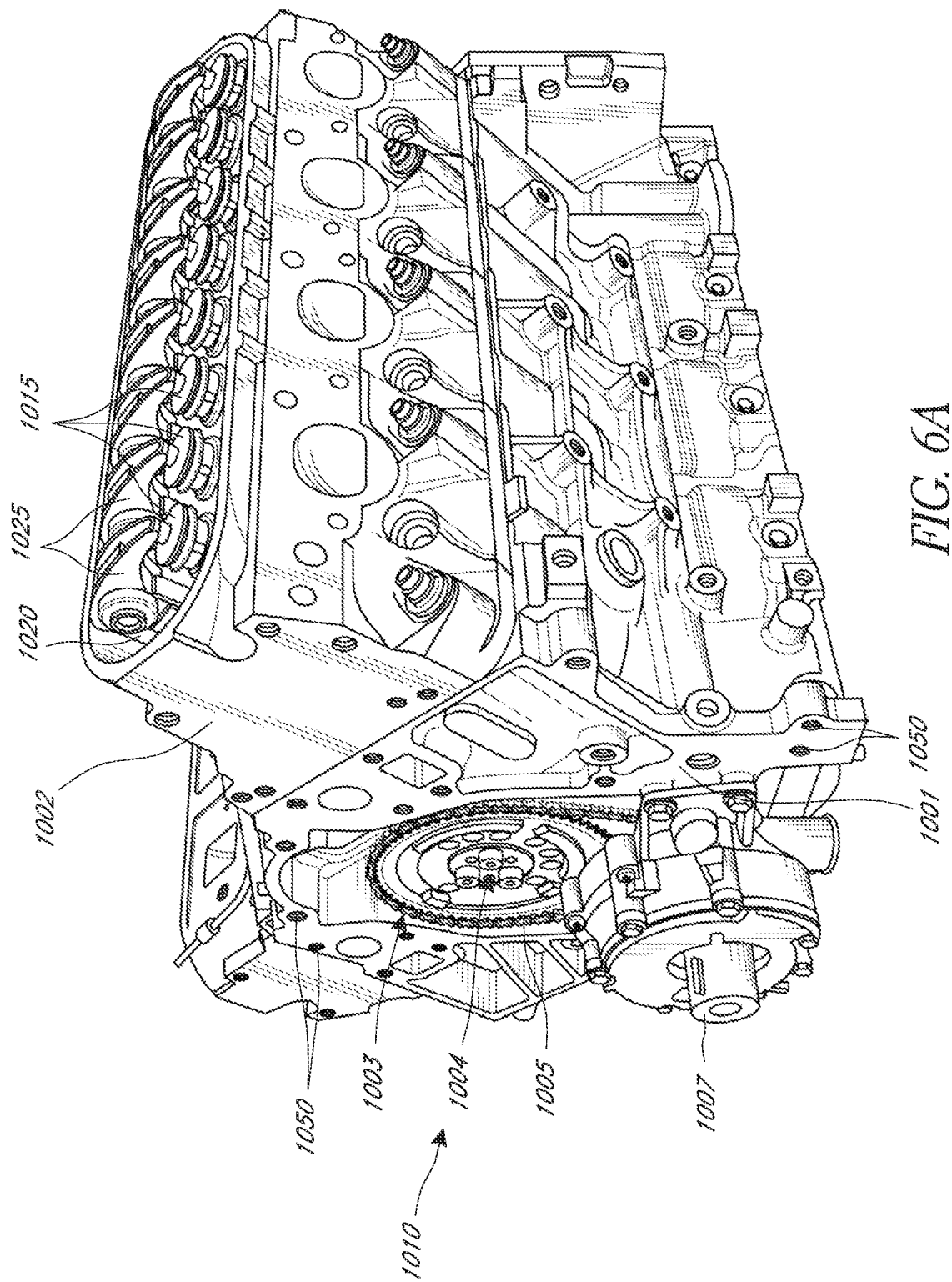
FIG. 6A is perspective view of a conventional push-rod type engine comprising a valvetrain.
Figure 6B:
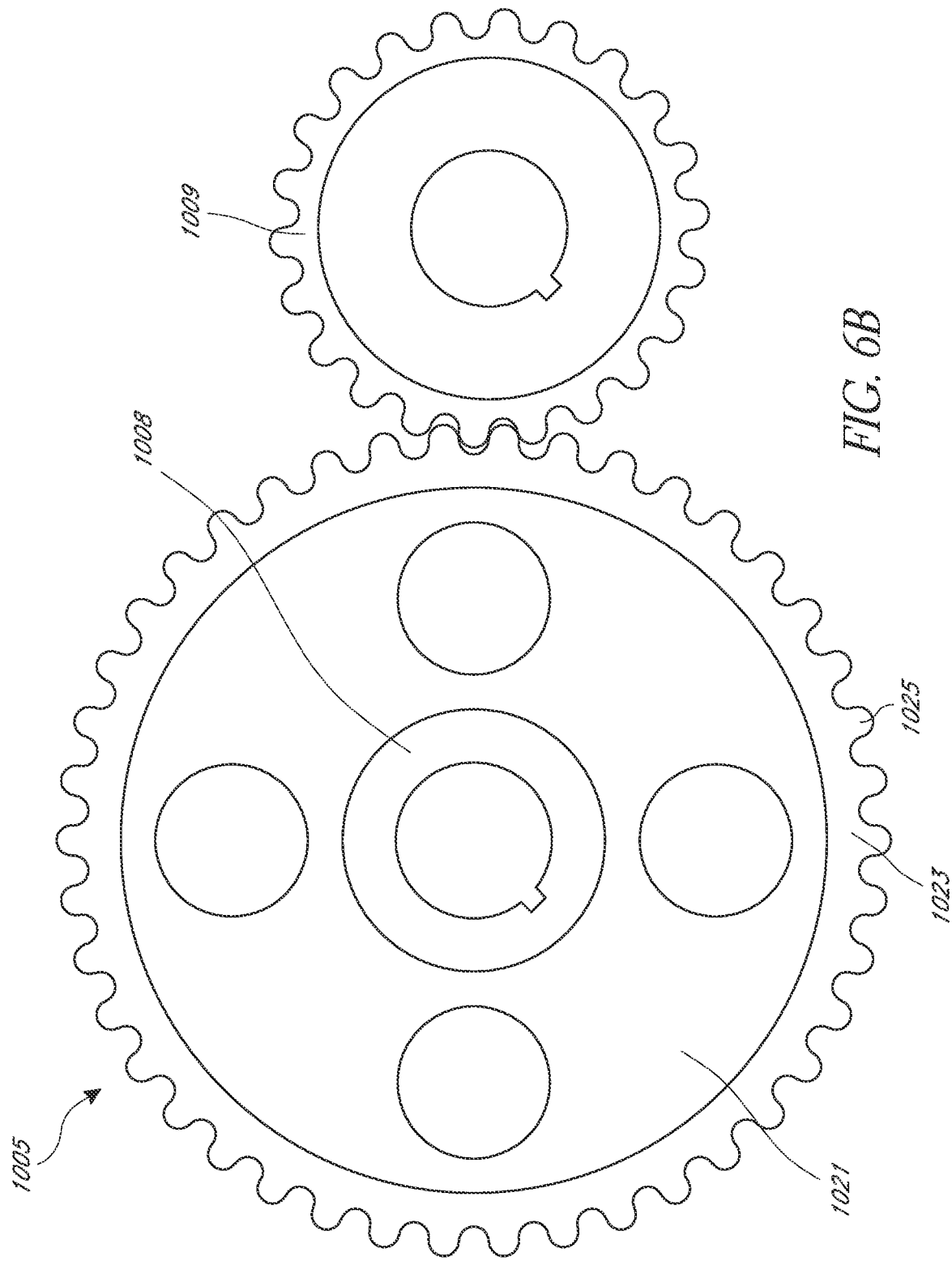
FIG. 6B is a top view of a pair of conventional timing gears.
Figure 7:
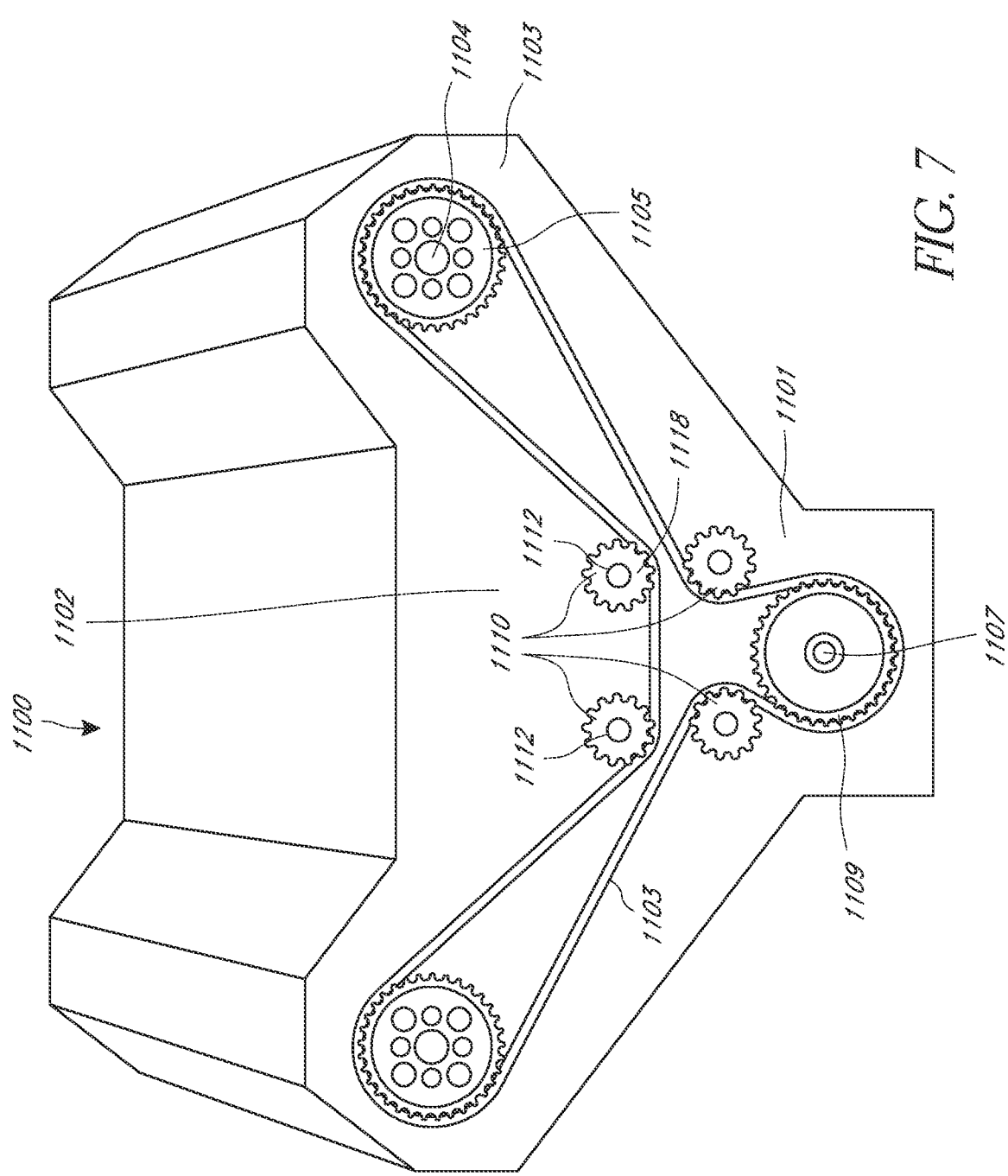
FIG. 7 is a schematic illustration of a conventional overhead valve type engine using a serpentine timing chain as a valvetrain.
Figure 8:
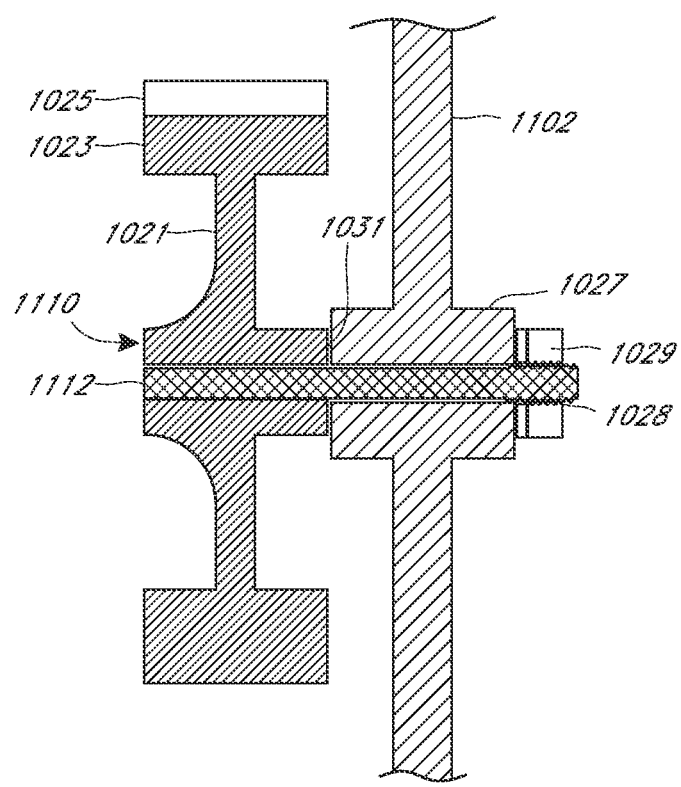
FIG. 8 is a cross-sectional view showing a conventional idler gear with a reinforced section of the engine housing wall.
Figure 9:
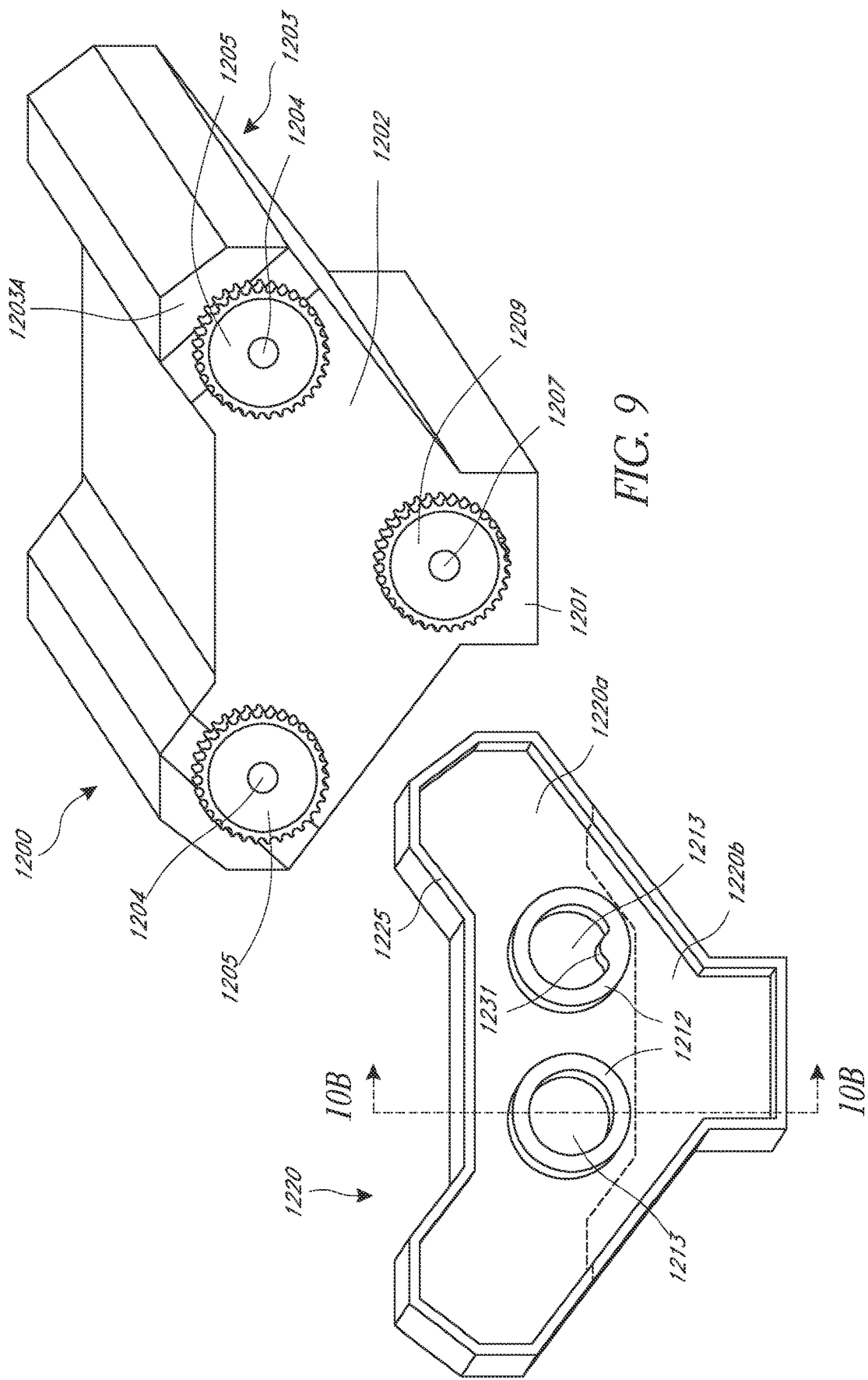
FIG. 9 is a schematic, exploded illustration of parts of an embodiment of a kit for replacing a conventional drivetrain of an engine including a chamber member and two idler gear shafts configured to support two timing idler gears.

With reference to FIGS. 6-8, a conventional valvetrain performs the function of transmitting torque from a crankshaft to a camshaft and providing proper timing between the crankshaft and the valve system in an internal combustion engine. However, prior art valvetrains have numerous disadvantages that are addressed by embodiments of the present disclosure. While certain disadvantages of the prior art devices of FIGS. 6-8 are described below, such description is illustrative of some of the known disadvantages, but is not exhaustive.

FIG. 6A illustrates a prior art Chevrolet LS engine 1010. The engine 1010 includes a block 1001 and cylinder heads 1002 for each bank of cylinders. For purposes of clarity, other components of the engine 1010, such as the intake manifold and the exhaust manifold, have been omitted. The valvetrain of the engine 1010 includes a single camshaft (not shown) positioned within the block 1001 at a location below the deck of the cylinder heads 1002. The valvetrain also includes multiple overhead valves 1015 positioned within the cylinder head 1002 with a single intake valve and a single exhaust valve per cylinder of the engine 1010. In order to actuate the valves 1015 via the camshaft, the valvetrain includes a series of lifters (not shown), pushrods 1020, and rocker arms 1025 operably coupling the camshaft to the valves 1015. This series of valvetrain components run from the block 1001 to the cylinder heads 1002 and thus present a significant amount of mass of the valvetrain system.

As shown along a front side of the engine 1010, the single camshaft is driven by the crankshaft via a chain 1003 coupled to a crank gear (not shown) attached to the crankshaft and a cam gear 1005 attached to the camshaft, which is positioned within the block 1001. The front side of the engine also includes a plurality of fastener holes 1050 designed to receive and engage fasteners for attachment of various components, such as a cover (not shown), over the chain 1003 and gear 1005, as well as accessories such as an alternator (not shown), power steering pump (not shown), air conditioner compressor (not shown) and the like. Generally, the fastener holes 1050 are designed to engage threads of a screw, bolt, stud or the like.

FIG. 6B is a top view of a conventional timing gear set such as those shown in FIG. 6A. The timing gear set includes a crank gear 1009 mounted on a crankshaft and a conventional timing gear 1005. The timing gear 1005 comprises a hub 1008 mounted on a shaft, a rim 1023 on which a plurality of gear teeth 1025 are mounted, and a webbing 1021 configured to connect the hub 1008 to the rim 1023. One of the disadvantages of timing gear 1005 is the additional weight and inertia from the hub 1008 and webbing 1021.

In some embodiments of the present disclosure described below, one object is to provide a timing idler gear comprising a "rim gear"; a gear without a hub 1008 connected to the gear teeth with webbing 1021. Optionally, a rim gear is provided without some or all of the webbing to reduce weight and inertia. While the benefit of increased engine efficiency can be marginal for each individual gear, the reduced weight and inertia across an entire valvetrain comprising a plurality of gears can be a significant factor in increased efficiency.

FIG. 7 is an illustration of a conventional overhead cam type engine using a serpentine timing chain or belt 1103 to transfer torque from the crankshaft 1107 to the camshaft 1104. The engine includes an engine body 1100 comprising a head 1103, an engine block 1101, and an engine housing wall 1102. Affixed to engine housing 1102 are a plurality of idler gear shafts 1112. Idler gears 1110 are rotatably mounted to the idler gear shafts 1112.

Additional elements not shown include a tensioning mechanism to ensure that the lengthy timing chain 1103 maintains sufficient tension to remain on the geartrain. Serpentine chains and belts take up a substantial amount of space particularly on the exterior of an engine. There can be insufficient space on the exterior of the engine for mounting other engine-powered accessories to the engine. These accessories can be displaced to the sides of the engine and/or to locations off of the engine in a less than optimal use of space.

FIG. 8 is a section view showing an idler gear 1110 with a reinforced section 1027 required to mount an idler gear shaft to engine housing wall 1102. Idler gear 1110 is fixedly attached to idler shaft 1112. The idler shaft 1112 is rotatably mounted to engine housing wall 1102. However, in order to support the weight and force placed on the idler shaft 1112, the engine housing wall is reinforced such as in the manner shown in FIG. 8. Reinforced section 1027 enables the engine housing wall 1112 to support this additional force. One aspect of some embodiments of the present disclosure includes the realization that an idler shaft need not be directly mounted to the engine housing wall and instead can be mounted to a chamber member.

Conversion Kit for Replacing an Existing Valvetrain

FIG. 10 illustrates an embodiment of a conversion kit providing a replacement valvetrain for synchronizing the rotational movement of an overhead cam camshaft 1204 with the crankshaft 1207 using a timing idler gear shaft 1212 coupled to a chamber member 1220. As illustrated in FIG. 10, an engine 1200 comprises an engine block 1201, at least one cylinder head 1203, and an engine housing wall 1202. The engine 1200 can be designed as a cam-in-block engine that is converted into an overhead cam engine using the conversion kit. In some embodiments, engine 1200 has been retrofitted with an overhead cam head 1203 and valve cover 1203A.

An overhead camshaft 1204 is supported by the head 1203 and extends outwardly therefrom. A cam gear 1205 is mounted to the end of the camshaft 1204. The camshaft 1204 can be rotatably seated in the head 1203 and configured to control the engine valve timing system in accordance with principles of operation of overhead cam valve systems which are well-known in the art. In some embodiments, the camshaft 1204 extends through engine housing wall 1202 to an exterior side of the engine 1200.

The engine 1200 additionally comprises a crankshaft 1207 coupled with a crank gear 1209. In some embodiments the crank gear 1209 is fixedly coupled to the crankshaft 1207. Optionally, the crank gear and the crankshaft extend from the housing wall 1202 of engine 1200. Crankshaft 1207 operates to convert the linear motion of pistons within the engine into rotational energy as is well known in the art.

In some embodiments of the conversion kit, the chamber member 1220 can comprise a bracket for spacing the chamber member 1220 a predetermined distance from the engine housing 1202. Optionally, the bracket comprises a peripheral wall 1225. Optionally, peripheral wall 1225 extends all around the perimeter of the chamber member 1220. Optionally, the peripheral walls 1225 extends away from an interior surface 1223 of the chamber member 1220. Optionally, the peripheral wall 1225 is configured to conform to the contours of the engine housing walls 1202. Optionally, when in the fully assembled state, the chamber member 1220 is mounted to engine 1200 to create a chamber 1235 that encompasses the timing idler gear. Optionally, the profile of the chamber member 1220 is configured to match or substantially match the profile of the engine housing wall 1202. Optionally, the chamber member 1220 is configured to overlay the timing geartrain and or to create a chamber encapsulating the timing idler gear between the engine housing wall 1202 and the chamber member 1220.

In some embodiments, the chamber member 1220 comprises a top portion 1220a and a bottom portion 1220b. Optionally, the bottom portion 1220b is configured to comprise an oil reservoir 1280 as discussed below in reference to FIG. 11A. Optionally, both portions 1220a,b can be assembled with the engine 1200. Optionally, the bottom portion 1220b is configured to remain assembled with the engine 1200 when the top portion 1220a is removed from the engine 1200 and thereby the oil reservoir 1280 can remain in place while an operator obtains access to the geartrain by removing the top portion 1220a.

In some embodiments of the conversion kit, the chamber member 1220 can comprise an interior surface 1223. Optionally, the interior surface 1223 is substantially flat or in other embodiments it is curved or comprises contours. Optionally, the timing idler gear shaft 1212 can extend from the interior surface 1223. In some instances, this specification refers to a single timing idler gear, but such descriptions are intended to apply to embodiments including other numbers of idler gears, such as embodiments including multiple timing idler gears meshed with one of the crank gear 1209, the cam gear 1205 or another of the timing idler gears.

In some embodiments, the timing idler gear shaft 1212 is formed integrally with the interior surface 1223 to form a monolithic construction of the chamber member 1220. Optionally, the monolithic construction can be cast, wrought, forged, hogged-out or machined. Optionally, the monolithic construction can be case of an aluminum alloy. Optionally, the idler gear shaft 1212 can be mechanically fastened to interior surface 1223 by at least one mechanical fastener including but not limited to screws and bolts. In other embodiments, timing idler shaft 1212 can be welded or otherwise affixed to interior surface 1223. In some embodiments the idler gear shaft 1212 can comprise an interior space 1213. In other embodiments idler gear shaft 1212 can comprise a solid material where the interior space 1213 would otherwise be. In some embodiments of the conversion kit the idler shaft 1212 further comprises a boss 1231, as described further in reference to FIG. 12C.

Figure 10A:
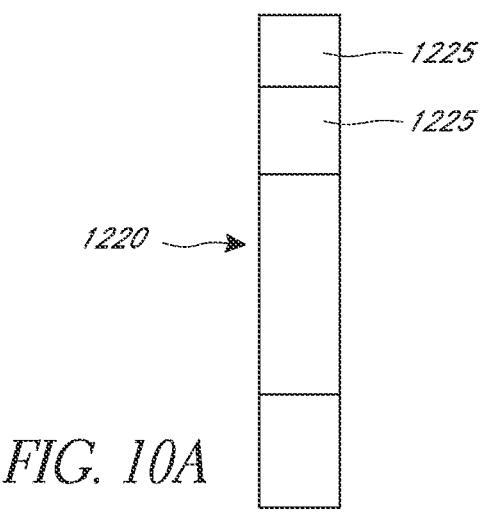
FIG. 10A is a side view of the chamber member of the kit of FIG. 10.
Figure 10B:
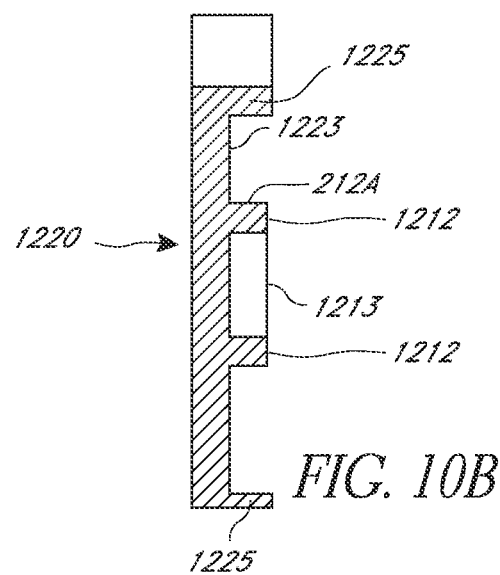
FIG. 10B is a sectional view taken along the line 10C in FIG. 10.

FIG. 10A illustrates a side view of the chamber member 1220 and the peripheral wall 1225. FIG. 10B illustrates a cross-sectional view of chamber member 1220 taken along the line 10C in FIG. 10. In some embodiments chamber member 1220 comprises an idler gear shaft 1212 extending from interior surface 1223. Optionally, the idler shaft 1212 comprises an exterior surface 1212a on which the timing idler gear 1210 is configured to be rotatably coupled.

Figure 10C:
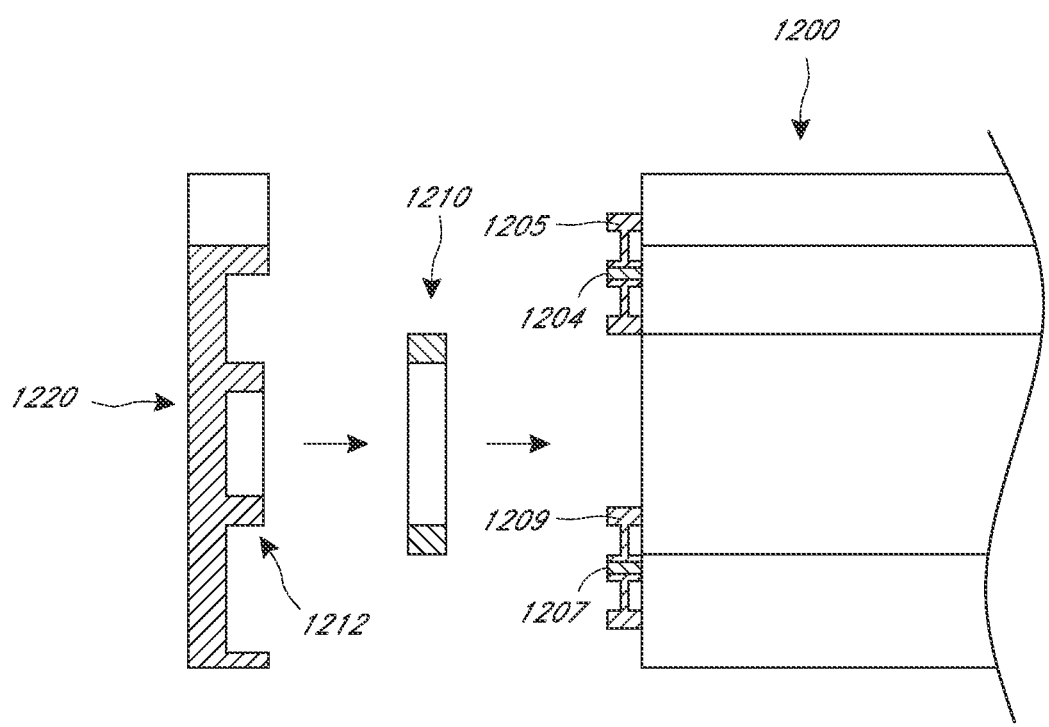
FIG. 10C is a side view of the chamber member of the kit illustrating a partially assembled kit.

FIG. 10C shows a step in assembling the conversion kit comprising the chamber member 1220 and the timing idler gear 1210 with the engine 1200. In some embodiments the idler gear 1210 is configured to be rotatably mounted to the idler shaft 1212. Optionally, the timing idler gear 1210 is configured to be meshed with at least one of the crank gear 1209 or the cam gear 1205. In some embodiments of the conversion kit, the conversion kit comprises more than one timing idler gear 1210 and a complete timing idler geartrain extending between the crank gear 1209 and the cam gear

1205. Optionally, chamber member 1220 comprises a pry slot located proximate the idler gear shaft and configured to aid in the removal of the timing idler gear from the idler shaft.

Figure 10D:
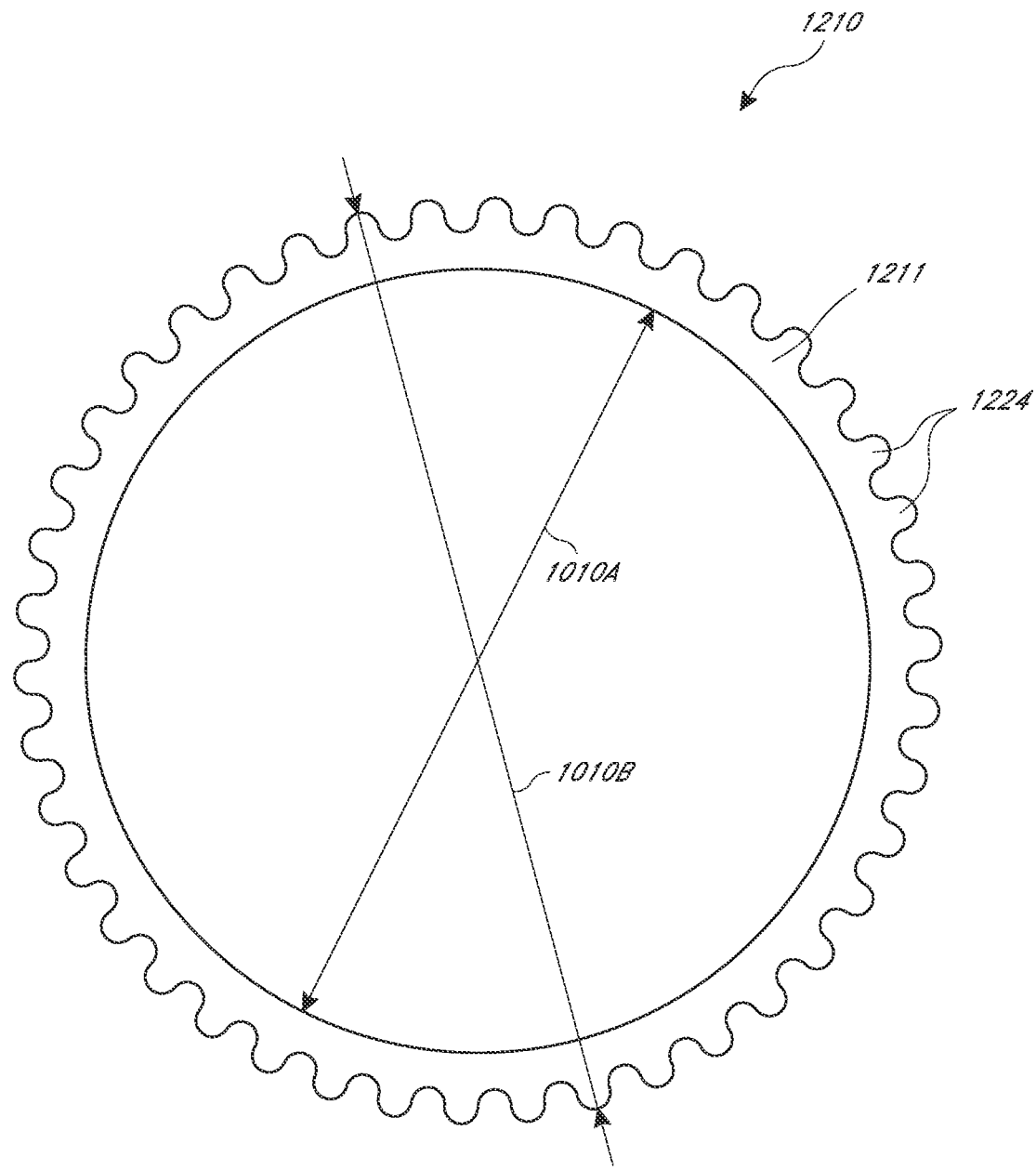
FIG. 10D is a schematic, top view of a timing idler gear comprising a rim gear.

FIG. 10D shows an embodiment of the timing idler gear 1210 comprising a rim gear. The timing idler gear 1210 as described herein can be used with any of the embodiments as described in the present disclosure including the embodiments shown in previous and subsequent figures. Furthermore, each of the applications of the timing idler gear 1210 described herein can comprise a rim gear. Additionally, the timing idler gear 1210 can comprise any type of gear tooth style including spur gear, beveled gear, herringbone gear, etc.

In some embodiments, the rim gear comprises a rim 1211 and a plurality of teeth 1224. Optionally, the rim gear is a gear without a hub and/or without both a hub and a webbing. In some embodiments the rim gear comprises an inside diameter 1010a and an outside diameter 1010b. Optionally, the inside diameter 1010a is equal to or greater than approximately 50% of the outside diameter 1010b. Still in other embodiments, the inside diameter 1010a is equal to or greater than approximately 75% of the outside diameter 1010b. In still other embodiments the inside diameter 1010a is equal to or greater than 90% of the outside diameter 1010b. In still other embodiments the inside diameter 1010a is between approximately 75% and 90% of the outside diameter 1010b. As used herein, the term "rim gear" is intended to mean a gear without a webbing connecting the gear teeth on an outer rim to a hub and/or where the outer rim has an inside diameter that is equal to or greater than approximately 50% of the outside diameter.

Additionally, for the purposes of this specification approximately means within five percentage points of whatever units are being measured. In some embodiments, the rim gear interior diameter 1010a ranges between approximately 40% and 95% of the outside diameter 1010b. In some embodiments, the rim gear interior diameter 1010a ranges between approximately 50% and 90% of the outside diameter 1010b. In other embodiments it ranges between 60% and 90% of outside diameter 1010b. In other embodiments interior diameter 1100a ranges between 70% and 85% of exterior diameter 1010b. In other embodiments of either the rim gear 1210, interior diameter ranges between 80% and 90% of the outside diameter 1010b. In some embodiments, the inside diameter 1010a is approximately 80% of the outside diameter 1010b. In other embodiments, the inside diameter 1010a is approximately 95% of the outside diameter 1010b. In other embodiments, the inside diameter 1010a is approximately 90% of the outside diameter 1010b. In some embodiments, the inside diameter 1010a is approximately 75% of the outside diameter 1010b. In some embodiments, the inside diameter 1010a is approximately 60% of the outside diameter 1010b. In some embodiments, the inside diameter 1010a is approximately 50% of the outside diameter 1010b. In some embodiments, the inside diameter 1010a is approximately 40% of the outside diameter 1010b.

Referring now to FIG. 11A, FIG. 11A is a view of the conversion kit as shown in FIGS. 10A-10E in an assembled state. In FIG. 11A, the engine chamber member 1220 is fastened to engine housing wall 1202 at a plurality of mounting locations (not shown) with the timing idler gear 1210 rotatably coupled to the shaft 1212 and meshed with one of the crank gear 1209 or the cam gear 1205. In some embodiments the chamber member 1220 is mounted to the engine housing 1202 with the idler shaft 1212 extending from the interior surface 1223 towards the housing wall 1202. As discussed below with reference to FIG. 13, the idler shaft 1212 can be mounted extending away from the housing wall 1202 in some embodiments of the current disclosure.

Chamber member 1220 optionally comprises a plurality of mounting locations around a perimeter of the chamber member 1220 that correspond to a plurality of mounting locations on the engine housing walls 1202. Optionally, at least some of the plurality of mounting locations are on a central portion of the chamber member 1220.

In some embodiments, the engine 1200 can also comprise the oil reservoir 1280 containing an oil pump (not shown). Optionally, the oil reservoir 1280 can be the oil reservoir used for collecting lubrication oil circulated to various components within the engine 1200 with a lubrication system (not shown). For example, the oil pump draws oil from the reservoir 1280 and pumps the collected lubricant to various oil galleries, bearings and other sliding components, such as cylinder walls, crankshaft bearings, camshaft bearings, valve stems, etc.

FIG. 11C is a sectional view of the assembly as shown in FIG. 11A taken along the line 11C. This sectional view shows the assembled conversion kit comprising the chamber member 1220 fastened to the engine 1200 and including idler gear 1210 rotatably mounted on the exterior surface 1212a of the idler shaft 1212. The engine 1200 comprises an engine interior space 1200a as represented in schematic form in FIG. 11C. The interior space 1200a can be a lower portion of the engine block 1201 or crankcase of the engine 1200, to which lubrication oil returns after being pumped to various components within the engine 1200.

In some embodiments, the chamber member 1220 is configured to define a chamber 1235 when it is placed against the housing wall 1202 of the engine 1200. Optionally, the chamber 1235 encompasses the entire timing geartrain. Optionally, chamber 1235 encompasses the timing idler gear 1210 and the timing idler shaft 1212. Optionally, the chamber 1235 is created between the interior surface 1223, the engine housing wall 1202, and the peripheral wall 1225. The peripheral wall 1225 can be configured to abut against a front side such as the housing wall 1202 of the engine 1200, so as to maintain the chamber member 1220 at a predetermined spacing away from the front surface and thus define an enclosed or partially enclosed chamber around the timing geartrain. Optionally, the peripheral wall is configured to match the contours of the front of the engine 1200. In some embodiments, the peripheral wall is uneven to match an uneven engine front. In other embodiments, the peripheral wall is even to match an even or uniform engine front.

In some embodiments the conversion kit further comprises an oil gasket. Optionally, the oil gasket is configured to be placed between the chamber member 1220 in the engine housing wall 1202. Optionally, the oil gasket is configured to be mounted between the peripheral wall 1225 and the engine housing wall 1202. The oil gasket functions to create an oil seal about the chamber 1235. This has the advantage of creating a self-enclosed lubrication chamber. In some embodiments, the chamber 1235 comprises an oil reservoir 1235a in a lower portion of the chamber 1235.

FIG. 11B, is a detail view of FIG. 11C. According to some embodiments of the conversion kit, chamber member 1220 and idler shaft 1212 can be aligned with engine 1200 by at least one mounting tab 1216 included in the kit. Mounting tab 1216 can constitute a projection from engine housing 1200 and functions to align chamber member 1220 with engine 1200 during assembly of the kit. Optionally, a honed surface 1221 can be included on the interior surface 1223 near idler shaft 1212 to reduce friction between timing idler gear 1210 and interior surface 1223. Optionally, honed surface 1222 can be included on engine housing 1202 to reduce friction between idler gear 1210 and engine housing 1202.

In some embodiments of the conversion kit, a bearing 1215, such as a needle or ball bearing is mounted to the exterior surface 1212a of the idler shaft 1212 to reduce friction between idler shaft 1212 and idler gear 1210. In other embodiments, the bearing 1215 can be a plain, sleeve, or hydrodynamic bearing. Optionally, exterior surface 1212a is honed to reduce friction between idler gear 1210 and idler shaft 1212. In the form of plain or sleeve bearings, the bearing 1215 can have a polished surface corresponding to the exterior surface 1212a of the idler shaft 1212, optionally lubricated with grease or oil. In some embodiments, oil for the bearing 1215 is supplied continuously during operation so that the idler gear 1210 rotates on a thin oil film, optionally, under the principle of operation of a hydrodynamic bearing.

Referring now to FIGS. 12A and 12B, FIG. 12A is an embodiment of an assembly view of the conversion kit for converting an internal combustion engine to an overhead cam engine using a timing idler gear and including components of a lubrication system. In some embodiments, the conversion kit comprises an oil supply line 1283 extending between the oil reservoir 1280 and the chamber member 1220. Optionally, the oil supply line 1283 comprises an exterior portion 1283a fluidly coupled with the oil reservoir 1280 and an interior portion 1283b fluidly coupled with the exterior surface 1212a of the idler shaft 1212. Optionally, the exterior portion 1028a can be fluidly coupled with the oil pump contained in the oil reservoir 1280, for example, with oil supply line 1283.

In some embodiments of the conversion kit, an oil supply return line 1282 can be fluidly coupled at a first end with the chamber oil reservoir 1235a. Optionally, a second end of the return line 1282 can be fluidly coupled with the reservoir 1280 and function to return the supply of oil pumped into the chamber 1235 by the oil supply line 1283. Optionally, the return line 1282 is coupled at the bottom of the chamber 1235 at a drain 1281. In some embodiments, the return line 1282 may comprise an exterior portion and/or an interior portion through the engine 1200 or the chamber member 1220.

Figure 12C:
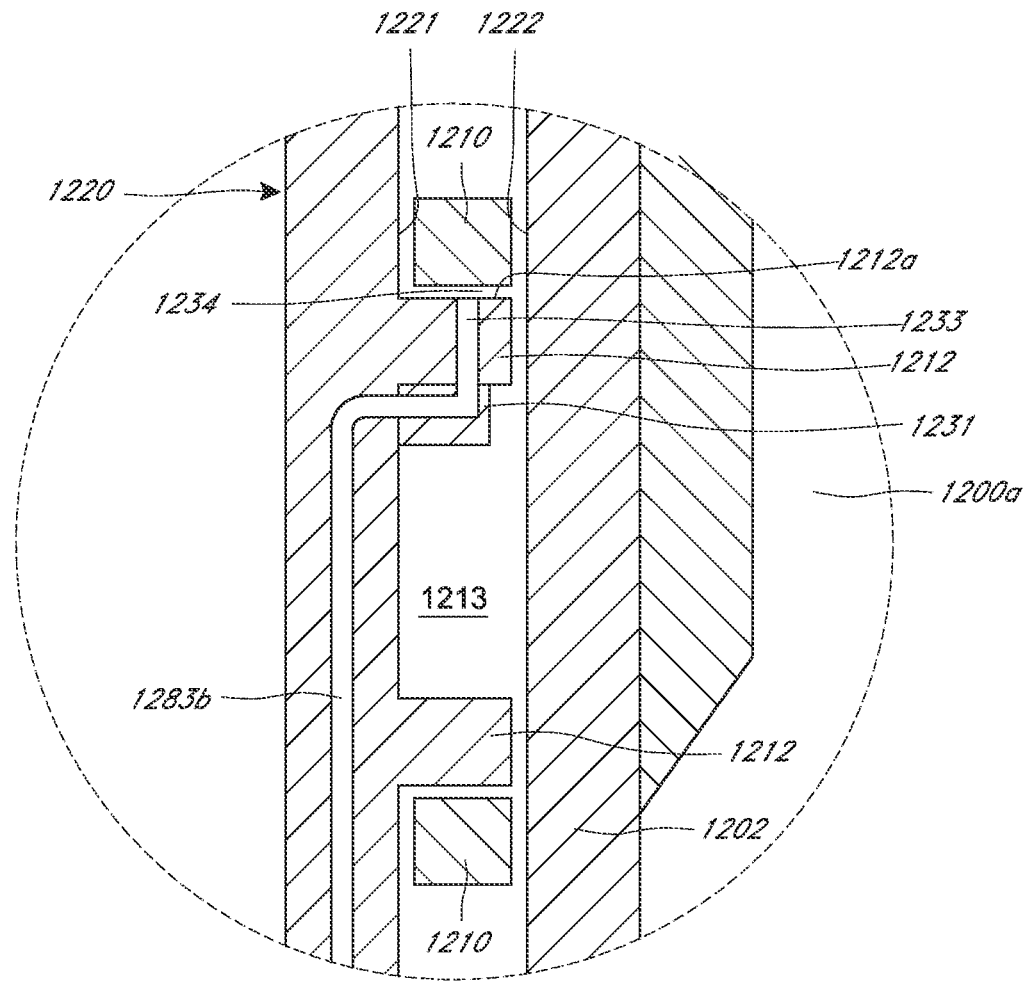
FIG. 12C is a detailed view of FIG. 12B.

With reference to FIG. 12C, in some embodiments, the oil supply line 1283 is fluidly coupled with a lubrication space 1234 located between the idler gear 1210 and the exterior surface 1212a of the idler shaft 1212. In some preferred embodiments, the oil supply line 1283 is configured to deliver a supply of oil to lubricate the idler gear 1210. Optionally, the chamber member 1220 can be configured to allow the oil supplied to the lubrication space 1234 to drip from the lubrication space 1234 and collect in the oil reservoir 1235a. Optionally, the oil supply returns to the oil reservoir 1280 through the drain 1281 and the return line 1282. The oil supply can thus be recirculated through the oil supply line 1283.

In a preferred embodiment, the interior portion 1283b of the oil supply line extends through a wall portion of the chamber member 1220. Optionally, interior oil line 1283b is created by gun drilling through wall portions of the chamber member 1220 and plugging unnecessary exterior holes left in the wall portions. As illustrated in FIG. 12C, the interior portion 1283b can comprise an extension line 1233 fluidly coupled with the exterior surface 1212a through the boss 1231. Optionally, the boss 1231 can be created as an original part of the idler shaft 1212 as illustrated in FIG. 10. The extension line 1233 can be created by drilling through the boss 1231 and idler shaft 1212 and plugging any exterior holes created by the drilling process. In other embodiments, interior oil line 1283b extends directly through the idler shaft 1212 to the exterior surface 1212a without the boss.

In some embodiments of the conversion kit, the lubrication system is self-enclosed (as described in greater detail below in reference to FIG. 13E) wherein the oil supply is recirculated independent of the lubrication system of the engine 1200. Optionally, the conversion kit comprises an oil pump 1232 that pumps oil from within the chamber 1235 through the oil supply line 1283 and up to the lubrication space 1234. Optionally, the oil pump is located in the chamber 1235. Optionally, the oil pump is located exterior to the chamber 1235. Optionally, the oil supply line 1283 is fluidly coupled with the oil reservoir 1235a. In such a configuration, the oil return line 1282 can be omitted from the conversion kit. Optionally, the oil reservoir is located exterior to the chamber 1235. Optionally, the oil pump is configured to pump the oil supply through the interior portion 1283b. Optionally, the interior portion 1283b comprises the extension line 1233 and/or the boss 1231 as described above. Thus, the oil supply line 1283 can deliver a supply of oil to the lubrication space 1234 without utilizing the oil supply of the engine 1200.

Figure 13A:
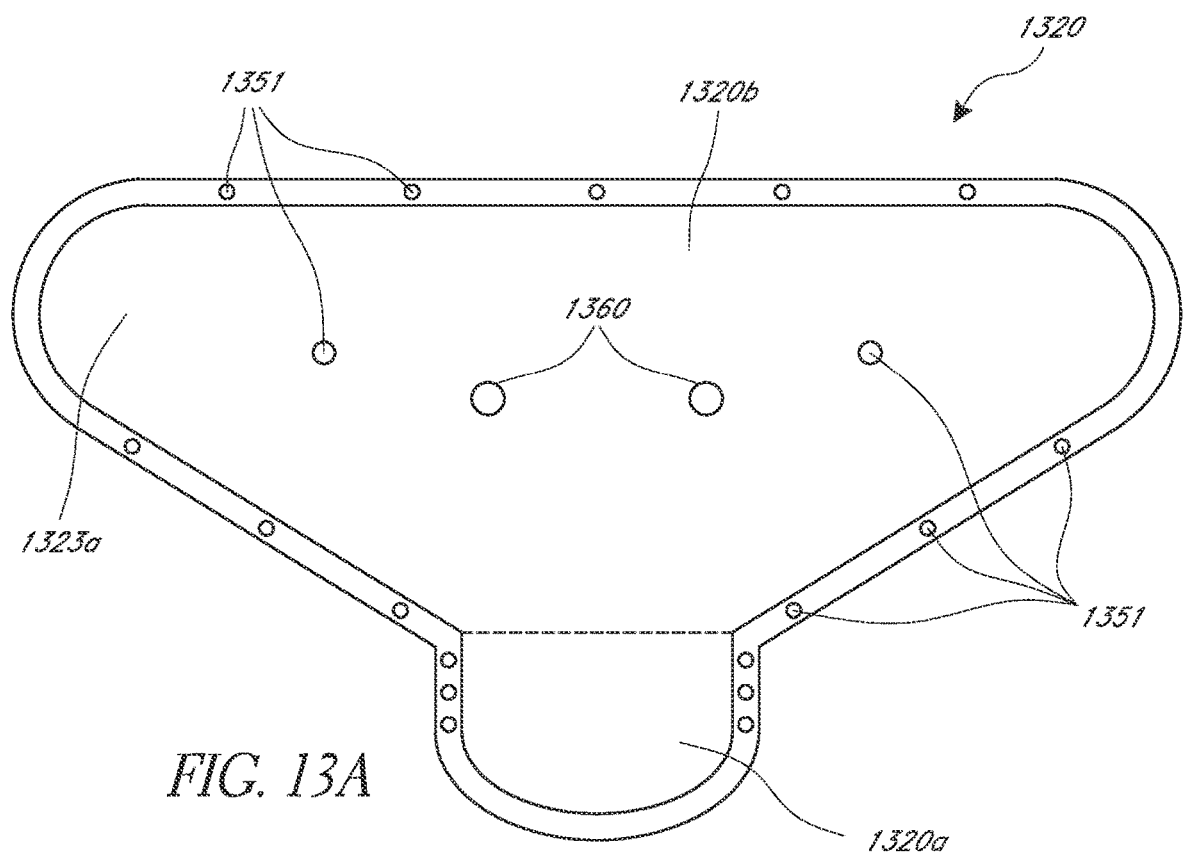
FIG. 13A is a schematic illustration of a second chamber member in an embodiment of a kit for replacing a conventional valvetrain in an existing engine using at least one timing idler gear.
Figure 13B:
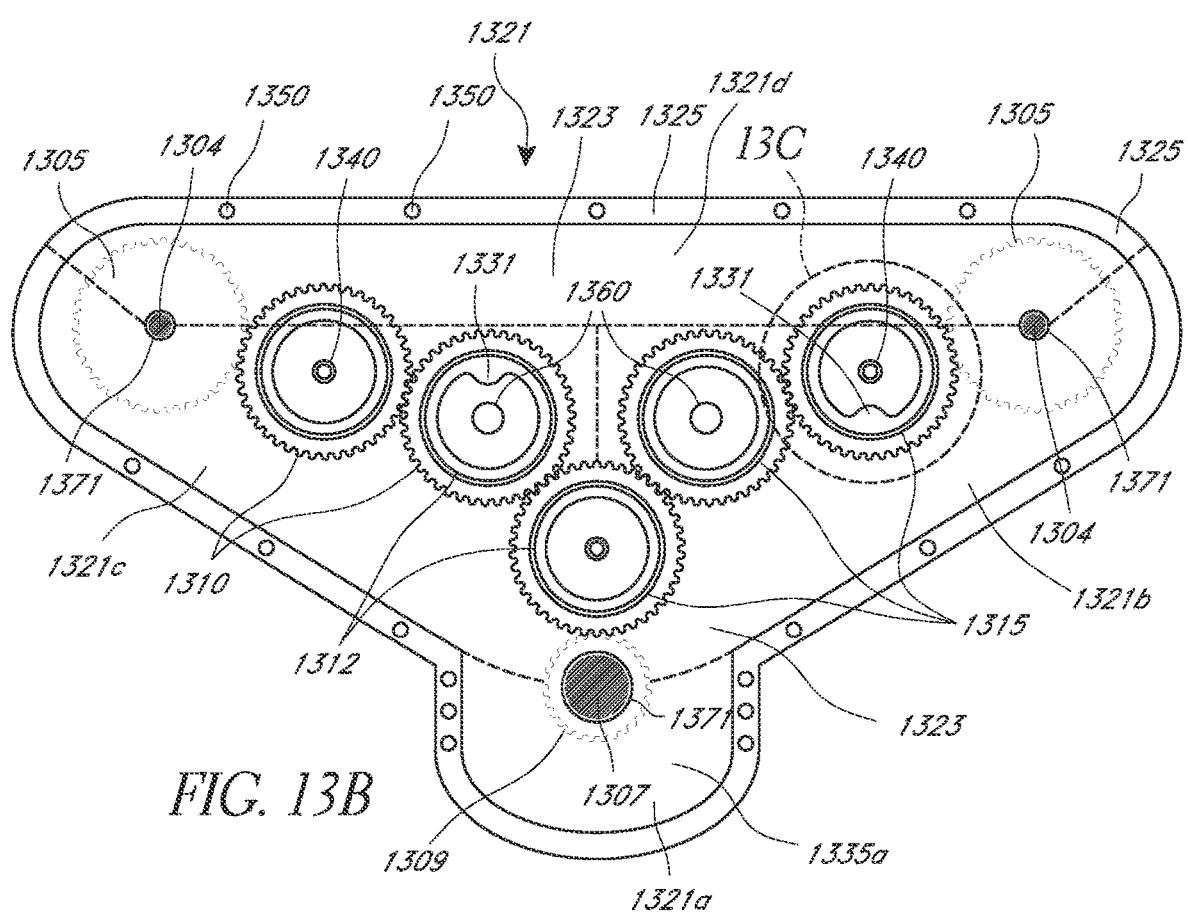
FIG. 13B is a front view of the kit of FIG. 13A showing a partially assembled kit.
Figure 13C:
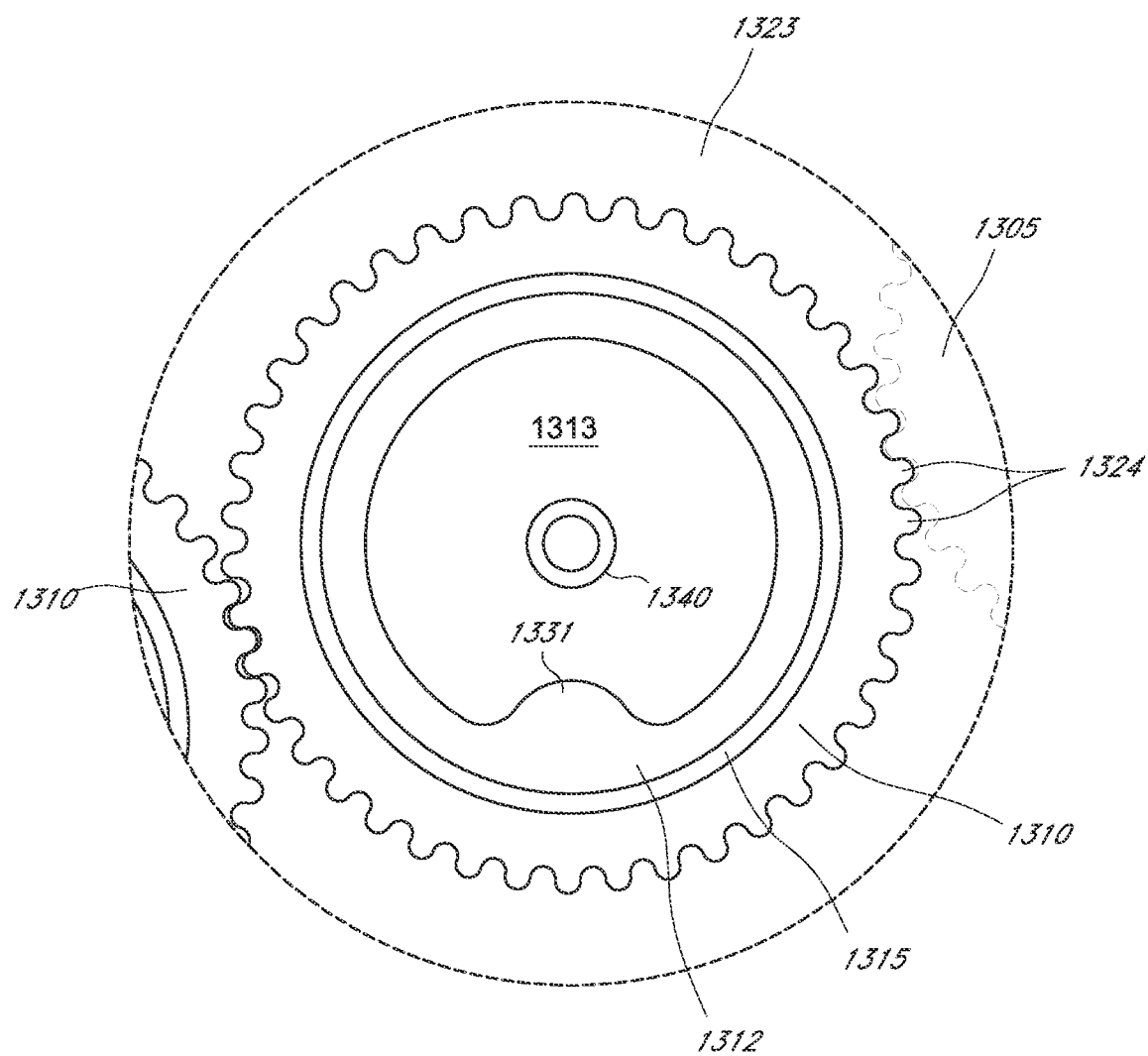
FIG. 13C is a detailed view of FIG. 13B.
Figure 13D:
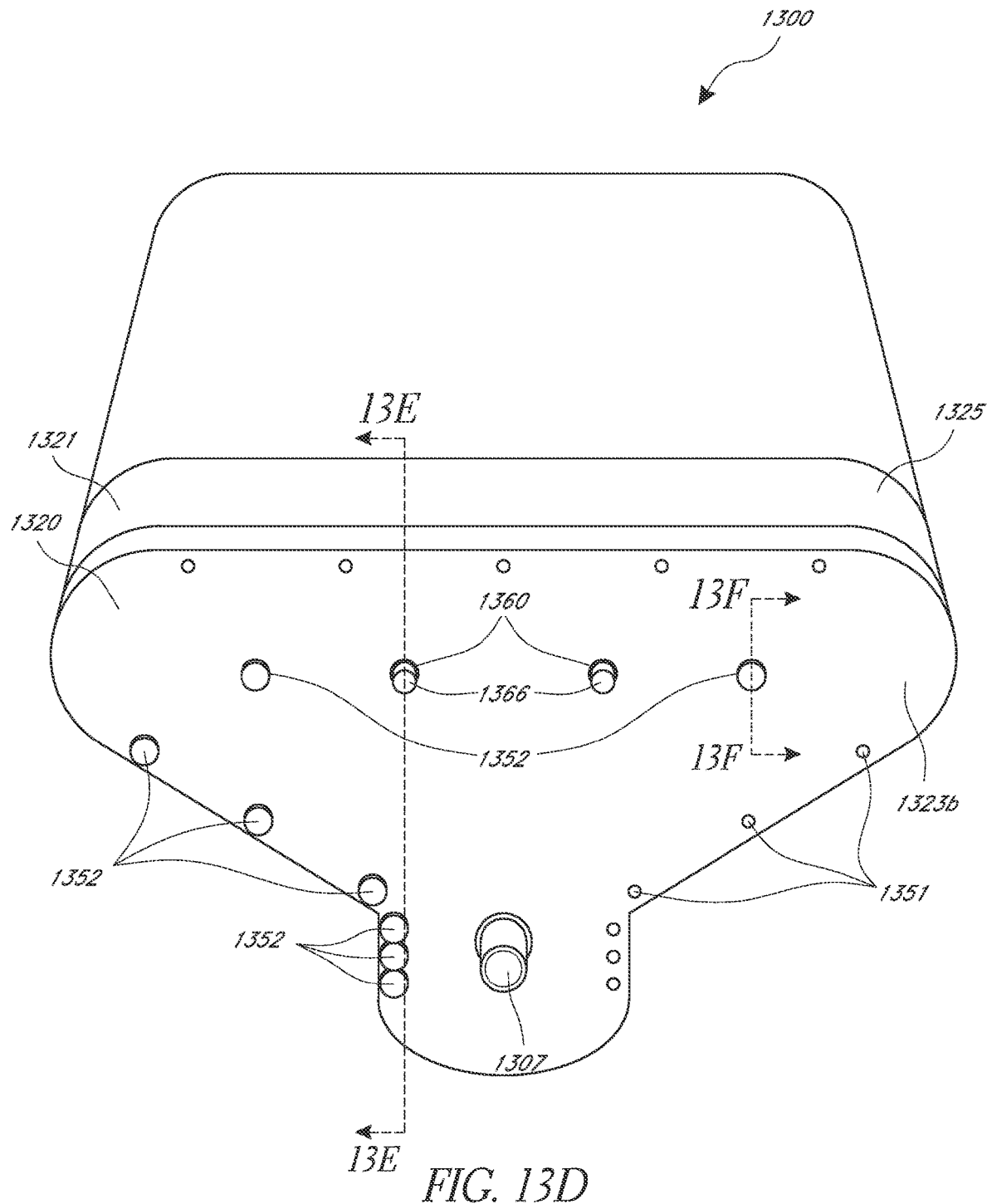
FIG. 13D is a schematic, perspective view of another embodiment of a partially assembled kit.

FIGS. 13A-13G illustrate another embodiment of a conversion kit comprising a first chamber member 1321 that includes at least one idler shaft 1312 extending from an interior surface 1323 (FIG. 13B). Each of the features and constructions of the first embodiment as described in FIGS. 10-12 can also be incorporated in this second embodiment as shown in FIGS. 13A-13G. In some embodiments, the first chamber member 1321 is configured to be mounted to an engine housing 1302 of an engine 1300 with the idler gear shaft 1312 extending away from the engine 1300 (FIG. 13D). A second chamber member 1320 (FIG. 13A) is optionally used as a cover to create a chamber 1335 between the first chamber member 1321 and the second chamber member 1320.

With continued reference to FIG. 13A, the second chamber member 1320 is optionally configured to be mounted to the first chamber member 1321 at a plurality of cover mounting locations 1351. Optionally, the cover mounting locations 1351 are on a perimeter of the second chamber member 1320. Optionally, the cover mounting locations 1351 comprise at least one central mounting location. Optionally, the second chamber member 1320 comprises a flat plate or a contoured plate. Optionally, the second chamber member 1320 comprises a top half 1320a and a bottom portion 1320b wherein the top portion 1320a and the bottom portion 1320b are separable and independently mountable to the first chamber member 1321. Optionally, the bottom portion 1320b is configured to be left in place when the top portion 1320a is removed from the engine 1300. In those embodiments where the chamber 1335 comprises an oil supply, the bottom portion 1320b can retain the oil supply within the chamber even when the top portion 1320a is removed, for purposes such as maintenance of the geartrain.

The second chamber member 1320 can further comprise at least one passageway 1360 from an interior surface 1323a to an exterior surface 1323b of the second chamber member 1320. Each of the passageways 1360 can be placed at a location on the second chamber member 1320 to align with a power take off shaft 1366 when assembled with the first chamber member 1321. The power take off shaft 1366 is further described below in relation to FIGS. 13E, 13G, and 14. In some embodiments, the passageway 1360 is configured such that the power takeoff shaft 1366 extends through the second chamber member.

FIG. 13B depicts an elevation view of an embodiment of the conversion kit showing the first chamber member 1321 having idler gears 1310 configured to be meshed with a crank gear 1309, a crankshaft 1307, and with other idler gears 1310 to form a geartrain for transferring torque from the crankshaft 1307 to the camshaft 1304, with the second chamber member 1320 removed.

In some embodiments the first chamber member 1321 comprises a plurality of engine mounting locations 1350 that are configured to mount the first chamber member to the engine 1300 with the idler shafts 1312 extending away from the engine. Optionally, the engine mounting locations 1350 can be spaced around the perimeter of the second chamber member 1320. In some embodiments, the cover mounting locations 1351 can also correspond to the engine mounting locations 1350. In a preferred embodiment, at least some of the engine mounting locations 1350 are separate from at least some of the cover mounting locations 1351 such that the first chamber member 1321 can be assembled with the engine 1300 before the second chamber member 1320 is assembled with the first chamber member 1321.

In some embodiments, idler shafts 1312 of the first chamber member include at least one interior mounting shaft 1340. Optionally, the interior mounting shaft 1340 acts as the central mounting location 1351 for the second chamber member 1320 to attach to the first chamber member 1321. Optionally, the interior mounting shaft 1340 comprises a standalone shaft extending from the interior surface 1323 of the first chamber member 1321. Alternatively the interior 1313 of the idler shaft 1312 is a solid volume and the interior mounting shaft 1340 comprises a hole within the solid volume.

In some embodiments first chamber member 1321 comprises a peripheral wall 1325. Optionally, the peripheral wall 1325 extends all the way around a perimeter of the first chamber member 1321. Optionally, the peripheral wall 1325 is configured to comprise the mounting locations 1350. In some embodiments, the second chamber member 1320 comprises the peripheral wall 1325. In some embodiments, the peripheral wall 1325 is split between the first and the second chamber members 1321, 1320.

As noted above, in some embodiments the first and second chamber member 1321 and 1320 are configured to create an interior chamber 1335. Optionally, the conversion kit includes a gasket that can be placed between the first chamber member and the second chamber member 1320 such that the chamber 1335 can comprise an oil reservoir 1335a. Optionally, oil reservoir 1335a can comprise a lower portion of the chamber 1335 specifically configured to collect oil. Optionally, the oil reservoir is exterior to the chamber 1335 and is fluidly connected to the chamber 1335.

In some embodiments of the conversion kit, the first chamber member 1321 further comprises at least one access hole corresponding to one of the camshaft 1305 and the crankshaft 1307. The access holes 1371 can provide the crank and cam gears 1305, 1309 access within the chamber 1335. Optionally, at least one of the cam gear 1305 or the crank gear 1309 is removed from the shafts 1304, 1307 during the assembly of the conversion kit with the engine 1300 such that the first chamber member 1321 can be mounted to the engine 1300. Optionally, the first and second chamber members 1321, 1320 are configured such that the cam gear 1305 and the crank gear 1309 are entirely enclosed within the chamber 1335 when assembled together. Optionally, the first chamber member 1321 comprises at least two separate portions 1321a, 1321b that can be assembled around the camshaft 1305 and/or the crankshaft 1307. One possible division of the first chamber member 1321 is as indicated by the dashed lines in FIG. 13B.

FIG. 13C depicts a detail of FIG. 13B in the assembled state. In some embodiments of the conversion kit, a bearing 1315, such as a needle or ball bearing is mounted to the exterior surface 1312a of the idler shaft 1312 to reduce friction between idler shaft 1312 and idler gear 1310. In other embodiments, the bearing 1315 can be a plain, sleeve, or hydrodynamic bearing. Optionally, exterior surface 1312a is honed to reduce friction between idler gear 1310 and idler shaft 1312. In the form of plain or sleeve bearings, the bearing 1315 can have a polished surface corresponding to the exterior surface 1312a of the idler shaft 1312, optionally lubricated with grease or oil. In some embodiments, oil for the bearing 1315 is supplied continuously during operation so that the idler gear 1310 rotates on a thin oil film, optionally, under the principle of operation of a hydrodynamic bearing.

In some embodiments idler gear shaft 1312 further comprises a boss 1331. The boss 1331 can optionally comprise an extension 1333 to an oil supply line 1383 as described below.

FIG. 13D depicts an assembly view showing the first chamber member 1321 mounted onto the engine 1300 at the plurality of engine mounting locations 1350 and the second chamber member 1320 mounted at the plurality of cover mounting location 1351 to the first chamber member 1321 by a plurality of mechanical fasteners 1352. Optionally, first chamber members 1321 can be directly mounted to engine 1300 at an engine housing 1302 of the engine 1300. The shafts 1310 are optionally pointed away from engine 1300. Optionally, the second chamber member 1320 acts as a cover to create chamber 1325. Such a configuration allows for easy and convenient access to the geartrain of the conversion kit by removing the second chamber member 1320. Optionally, only the top portion 1320b of the second chamber member 1320 need be removed to provide access to the idler gear 1310. In such a configuration, the oil reservoir 1335a formed by bottom portion 1320a can be optionally maintained with an oil supply contained within it when the top portion 1320b is removed.

In some embodiments the passageway 1360 can provide a pathway for the power takeoff shaft 1366 to extend up to or beyond an exterior surface 1323b of the second chamber member 1320.

Figure 13E:
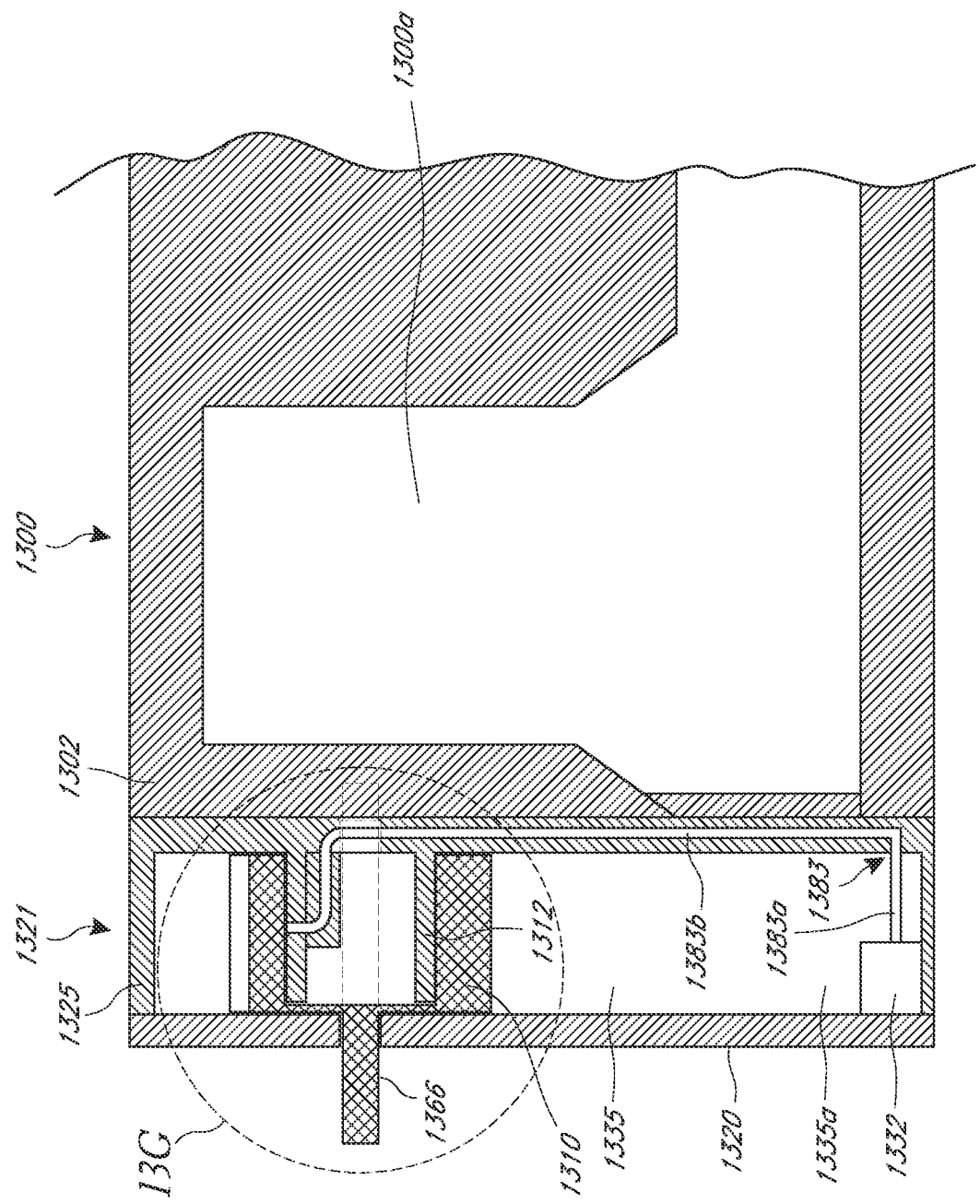
FIG. 13E is a sectional view taken along the line 13E in FIG. 13D.

FIG. 13E depicts a sectional view of the assembly shown in FIG. 13D. FIG. 13G depicts a detail view of FIG. 13E. With reference to FIGS. 13G and 13E, the idler gear 1310 is rotatably coupled with the idler gear shaft 1312. Optionally, the power takeoff shaft 1366 extends from a faceplate 1311 rigidly attached to the timing idler gear 1310. Optionally, the timing idler gear comprises a rim gear. Optionally, a second power takeoff shaft 1366a can be coupled with the faceplate 1311 and extend in a direction opposite the power takeoff shaft 1366. Optionally, when the power takeoff shaft 1366a extends in the direction opposite the power takeoff shaft 1366, a second passageway 1360a can be made in the first chamber member 1321 and aligned with the second power takeoff shaft 1366a.

The embodiments of FIGS. 13E and 13G and described above can be used with any of the different embodiments of the conversion kit or engine described herein.

In some embodiments of the conversion kit, the timing idler gear 1310 is held substantially in place on the idler gear shaft 1312 by an interior surface 1323a of the second chamber member 1320. Optionally, a honed surface 1322a can be included on the second chamber member 1320 to reduce friction between idler gear 1310 and the second chamber member 1320. Optionally, a honed surface 1322 of the first chamber member 1321 can be used to reduce friction between the idler gear 1310 and the first chamber member 1321.

With continued reference to FIGS. 13E and 13G, the conversion kit can comprise a lubrication system for delivery a supply of oil to the rotating timing idler gear 1310. In some embodiments an oil supply line 1383 is fluidly coupled with an oil reservoir 1335a on one end and a lubrication space 1334 on the other end and configured to deliver a supply of oil through the oil supply line 1183.

In some embodiments of the conversion kit, the kit comprises a self-contained lubrication system wherein the oil supply is recirculated independent of the lubrication system of the engine 1300. Optionally, the conversion kit comprises an oil pump 1332 that pumps oil from within the chamber 1335 through the oil supply line 1383 and up to the lubrication space 1334. Optionally, the oil pump is located in the chamber 1335. Optionally, the oil pump is located exterior to the chamber 1335. Optionally, the oil supply line 1383 is fluidly coupled with the oil reservoir 1335a at the bottom of the chamber 1335. Optionally, the oil reservoir is located exterior to the chamber 1335 or in another location within the chamber 1335. Optionally, the oil pump is configured to pump the oil supply through an interior portion 1283b of the oil supply line 1383. Optionally, the interior portion comprises a passageway through either of the first or second chamber members 1320, 1321. Optionally, the interior portion 1383b comprises the extension passageway 1333 and/or passes through the boss 1331. Optionally, the oil supply line 1383 can deliver a supply of oil to the lubrication space 1334 directly through the idler shaft 1312 without a boss.

In some other embodiments of the conversion kit, the lubrication system is coupled with the existing lubrication system of the engine 1300. Thus the conversion kit may comprise an oil supply line 1383 fluidly coupled with an oil reservoir 1380 (similar to oil reservoir 1280) and the lubrication space 1334. Optionally, the conversion kit also comprises a return line 1382 fluidly coupled between the oil reservoir of the kit 1335a at a drain 1381a and the oil reservoir 1380.

Figure 13F:
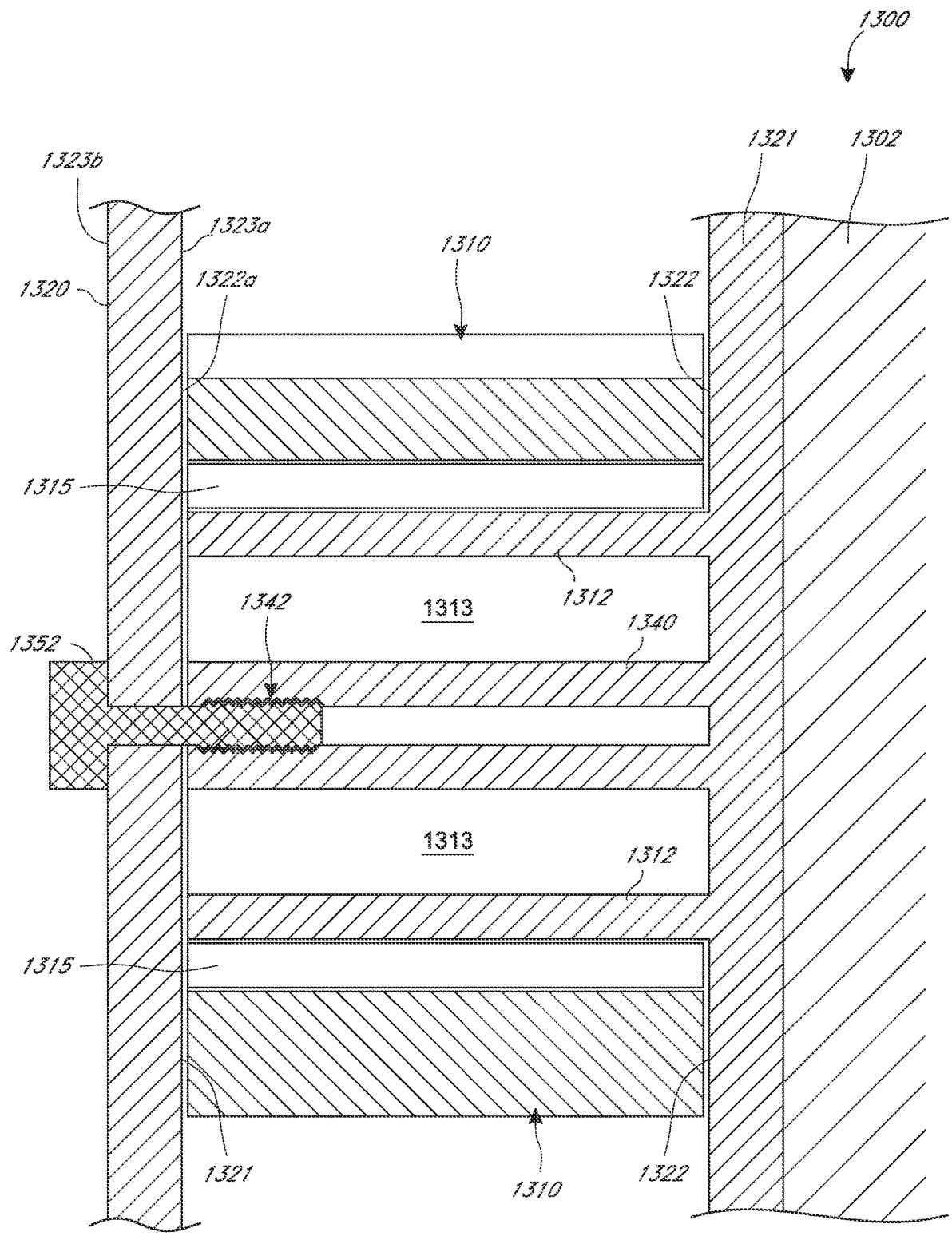
FIG. 13F is a detailed section view taken along the line 13F is FIG. 13D.
Figure 13G:
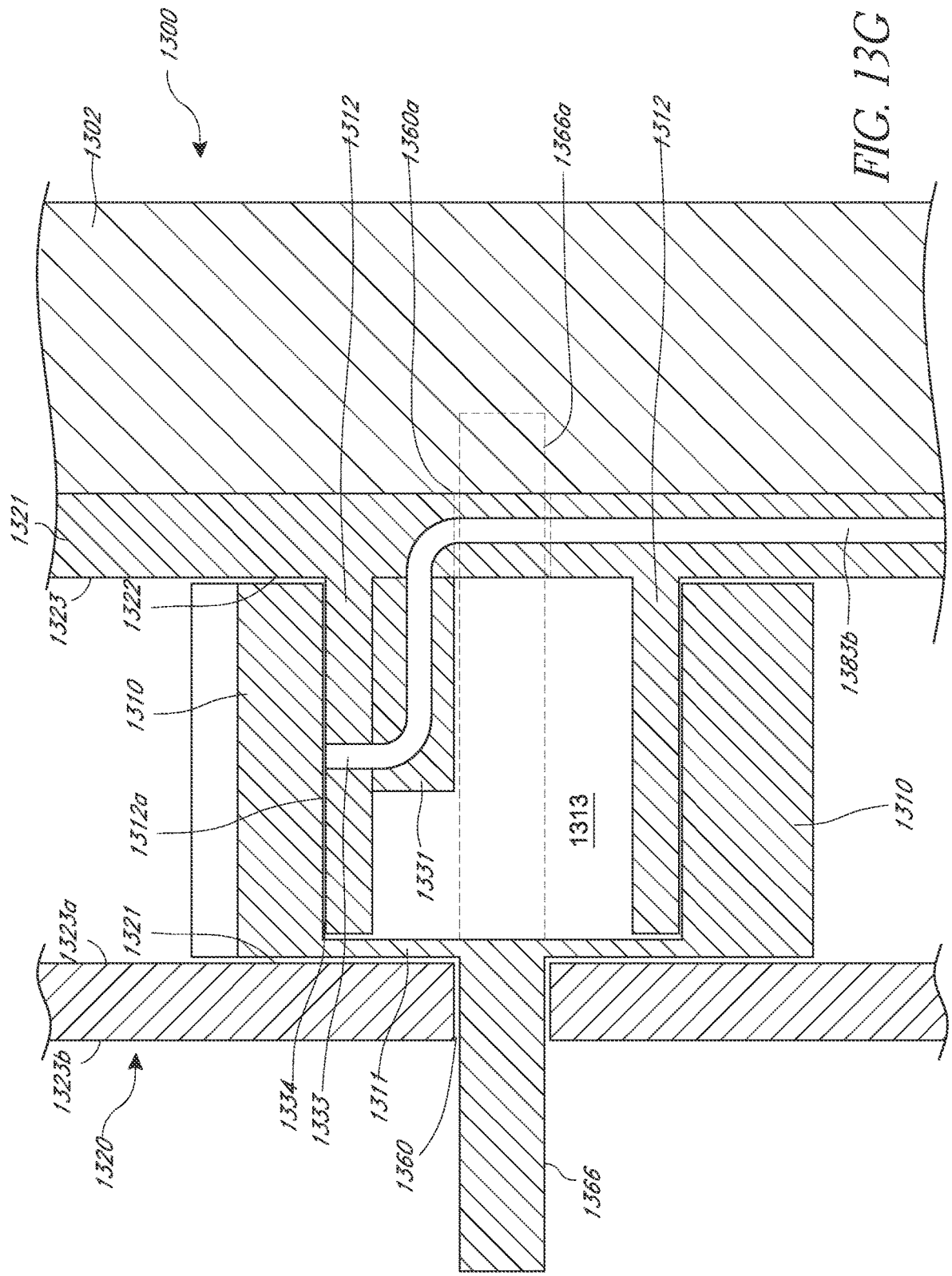
FIG. 13G is a detailed view of FIG. 13E.

FIG. 13F depicts a partial sectional view of the assembly of FIG. 13D showing one of the mechanical fasteners 1352 and one of the interior mounting shafts 1340. Optionally, idler gear 1310 is rotatably coupled to idler shaft 1312 through bearing 1315. Optionally, the mechanical fastener 1352 can be used to secure the second chamber member 1320 to the interior mounting shaft 1340 by threads 1342. Optionally, interior space 1313 comprises an empty space, but in other embodiments comprises a solid volume. Optionally, the interior space 1313 comprises the interior mounting shaft 1340 and/or the threads 1342.

Figure 14:
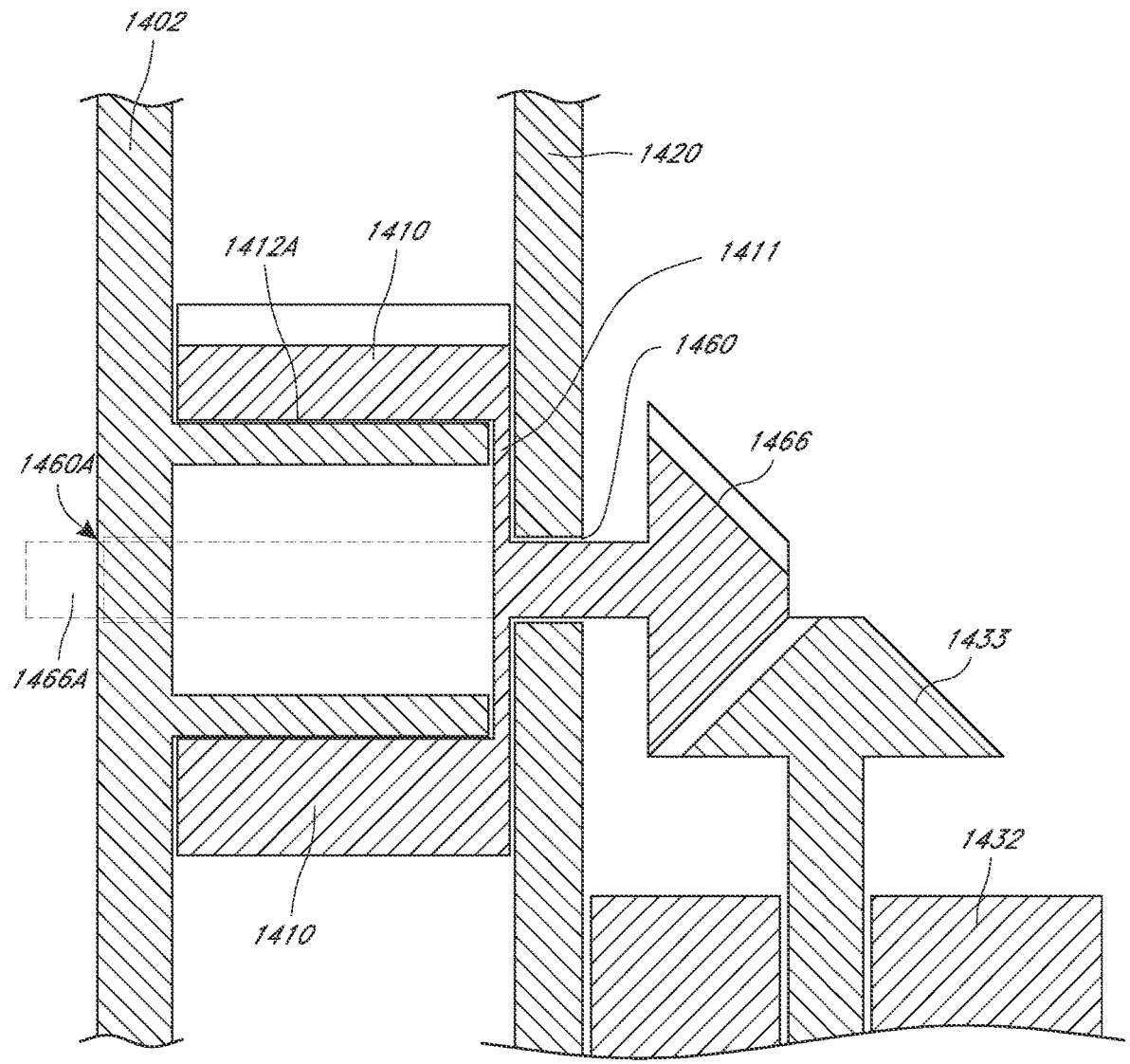
FIG. 14 is a sectional view of an embodiment of a power takeoff shaft compatible with each of the embodiments shown and described herein.

FIG. 14 depicts another embodiment of a power takeoff assembly which is compatible with each of the embodiments of the conversion kit and engines described herein. Optionally, the idler gear 1410 is rotatably mounted to an idler shaft 1412 with a faceplate 1411 fixedly coupled with the idler gear 1410. Optionally, extending from the faceplate 1411 is a power takeoff shaft 1466. Optionally, a power takeoff shaft 1466 can comprise a beveled gear configured to mesh with a second beveled gear 1433 and provide torque to an engine accessory 1432. Optionally, the power takeoff shaft 1466 can extend through a passageway 1460 through a chamber member 1420. Optionally, the engine accessory 1432 can be fixedly mounted to the chamber member 1420. Optionally, the idler shaft 1412 extends from one of the first or the second chamber members or from the engine housing wall.

Figure 15:
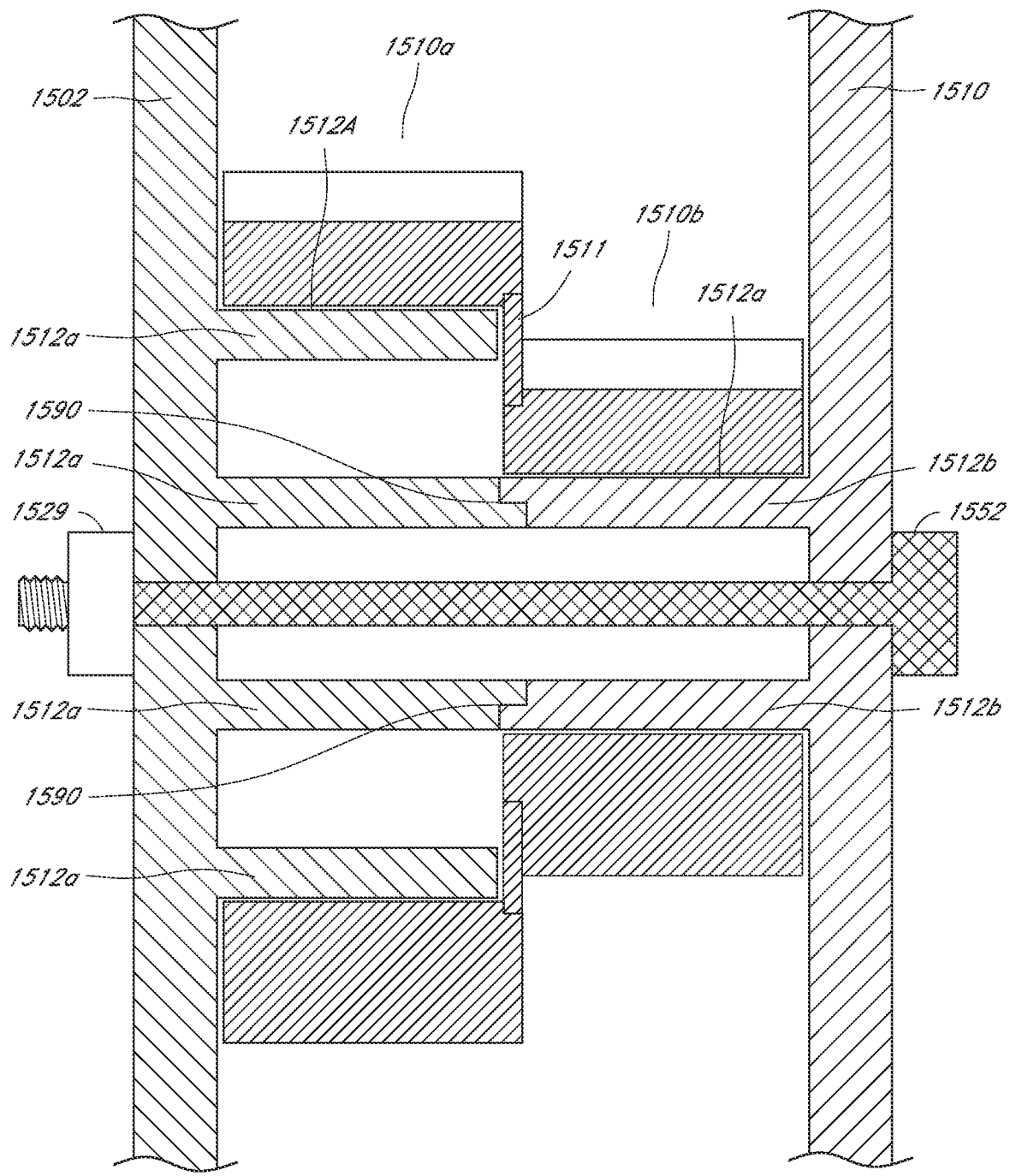
FIG. 15 is a sectional view of an embodiment of a timing idler gear compatible with each of the embodiments shown and described herein.

FIG. 15 depicts another embodiment of an idler gear 1510 comprising a first split section 1510a and a second split section 1510b rigidly connected with each other and rotating together on an idler shaft 1512. In some embodiments, an idler rim gear can define more than one idler gear, for example, by having multiple portions with different diameters each. For example, an idler rim gear can include two different diameters with gear teeth at each the two different diameters that rotate about the same idler shaft.

In other instances, one head of a multi-head engine (e.g. a V-type engine block) is offset from a second head of the engine, with two timing geartrains that are offset from each other (e.g., along the direction of the crankshaft of the engine) and correspond to the different heads. Optionally, the idler gear 1510 comprises the first split section 1510a having a first diameter and the second split section 1510b having a second diameter. Optionally, the split section 1510a can rotate about a first idler shaft section 1512a having a corresponding first diameter and the split section 1510b can rotate about a second idler shaft section 1512b having a corresponding second diameter. Optionally, the first and second split sections can be rigidly attached by a faceplate 1511. Optionally, the idler shaft 1512 extends from one of the chamber members or the engine housing wall. Optionally, corresponding split sections 1512a, 1512b extend from opposite chamber members and/or engine housing walls.

In some other embodiments, the first idler shaft section 1512a and the second idler shaft section 1512b meet at an interface 1590. Optionally, the interface 1590 comprises two interlocking and concentric circular sections on each of the shaft sections 1512a, b. Interface 1590 can have the advantage of providing a haptic locating mechanism when aligning and mounting the chamber member or the engine housing wall with the corresponding engine housing wall or the chamber member.

In some embodiments the chamber member 1510 can be coupled with the housing wall 1502 through a mechanical fastener 1552 extending from an exterior side of chamber member 1510 through the engine housing wall 1502. Optionally, the mechanical fastener 1552 can be a bolt and a nut 1529.

Each the embodiments of the disclosure shown in FIG. 15 and described in the preceding paragraphs can be used with each of the other embodiments described herein.

OEM Engines Using a Valvetrain and Comprising a Timing Idler Gear

Figures 16A, 16B:
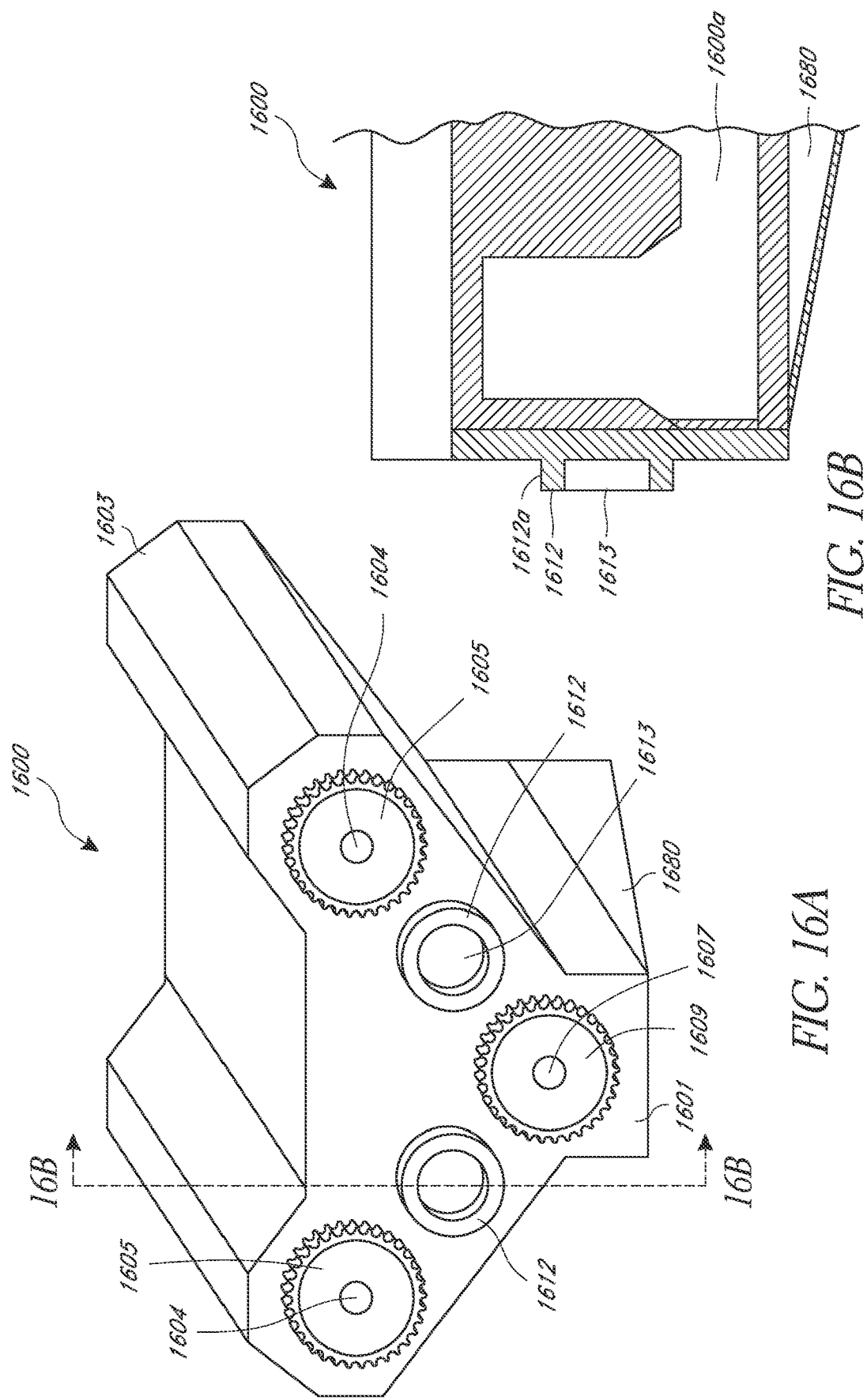
FIG. 16A is a schematic illustration an embodiment of an engine comprising timing idler gear shafts.
FIG. 16B is a sectional view taken along the line 16B in FIG. 16A.

FIGS. 16A-19C depict an engine 1600 that utilizes at least one idler shaft 1612 and at least one corresponding timing idler gear 1610. Accordingly, each of the features of the above embodiments may be used in combination with the features of the engine 1600. FIG. 16A depicts the engine 1600 comprising the idler shaft 1612 extending from an engine housing 1602. Optionally, the engine 1600 comprises a head 1603, an engine block 1601 and the engine housing 1602. Optionally, the engine 1600 also comprises a crankshaft 1607, a crank gear 1609, a cam gear 1605 and a camshaft 1604. Optionally, the idler shaft 1612 is integrally formed with the engine housing 1602. In other embodiments the idler shaft 1612 is mechanically fastened to the engine 1600 through conventional means as described above in reference to previous embodiments.

FIG. 16B depicts a sectional view of engine 1600 taken in FIG. 16A. Optionally, the engine 1600 includes an interior space 1613 and an exterior surface 1612a of the idler shaft 1612 configured to rotatably support the timing idler gear 1610. In some embodiments of the present disclosure, interior space 1613 is an empty volume, but in other embodiments it is a solid volume. Optionally, engine 1600 can also comprise an oil reservoir 1680. Optionally, the engine 1600 can further comprise a plurality of mounting locations (not shown) configured to mount a chamber member 1620 with the engine housing wall 1602 (FIGS. 18A, B).

In some embodiments, the idler gear 1610 comprises a rim gear as shown herein and described above. Optionally, the idler gear 1610 can comprise a power takeoff shaft with at least one passageway through the chamber member 1620 as shown and described above in relation to the other embodiments.

Figures 17A, 17B:
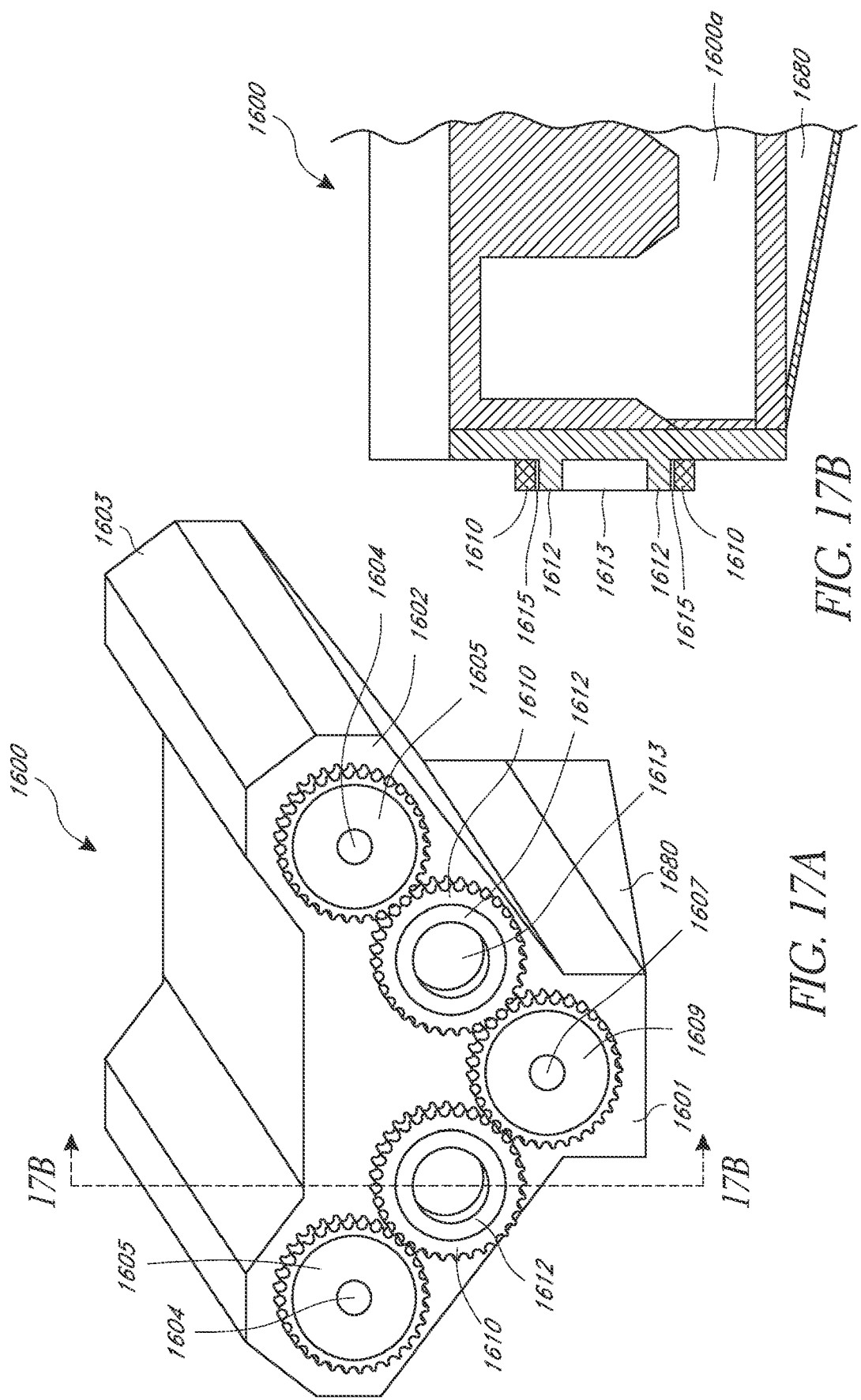
FIG. 17A is a schematic illustration of the engine in a partially assembled state.
FIG. 17B is a sectional view taken along the line 17B in FIG. 17A.

FIGS. 17A and 17B depict an assembled view of the engine 1600 comprising the timing idler gear 1610 mounted on the idler shaft 1612 and rotatably coupled with one of the crank gear 1609 and/or the cam gear 1605. Optionally, timing idler gear 1610 can be mounted onto the exterior surface 1612a of the idler shaft 1612. Optionally, the timing idler gear 1610 is mounted on a bearing 1615, such as a needle or ball bearing, that is mounted to the exterior surface 1612a of the idler shaft 1612 to reduce friction between idler shaft 1612 and idler gear 1610. In other embodiments, the bearing 1615 can be a plain, sleeve, or hydrodynamic bearing. Optionally, exterior surface 1612a is honed to reduce friction between the idler gear 1610 and the idler shaft 1612. In the form of plain or sleeve bearings, the bearing 1615 can have a polished surface corresponding to the outer surface 1612a of the idler shaft 1612, optionally lubricated with grease or oil. In some embodiments, oil for the bearing 1615 is supplied continuously during operation so that the idler gear 1610 rotates on a thin oil film, optionally, under the principle of operation of a hydrodynamic bearing.

Figures 18A, 18B:
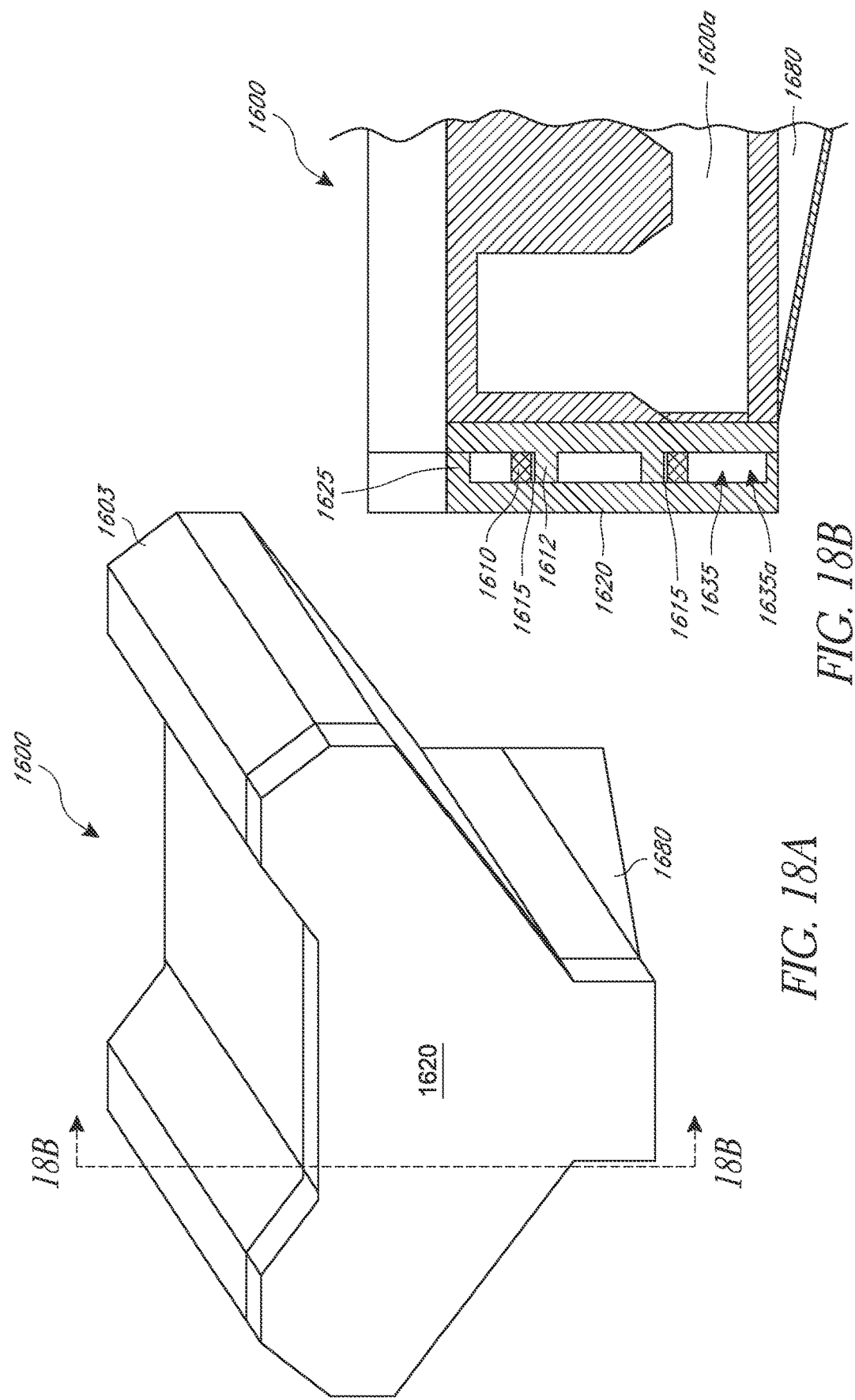
FIG. 18A is a schematic illustration of the engine in a partially assembled state.
FIG. 18B is a sectional view taken along the line 18B in FIG. 18A.

FIGS. 18A and 18B depict a view of the engine 1600 in an assembled state and including the chamber member 1620. In some embodiments, the chamber member 1620 functions to maintain the idler gear 1610 on the idler shaft 1612 so that it can rotate securely about the idler shaft 1612. As described above in reference to other embodiments, both the engine housing wall 1602 and the chamber member 1620 can comprise honed portions to reduce friction at the locations where the timing idler gear 1610 contacts the chamber member and the housing wall respectively.

In some embodiments of the engine 1600, chamber member 1620 can comprise a peripheral wall 1625 configured to create a chamber 1635 that encompasses the idler gear 1610. Optionally, the wall 1625 extends from the engine housing 1602. In a preferred embodiment, an interface between the peripheral wall 1625 and the engine housing 1602 comprises a gasket configured to seal the chamber 1635 to prevent oil leakage. In another preferred embodiment, the chamber member 1620 comprises a top portion and a bottom portion, the top portion being removable from the engine 1600 with the lower portion remaining in place such that an oil reservoir 1635a can retain an oil supply during partial disassembly of the engine 1600.

Figures 19A, 19B:
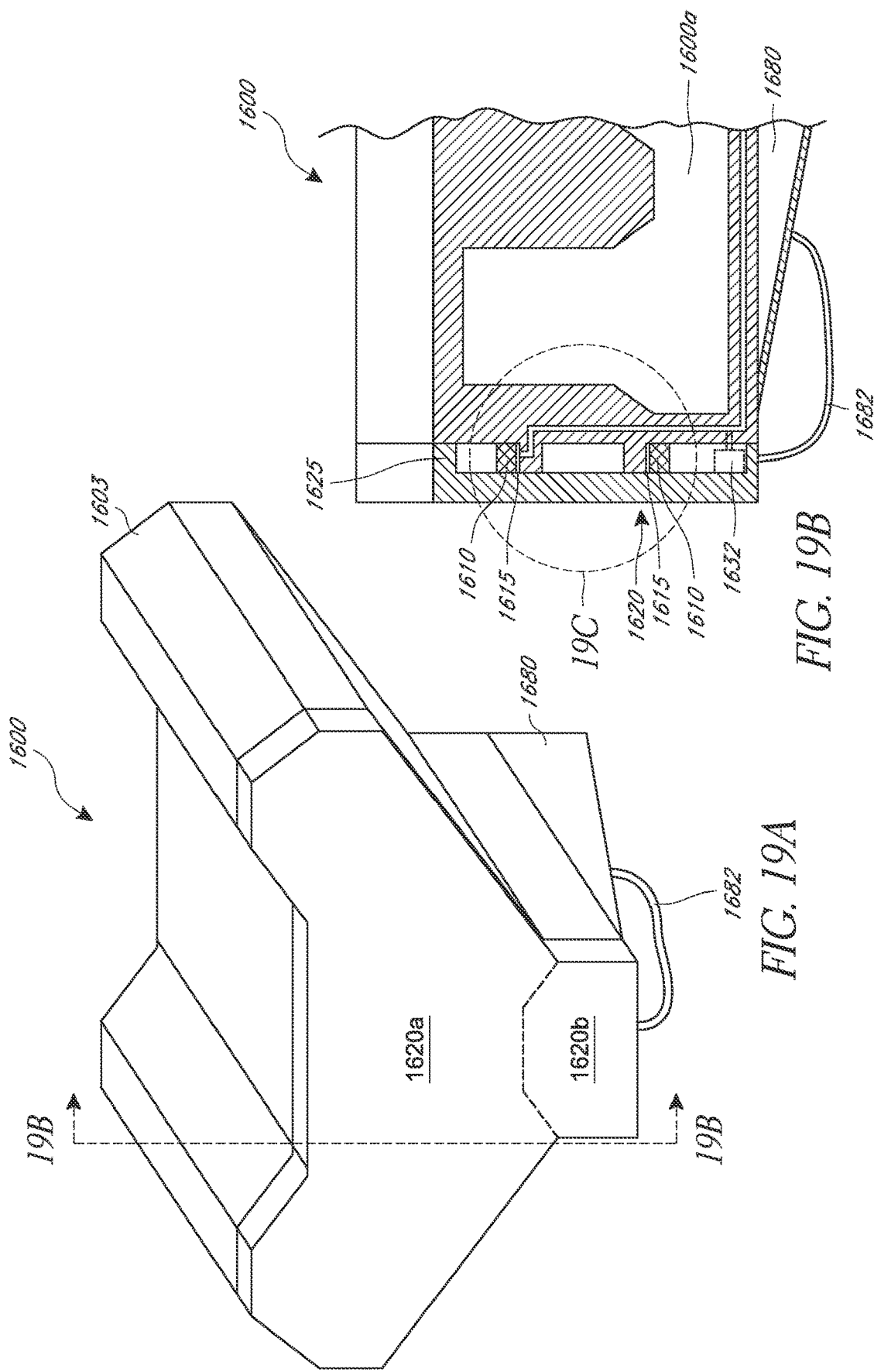
FIG. 19A is a schematic, perspective view of the engine comprising timing idler gear shafts in an assembled state.
FIG. 19B is a sectional view taken along the line 19B in FIG. 19A.
Figure 19C:
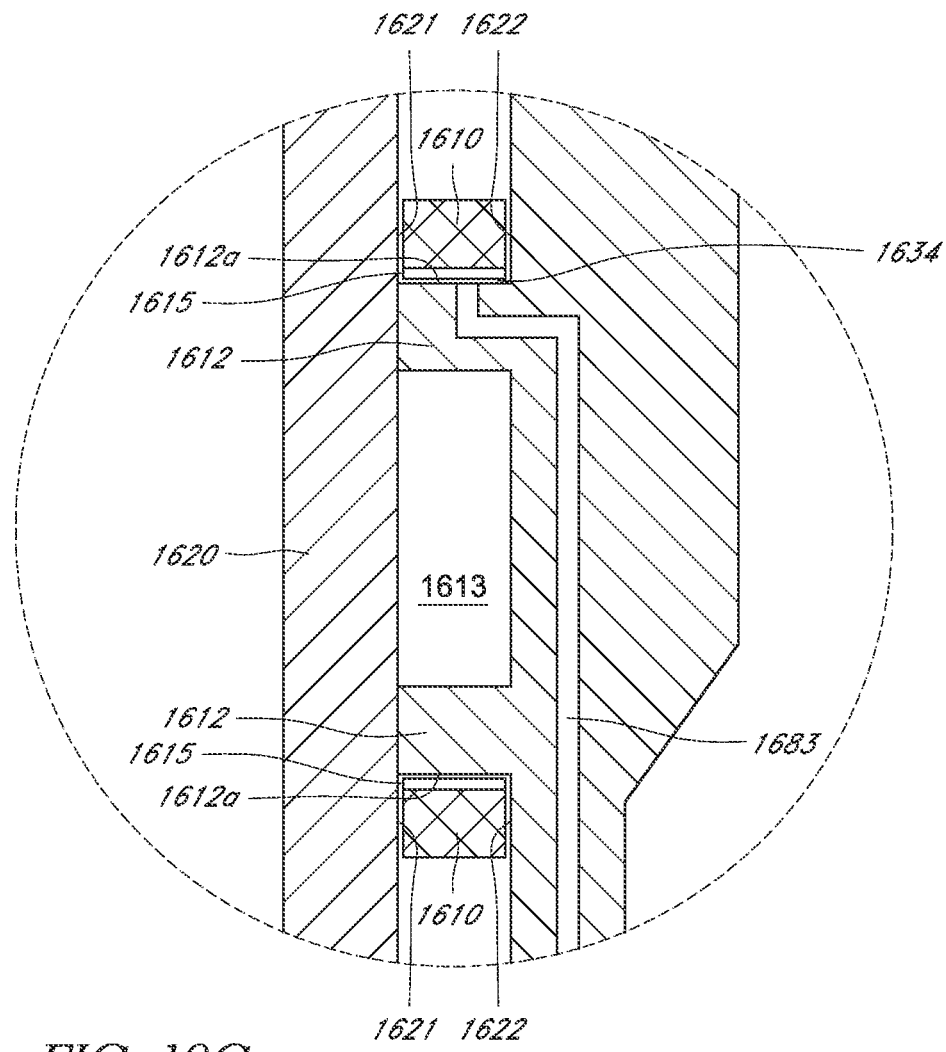
FIG. 19C is a detail view of FIG. 19B.

FIGS. 19A-19C depict a view of engine 1600 comprising a lubrication assembly. In some embodiments, an oil supply line 1683 is fluidly coupled between an oil reservoir 1680 and a lubrication space 1634 located between the exterior surface 1612a and the idler gear 1610. Optionally, the engine 1600 comprises an oil pump (not shown) configured to deliver the oil supply from the reservoir 1680 to the lubrication space 1634. Optionally, the oil supply line 1683 comprises an interior portion that passes through the engine housing wall in a fluid passageway. Optionally, the oil supply line can comprise an exterior portion that passes through an oil tube. Optionally, a return oil line 1682 can be coupled with the bottom of the chamber 1635 and communicatively coupled to the oil reservoir 1680 through a drain 1681. Optionally, the oil pump is located within the oil reservoir 1680. Optionally, the oil supply line 1683 can fluidly couple the chamber 1635 with the lubrication space 1634. Optionally, the oil pump is configured to deliver an oil supply to the lubrication space 1634 from an oil reservoir 1635a within the chamber 1635. Optionally, the oil pump is located within the chamber 1635. Optionally, the oil pump is located exterior to the chamber 1635.

In some embodiments, the chamber member 1620 comprises a top portion 1620a and a bottom portion 1620b. Optionally, the bottom portion 1620b is configured to comprise the oil reservoir 1680 as discussed above. Optionally, both portions 1620a, b are configured to be assembled with the engine 1600. Optionally, the bottom portion 1620b is configured to remain assembled with the engine 1600 when the top portion 1620a is removed from the engine 1600 and thereby the oil reservoir 1680 can remain in place while an operator obtains access to the geartrain by removing the top portion 1620a.

Figure 20A:
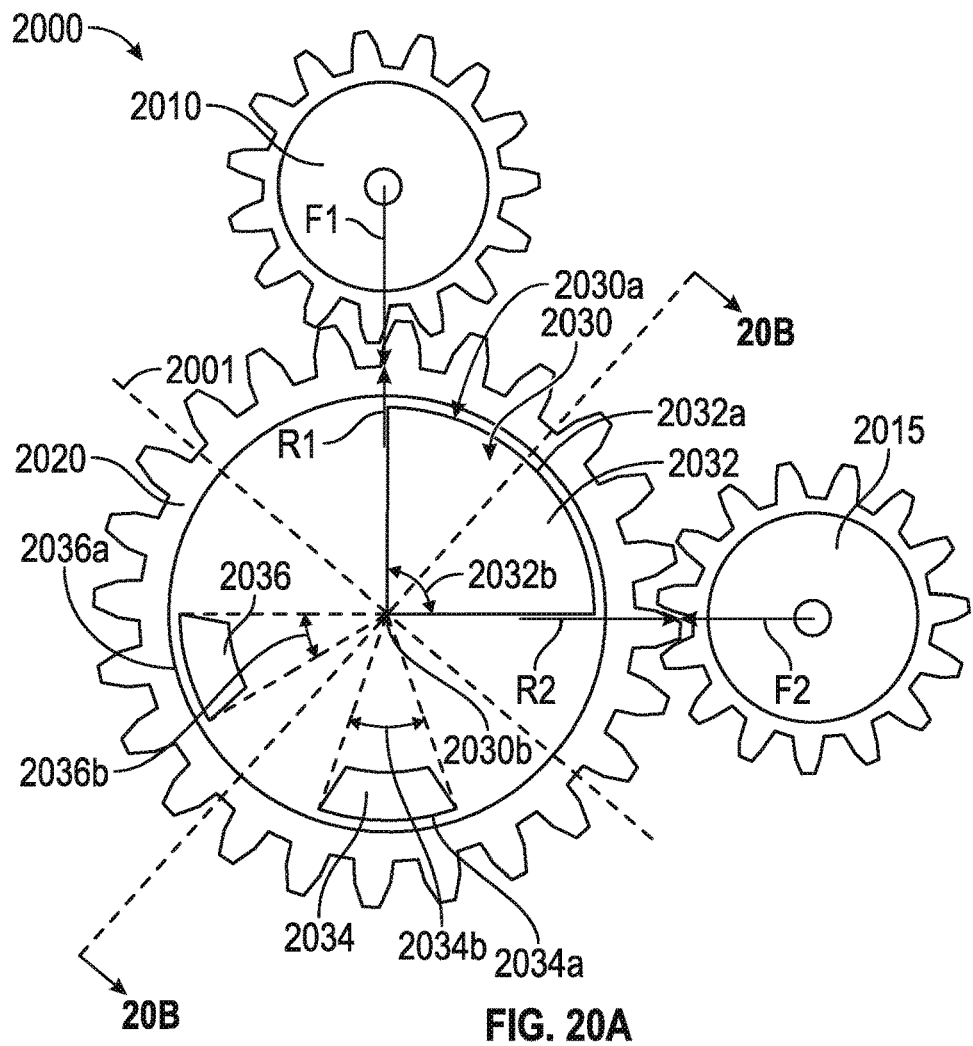
FIG. 20A is a schematic elevational view of an embodiment of a gear drive system including a shaft formed of a shaft segments having segregated arcs to support a rim gear.
Figure 20B:
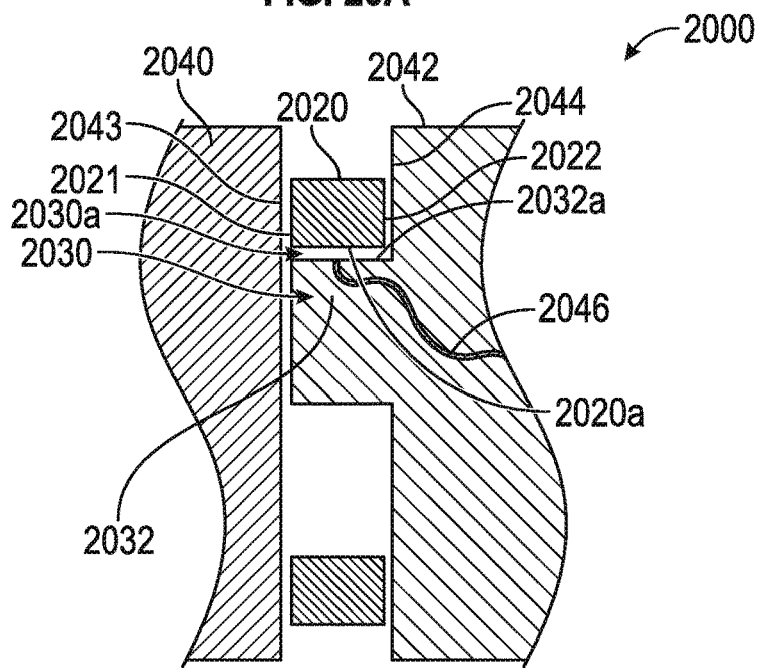
FIG. 20B is a sectional view taken along the line 20B-20B in FIG. 20A.

FIGS. 20A and 20B show a gear drive 2000. The gear drive 2000 can be used in any of the embodiments described above. For example, the gear drive 2000 can be used in the gearboxes 200, 300, 400, 500, the engines 1200, 1300, 1600, or the gear assemblies 1400, 1500. The gear drive 2000 can include a rim gear 2020. The rim gear 2020 can be a gear having a webbing and a hub removed to reduce the total weight of the rim gear such as the rim gears 150, 310, 1210 1310, and 1610 shown in FIGS. 1B, 2A-5A, and 10A-19C and described above. The rim gear 2020 can comprise a plurality of outwardly extending gear teeth supported on a rim. The rim gear 2020 can be a spur gear, helical gear, herringbone gear or other type of gear. The rim of the rim gear 2020 can include an internal mounting surface 2020a (FIG. 20B). The mounting surface 2020a can extend around an inner circumference of the rim of the rim gear 2020.

With continued reference to FIG. 20B, the rim gear 2020 can be positioned between a first wall 2040 and a second wall 2042. A first face 2043 of the first wall 2040 can include a planar surface. The first face 2043 can slidingly engage with a first side 2021 of the rim gear 2020. A second face 2044 of the second wall 2042 can include a planar surface. The second face 2044 can slidingly engage with a second side 2022 of the rim gear 2020. The first and second walls 2040, 2042 can resolve thrust forces on the rim gear 2020 that are exerted on the rim gear 2020 (e.g., by other gears meshed with the rim gear 2020).

The gear drive 2000 can include a shaft 2030. The shaft 2030 can be similar to the shafts 160, 342, 352, 1212, 1312, and 1612 shown in FIGS. 1B, 2A-5A, and 10A-19C and described above. The shaft 2030 can include a bearing surface 2030a. The bearing surface 2030a can be located along an outer circumference of the shaft 2030. The shaft 2030 can be an extension of or mechanically coupled with the second wall 2042.

The shaft 2030 can comprise one or more shaft segments, such as shaft segments 2032, 2034, 2036. The shaft segments 2032, 2034, 2036 can comprise one or more segregated arcs, such as segregated arcs 2032a, 2034a, 2036a. The segregated arcs can each form portions of the discontinuous circumference (e.g. arc lengths) of the bearing surface 2030a of the shaft 2030. The mounting surface 2020a can be rotatably engaged with the bearing surface 2030a (e.g., across each of the segregated arcs). The shaft segments can reduce the overall weight of the shaft 2030 and the friction of the bearing surface 2030a (e.g., compared with fully circumferential bearing surface).

The shaft 2030 can include the first shaft segment 2032. The first shaft segment 2032 can include the first segregated arc 2032a. The first segregated arc 2032a can have a first arc angle 2032b. The arc angle 2032b can be determined based on engineering analysis and/or testing. The engineering analysis and/or testing can be based on a balance of removal of material from the segregated arc 2032a to reduce friction and the resulting stress on the shaft segment 2032 due to forces within the gear drive 2000. The arc angle 2032b can be between 0° and 360°, 5° and 185°, 5° and 95°, 5° and 50°, or 5° and 35°. In certain implementations, the first arc angle 2032b can be approximately 15°, 30°, 45°, 90°, 180°, or 270°. The first shaft segment 2032 can be located on a first side of the shaft 2030 (e.g., between 315° and 135° or on a first side of the line 2001).

The shaft 2030 can include the second shaft segment 2034. The second shaft segment 2034 can include the second segregated arc 2034a. The second segregated arc 2034a can have a second arc angle 2034b. The arc angle 2034b can be determined based on engineering analysis and/or testing. The arc angle 2034b can be between 0° and 360°, 5° and 185°, 5° and 95°, 5° and 50°, or 5° and 35°. In certain implementations, the second arc angle 2034b can be approximately 15°, 30°, 45°, 90°, 180°, or 270°. The second shaft segment 2034 can be located on a second side of the shaft 2030 (e.g., between 135° and 315° or on a second side of the line 2001).

The shaft 2030 can include the third shaft segment 2036. The third shaft segment 2036 can include the third segregated arc 2036a. The third segregated arc 2036a can have a third arc angle 2036b. The arc angle 2036b can be determined based on engineering analysis and/or testing. The arc angle 2036b can be between 0° and 360°, 5° and 185°, 5° and 95°, 5° and 50°, or 5° and 35°. In certain implementations, the third arc angle 2036b can be approximately 15°, 30°, 45°, 90°, 180°, or 270°. The third shaft segment 2036 can be located on the second side of the shaft 2030.

A lubrication line 2046 (similar to the lubrication line 1283a) can extend through the second wall 2042 and/or a portion of the shaft 2030 (e.g., the first shaft segment 2032) to provide lubrication to the bearing surface 2030a (e.g., the first segregated arc 2032a). In other implementations, the gear drive 2000 can include splash lubrication, solid lubricant and/or rollers, as described further below.

The gear drive 2000 can include a first gear 2010 and/or a second gear 2015. The gear teeth of the rim gear 2020 can be meshed with gear teeth of the first gear 2010 and/or the second gear 2015. In the configuration shown, the rim gear 2020 is an idler gear, although other gear drive configurations (e.g., power takeoff shafts) are also contemplated herein. The first gear 2010 can exert a force F1 on the rim gear 2020. The second gear 2015 can exert a force F2 on the rim gear 2020. The shaft 2030 can exert reactionary forces R1 and/or R2 that are equal in magnitude and opposite in direction to the forces F1 and/or F2. Accordingly, the shaft 2030 can include sufficient material to exert the reactionary forces R1 and/or R2 to support the rim gear 2020 without undue deflection. The size of the shaft segments 2032-2036 can depend on the load forces (e.g., F1, F2) exerted on the shaft 2030 and rim gear 2020. The first shaft segment 2032 can extend to a center 2030b of the shaft 2030, although this is not required. The second and third shaft segments 2034, 2036 do not extend all the way to the center point 2030b, although this is not required.

The shaft segment 2032 can be located on the same side of the shaft 2030 as the forces F1, F2. A portion of the first segregated arc 2032a can be aligned with the forces F1 and/or F2. In other implementations, the segregated arc 2032a does not align directly with the forces F1 or F2. In either case, the segregated arc 2032a can exert the reactionary forces R1, R2. The shaft segments 2034, 2036 can be located on the opposite side of the shaft 2030 form the forces F1, F2. The shaft segments 2034, 2036 can stabilize the position of the rim gear 2020 on the shaft 2030. The shaft segments 2034, 2036 may not contribute to the reactionary forces R1, R2. In certain implementations, the second segregated arc 2034a can be aligned at approximately 180° and/or the third segregated arc 2036a can be aligned at approximately 270°. The first segregated arc 2030a can be aligned at approximately 0° and/or 90°.

In certain implementations the forces F1, F2 can also resolve each other. For example, in an in-line gear drive the force F1 can be aligned in a direction opposite to the force F2. Accordingly, the segregated arcs of the shaft 2030 are used to stabilize the position of the rim gear 2020 on the shaft 2030 but not to resolve the forces F1, F2. For example, shaft segments can be located at 45 degrees, 135 degrees, 225 degrees, 315 degrees, while the forces F1, F2 are aligned along 0° and 180°.

Advantageously, the gear drive 2000 reduces the overall weight and manufacturing costs compared with a conventional gear drive. Importantly, the segregated arc lengths of the shaft segments forming the gear shaft 2030 reduce the total friction between the mounting surface 2020a and the bearing surface 2030a. By removing portions of what would be an outer circumference of the bearing shaft 2030 and dividing that into the segregated arcs, 2032a, 2034a, 2036a, the total friction can be reduced. Sufficient material in the shaft 2030 can remain to resolve any forces on the rim gear 2020 at the shaft 2030 (e.g., forces F1 and F2).

Figure 21:
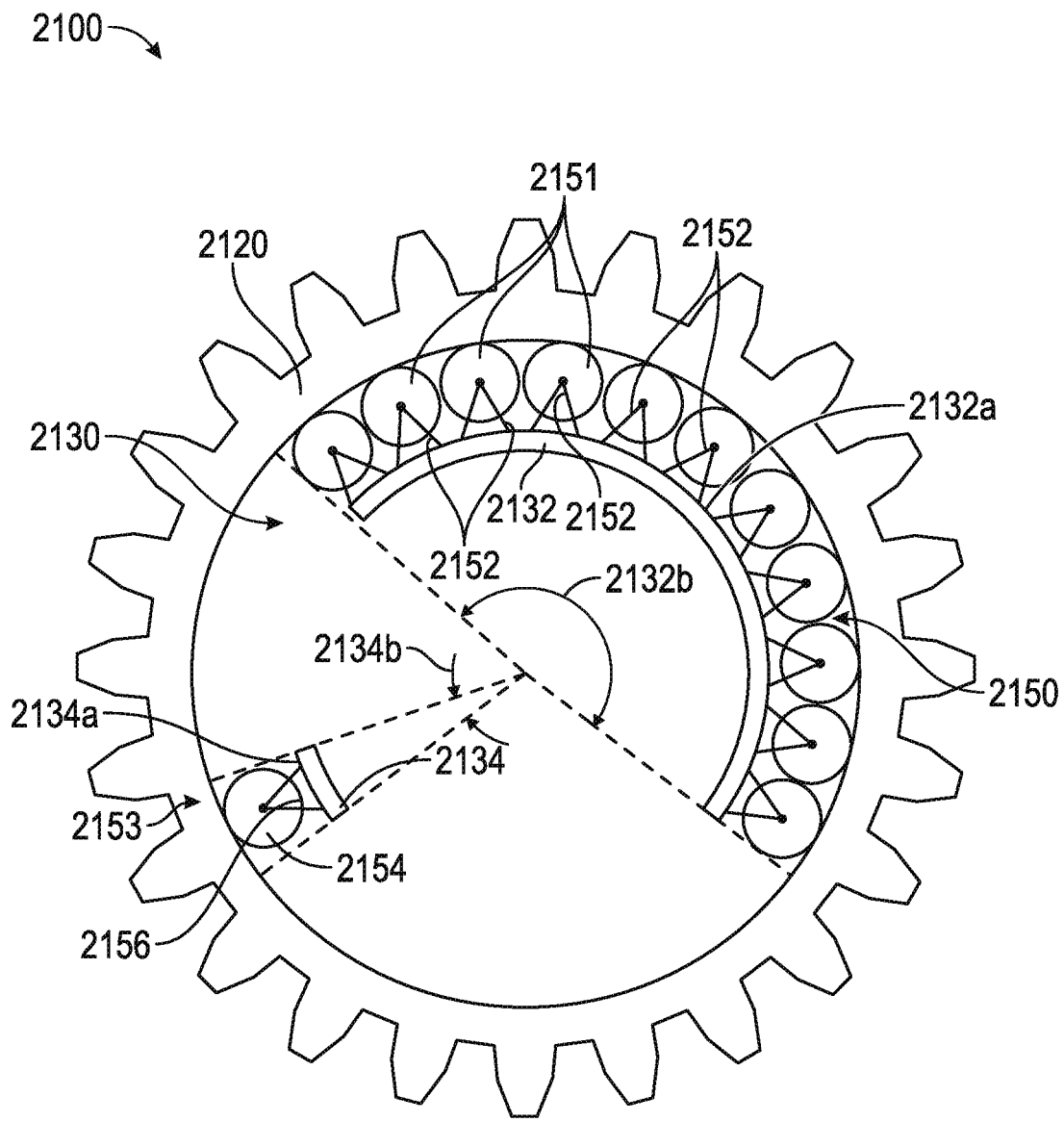
FIG. 21 is a schematic elevational view embodiment of a rim gear mounted on a plurality of rollers.

FIG. 21 shows another embodiment of a gear drive assembly 2100. The gear drive 2100 can be used in any of the embodiments described above. For example, the gear drive 2100 can be used in the gearboxes 200, 300, 400, 500, the engines 1200, 1300, 1600, or the gear assemblies 1400, 1500. The gear drive 2100 can include a rim gear 2120. The rim gear 2120 can be mounted on a shaft 2130. The shaft 2130 can comprise one or more shaft segments have segregated arcs like the shaft 2030. In other implementations, the shaft 2130 is a fully circumferential shaft. The shaft 2130 can include a first shaft segment 2132. The first shaft segment 2132 can include a segregated arc angle 2132a. The segregated arc angle 2132a can have an arc angle 2132b. The shaft 2130 can include a second shaft segment 2134. The second shaft segment 2134 can include a segregated arc angle 2134a. The segregated arc angle 2134a can have an arc angle 2134b. The second shaft segment 2134 can be located on an opposite side of the shaft 2030 form the first shaft segment 2132 to stabilize rotation of the rim gear 2120.

The shaft 2130 can include one or more roller assemblies, such as roller assemblies 2150, 2153. The roller assemblies 2150, 2153 can be mounted between the first and second shaft segments 2132, 2134, respectively, and the rim gear 2120. The roller assemblies 2150 can each comprise a roller 2151. The rollers 2151 can be rotatably mounted on one or more retainers 2152. The retainers 2152 can each comprise axles about which the rollers 2151 are rotatable. The retainers 2152 can comprise a plastic envelope that at least partially encases the rollers 2151. The roller assemblies 2152 can each comprise a roller 2154. The rollers 2154 can be rotatably mounted on one or more retainers 2156.

The roller assemblies 2150, 2153 can attach with the segregated arcs 2132a and/or 2134a (e.g., at the retainer 2152). The rollers 2150, 2153 can be spaced from the segregated arcs 2132a and/or 2134a. The rollers 2150, 2153 can be engaged directly with a mounting surface of the rim gear 2120. The rim gear 2120 can rotate about the shaft 2130 engaged with the roller assemblies 2150, 2153.

Figure 22A:
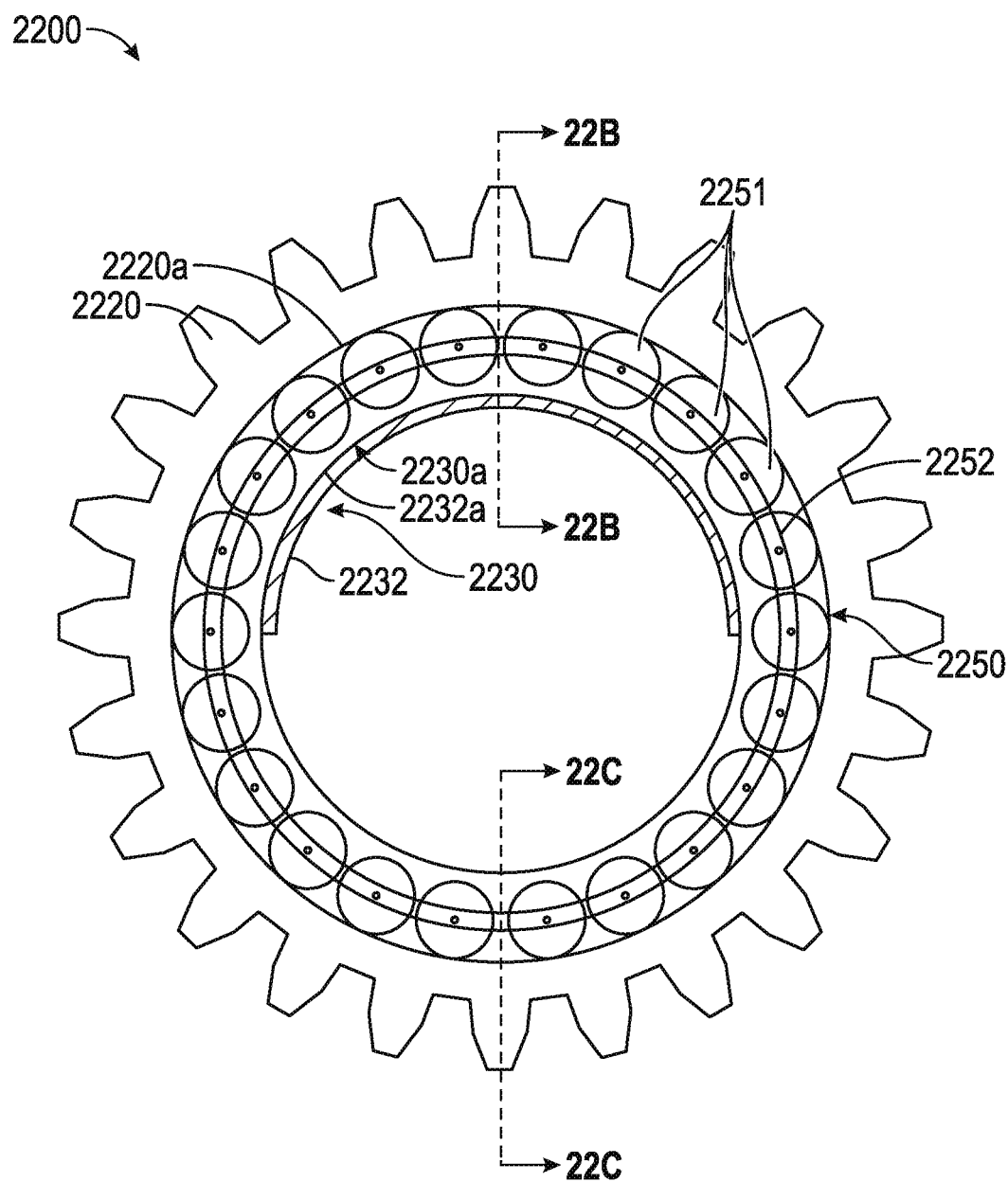
FIG. 22A is a schematic elevational view embodiment of a rim gear mounted on a roller bearing.
Figure 22B:
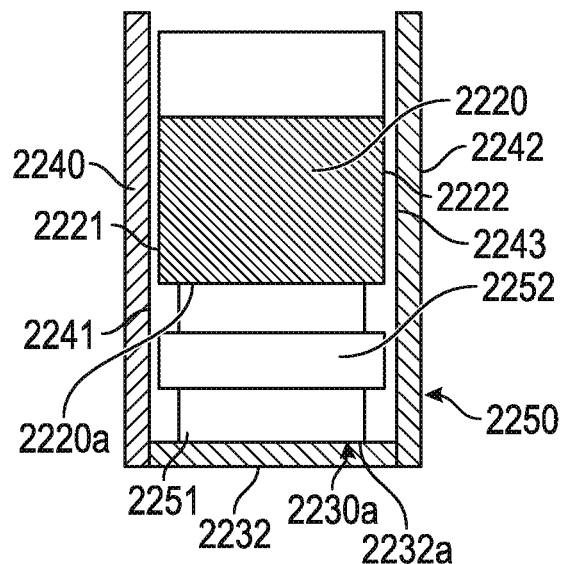
FIG. 22B is a sectional view taken along the line 22B-22B in FIG. 22A.
Figure 22C:
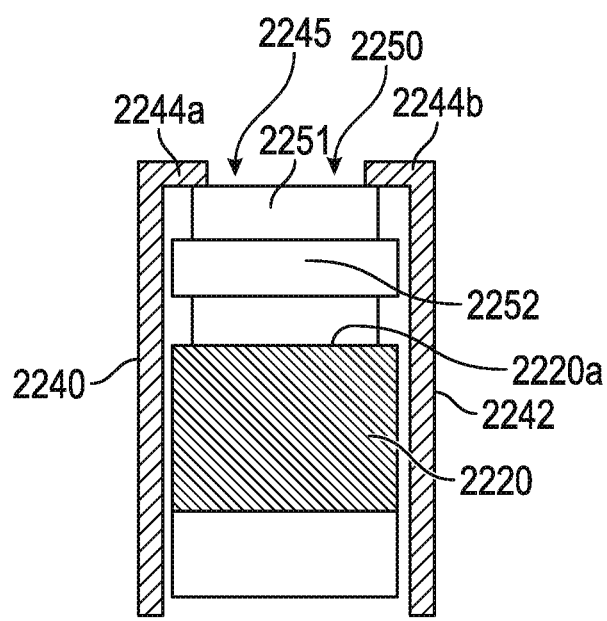
FIG. 22C is a sectional view taken along the line 22C-22C in FIG. 22A.

FIGS. 22A-C show another embodiment of a gear drive assembly 2200. The gear drive 2200 can be used in any of the embodiments described above. For example, the gear drive 2200 can be used in the gearboxes 200, 300, 400, 500, the engines 1200, 1300, 1600, or the gear assemblies 1400, 1500. The gear drive 2200 can include a rim gear 2220 and a gear shaft 2230. The gear shaft 2230 can include a shaft segment 2232. The shaft segment 2232 can include a segregated arc 2232a as a portion of a bearing surface 2230a of the gear shaft 2230. In certain implementations, the gear shaft 2200 can include additional shaft segments and segregated arcs. The rim gear 2220 is rotatably mounted on the gear shaft 2230.

The gear drive 2200 can include a roller bearing 2250. The roller bearing 2250 can comprises a plurality of rollers 2251. The rollers 2251 can be mounted on a retainer 2252. The retainer 2252 can provide spacing between adjacent rollers 2251. The rollers 2251 can be rotatably mounted on the retainer 2252 (e.g., with an axle through each of the roller 2251, although this is not required). The roller bearing 2250 can form an entire circumference. In certain implementations, the rollers 2251 can be mounted between an inner race and an outer race (not shown). The rollers 2251 can be engaged with a mounting surface 2220a of the rim gear 2220. The roller bearing 2250 can be mounted on the gear shaft 2230.

The gear drive 2200 can include first and second walls 2240, 2242. The gear shaft 2230 can be a portion of the first wall 2240 or the second wall 2242. First and second sidewalls 2221, 2222 of the rim gear 2220 can be positioned between inner faces 2241, 2243 of the first and second walls 2240, 2242, respectively. The inner faces 2241, 2243 can comprise planar regions. Sliding engagement between the sidewalls 2221, 2222 and the inner faces 2241, 2243 can position the rim gear 2220 on the gear shaft 2230.

The rim gear 2220 can be rotatably supported by the roller bearing 2250 and the drive shaft 2230. The roller bearing 2250 can engage with the segregated arc 2232a of the bearing surface 2230a on the shaft segment 2232. Rotation of the rollers 2251 across the segregated arc 2232a (or a race mounted on the segregated arc) can produce a friction force opposing rotation of the bearing 2250. Removal of a circumferential portion of the bearing surface 2230a (e.g., on the side of the shaft 2230 opposite the segregated arc 2232a) can reduce overall friction of the moving roller bearing 2250. A circumferential gap 2245 can be located between the first and second walls 2240, 2242 on the side of the shaft 2230 opposite the shaft segment 2230.

The side of the shaft 2230 opposite the shaft segment 2232 can include one or more stabilizing surfaces 2244a, 2244b for positioning the roller bearing 2250. The stabilizing surfaces 22441, 2244b can be flanges extending from one or both of the first and second walls 2240, 2242. The stabilizing surfaces 2244a, 2244b can maintain the roller bearing 2250 on the gear shaft 2230. The races can further provide support and alignment to the portions of the roller bearing 2250 that that are unsupported by the bearing surface 2230a.

Figure 23A:
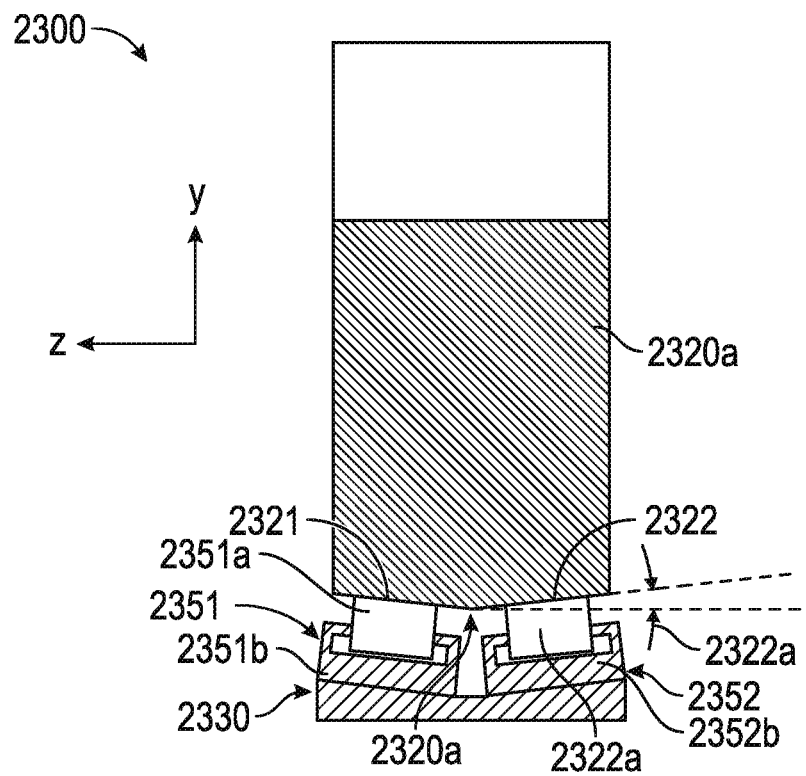
FIG. 23A is a sectional view of another embodiment of a rim gear having a mounting surface with a pair of beveled edges for centering the rim gear on a gear shaft.

FIG. 23A shows another embodiment of a gear drive assembly 2300. The gear drive 2300 can be used in any of the embodiments described above. For example, the gear drive 2300 can be used in the gearboxes 200, 300, 400, 500, the engines 1200, 1300, 1600, or the gear assemblies 1400, 1500. Gear drive 2300 include a rim gear 2320. The rim gear 2320 can have a mounting surface 2320a. The mounting surface 2320a can extend around an inner circumference of the rim gear 2320. The mounting surface 2320a can comprise one or more beveled regions 2321, 2322. Either or both of the beveled regions 2321, 2322 can be at an angle (e.g., angle 2322a) with respect to a z-axis. The z-axis can be aligned along a rotation axis of the rim gear 2320. The angle can be between 0 and 5 degrees. In certain implementations the angle can be approximately 5 degrees. In certain implementations, the rim gear 2320 can be a spur gear.

The assembly 2300 can include a shaft 2330. The shaft 2330 can include one or more roller assemblies 2351, 2352. The roller assembly 2351 can include a plurality of rollers 2351a rotatably mounted on a retainer 2351b. The roller assembly 2352 can include a plurality of rollers 2352a rotatably mounted on a retainer 2352b. The roller assemblies 2351, 2352 can be angled towards each other. The roller assembly 2351 can be engaged with the beveled region 2321 of the mounting surface 2320a The roller assembly 2352 can be engaged with the beveled region 2322 of the mounting surface 2320a. The roller assemblies 2351, 2352 can resolve thrust forces on the rim gear 2320 in the z direction. Accordingly, the roller assemblies 2351, 2352 can locate the rim gear 2320 on the shaft 2330.

Figure 23B:
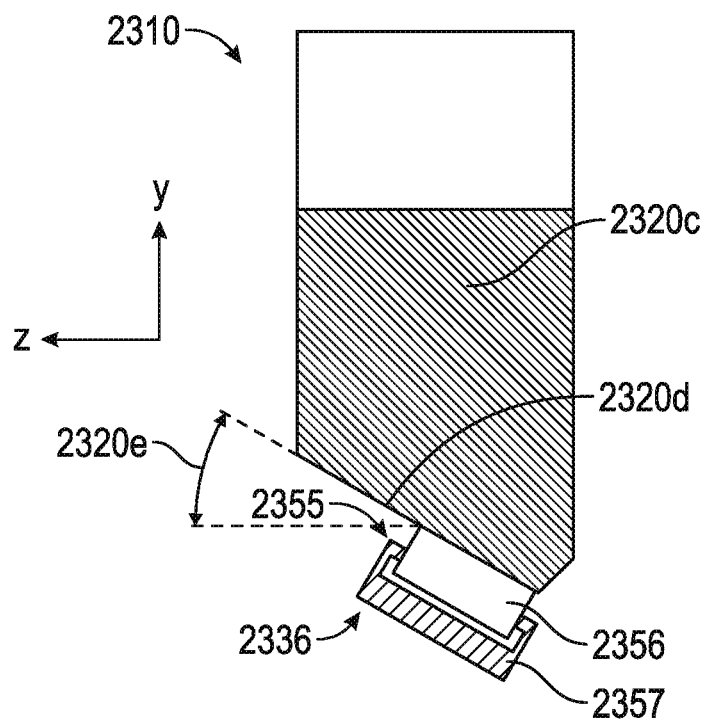
FIG. 23B is a sectional view of a helical rim gear having a mounting surface with a beveled edge.

FIG. 23B shows another embodiment of a gear drive assembly 2310. The gear drive 2310 can be used in any of the embodiments described above. For example, the gear drive 2310 can be used in the gearboxes 200, 300, 400, 500, the engines 1200, 1300, 1600, or the gear assemblies 1400, 1500. Gear drive 2310 include a rim gear 2320a. The rim gear 2320c can have a mounting surface 2320d. The mounting surface 2320d can extend around an inner circumference of the rim gear 2320c. The mounting surface 2320d can be at an angle 2320e with respect to the z-axis. The angle 2320e can be between 0 and 90 degrees. In certain implementations the angle can be between approximately 5 and 45 degrees. In certain implementations, the rim gear 2320c can be a helical gear.

The assembly 2310 can include a shaft 2336. The shaft 2336 can include a roller assembly 2355. The roller assembly 2355 can include a plurality of rollers 2356 rotatably mounted on a retainer 2357. The roller assembly 2355 can be angled towards the mounting surface 2320d. Engagement of the mounting surface 2320d with the roller assembly 2355 can resolve forces on the rim gear 2320 in the z direction (e.g., thrust forces on the rim gear 2320c due to meshing with other gears).

FIGS. 24A-B show a gear drive assembly 2400. The gear drive 2400 can be used in any of the embodiments described above. For example, the gear drive 2400 can be used in the gearboxes 200, 300, 400, 500, the engines 1200, 1300, 1600, or the gear assemblies 1400, 1500. The gear drive 2400 can include a rim gear 2420. The rim gear 2420 can be mounted on a shaft 2430. The shaft 2430 can include one or more shaft segments, such as shaft segment 2432. A roller assembly 2450 comprising a plurality of rollers can be mounted between the shaft 2430 and the rim gear 2420. The rim gear 2420 can be mounted on the roller assembly 2450 and be rotatable with respect to the shaft 2430. In certain implementations, the shaft 2430 comprises additional shaft segments and/or roller assemblies for supporting and stabilizing the rim gear 2420.

The gear drive 2400 includes a first wall 2440 and a second wall 2442. The rim gear 2420 can be located between the first and second walls 2440, 2442. The first wall 2440 can include a first roller assembly 2441. The first roller assembly 2441 can be located between the first wall 2440 and a first sidewall 2421 of the rim gear 2420. The second wall 2442 can include a second roller assembly 2443. The second roller assembly 2443 can be located between the second wall 2442 and a second sidewall 2422 of the rim gear 2420. The roller assemblies 2441, 2443 can allow for some sliding motion between the rollers and the sidewalls 2421, 2422 because of differences in speed of the sidewalls 2421, 2422 at different radii of the rim gear 2420. In certain embodiments, the roller assemblies 2441, 2443 can comprise conical-shaped rollers to accommodate the differences in speed of the sidewalls 2421, 2422 at different radii without sliding. In other implementations the rollers 2441, 2443 can comprise bearings to reduce the total surface area contacting the sides 2421, 2422 and thereby reduce sliding. In certain implementations, multiple roller assemblies can engage the rim gear 2420 at the different radii to accommodate the different speeds and reduce sliding contact.

The roller assemblies 2441, 2443 can reduce friction between the sidewalls 2440, 2442 and the rim gear 2420. The roller assemblies 2441, 2443 can resolve thrust forces on the rim gear 2420 in the z-direction. For example the rim gear 2420 can be a helical gear. The gear drive can include multiple roller assemblies (e.g., roller assembly 2445) located around the circumference of the rim gear 2420 to provide further stability to the rim gear 2420 during rotation. The roller assemblies can be located at different angular positions around the circumference of the rim gear 2420 (e.g. at 0°, 45°, 90°, 135°, 180°, 225°, 270°, 315° and/or 360° or there between).

FIG. 25 shows another embodiment of a gear drive assembly 2500. The gear drive 2500 can be used in any of the embodiments described above. For example, the gear drive 2500 can be used in the gearboxes 200, 300, 400, 500, the engines 1200, 1300, 1600, or the gear assemblies 1400, 1500. The gear drive 2500 can include a rim gear 2520 mounted on a shaft 2530. The rim gear 2520 can include a power shaft 2524. The power shaft 2524 can be a power take-off shaft. The power shaft 2524 can be a solid shaft or a hollow shaft, as illustrated. The power shaft 2524 can be attached with a rim portion of the rim gear 2520 through a web or faceplate 2522. The shaft 2530 can comprise one or more shaft segments. The shaft segments can include segregated arcs. The shaft 2530 can include a first shaft segment 2532 and/or a second shaft segment 2534. The first shaft segment 2532 can include a first roller assembly 2550. The second shaft segment 2534 can include a second roller assembly 2552. A mounting surface 2520a of the rim gear 2520 can be mounted with the first and second shaft segments 2532, 2534 on the roller assemblies 2550, 2552.

The gear drive 2500 can include a first wall 2540. The gear drive 2500 can include a second wall 2542. The first and second walls 2540, 2542 can be located on opposite sides of the rim gear 2520. The power shaft 2524 can extend through an aperture 2540a in the first wall 2540. The first wall 2540 can include a first roller assembly 2541. The first roller assembly 2541 can engage with a first sidewall of the rim gear 2520. The second wall 2542 can include a second roller assembly 2543. The second roller assembly 2543 can engage with a second sidewall of the rim gear 2520. The first and second roller assemblies 2541, 2543 can be positioned at the same circumferential location on the rim gear 2520, although this is not required. The roller assemblies 2541 and/or 2543 can position the rim gear 2520 on the shaft 2530. The roller assemblies 2541 and/or 2543 can support the rim gear 2520 against thrust loads, such as through the power shaft 2524 or other meshed gears.

The first wall 2540 can include a third roller assembly 2545. The third roller assembly 2545 can engage with the first sidewall of the rim gear 2520. The second wall 2540 can include a fourth roller assembly 2547. The fourth roller assembly 2547 can engage with the second sidewall of the rim gear 2520. The third and fourth roller assemblies 2545, 2547 can be positioned at the same circumferential location on the rim gear 2520, although this is not required. The roller assemblies 2545 and/or 2547 can position the rim gear 2520 on the shaft 2530. The roller assemblies 2545 and/or 2547 can support the rim gear 2520 against thrust loads, such as through the power shaft 2524 or other meshed gears.

The gear drive 2500 can include a boss 2531. The boss 2531 can extend from the second wall 2542. The boss 2531 that can engage with an inner side of the faceplate 2522. The boss 2531 can be aligned along an axis of rotation of the rim gear 2520. The boss 2531 can include a bearing 2531a. The bearing 2531a can be positioned adjacent to or in contact with the inner side of the faceplate 2522. The boss 2531 can prevent or mitigate deflection of the faceplate 522 (e.g., due to thrust loads on the shaft 2524). The bearing 2531a can reduce friction between the boss 2531 and the faceplate 2522. In certain implementations, the boss 2531 can be hollow to reduce weight. Similarly, the first wall 2540 can contact a front side of the faceplate 2522. The first wall 2540 can include a flange 2540b. The flange 2540b can prevent or mitigate deflection of the faceplate 2522 (e.g., due to thrust loads on the shaft 2524).

FIG. 26 shows another embodiment of a gear drive assembly 2600. The gear drive 2600 can be used in any of the embodiments described above. For example, the gear drive 2600 can be used in the gearboxes 200, 300, 400, 500, the engines 1200, 1300, 1600, or the gear assemblies 1400, 1500. The gear drive 2600 can include a rim gear 2620 mounted on a shaft 2630. The rim gear 2620 can include a power shaft 2624. The power shaft 2624 can be a power take-off shaft. The power shaft 2624 can be a solid shaft or a hollow shaft, as illustrated. The power shaft 2624 can be attached with a rim portion of the rim gear 2620 through a faceplate 2622.

The shaft 2630 can comprise one or more shaft segments. The shaft segments can include segregated arcs. The shaft 2630 can include a first shaft segment 2632 and/or a second shaft segment 2634. The first shaft segment 2632 can include a first roller assembly 2650. The second shaft segment 2634 can include a second roller assembly 2652.

The rim gear 2620 can be a helical gear. A mounting surface 2620a of the rim gear 2620 can be an angled surface, with respect to an axis of rotation of the rim gear 2620. For example, the mounting surface 2620a can be at an angle of approximately 45°. The rim gear 2620 can be mounted on the shaft 2624. The mounting surface 2620a can engage with the first and second shaft segments 2632, 2634 through the roller assemblies 2650, 2652. The angled mounting surface 2620a interfaced with the roller assemblies 2650, 2653 and/or an angled bearing surface of the shaft 2630 can support thrust loads on the power shaft 2624.

The gear drive 2600 can include a first wall 2640. The gear drive 2600 can include a second wall 2642. The first and second walls 2640, 2642 can be located on opposite sides of the rim gear 2620. The shaft 2624 can extend through an aperture 2640a in the first wall 2640. The first wall 2640 can include a first roller assembly 2641. The first roller assembly 2641 can engage with a first sidewall of the rim gear 2620. The first wall 2640 can include a second roller assembly 2642. The second roller assembly 2642 can engage with the first sidewall of the rim gear 2620. The first and second roller assemblies 2641, 2642 can be positioned at different circumferential location on the rim gear 2620. The first and second roller assemblies 2641, 2642 can position the rim gear 2620 on the shaft 2630.

The gear drive 2600 can include a boss 2631. The boss 2631 can extend from the second wall 2642. The boss 2631 that can engage with an inner side of the faceplate 2622. The boss 2631 can be aligned along an axis of rotation of the rim gear 2620. The boss 2631 can include a bearing 2631a. The bearing 2631a can be positioned adjacent to or in contact with the inner side of the faceplate 2622. The boss 2631 can prevent or mitigate deflection of the faceplate 522 (e.g., due to thrust loads on the shaft 2624). The bearing 2631a can reduce friction between the boss 2631 and the faceplate 2622. In certain implementations, the boss 2631 can be hollow to reduce weight. Similarly, the first wall 2640 can contact a front side of the faceplate 2622. The first wall 2640 can include a flange 2640b. The flange 2640b can prevent or mitigate deflection of the faceplate 2622 (e.g., due to thrust loads on the shaft 2624).

FIGS. 27A-B show another embodiment of a gear drive assembly 2700. The gear drive 2700 can be used in any of the embodiments described above. For example, the gear drive 2700 can be used in the gearboxes 200, 300, 400, 500, the engines 1200, 1300, 1600, or the gear assemblies 1400, 1500. In certain implementations, the gear drive 2700 can be used in low-speed gear drives and/or gearboxes comprising plastic components. The gear drive 2700 can include a rim gear 2770 rotatably mounted on a shaft 2730. The shaft 2730 can include one or more shaft segments, such as first and second shaft segments 2732, 2734. The first shaft segment 2732 can include a segregated arc 2732a. The second shaft segment 2734 can include a segregated arc 2734a.

The gear drive 2700 can include a solid lubricant 2770. The solid lubricant 2770 can be located between a mounting surface 2720a of the rim gear 2720 and the segregated arc 2732a of the first shaft segment 2732. The gear drive 2700 can include a solid lubricant 2772. The solid lubricant 2772 can be located between the mounting surface 2720a of the rim gear 2720 and the segregated arc 2734a of the second shaft segment 2734. The solid lubricants 2770, 2772 can comprise a polymer layer (e.g., nylon), self-lubricated bushing, an oil-based lubricant, one or more surface coatings or dry lubricant coatings (e.g., TEFLON®, tungsten disulfide, molybdenum disulfide, XYLAN®, nicklon) or other solid lubricant material.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A gear drive comprising:
    a first wall and a second wall spaced from the first wall and defining a gear drive space between the first and second walls;
    a first gear shaft having a bearing surface and extending from one of the first wall and the second wall into the gear drive space; and
    a first rim gear comprising a rim with outward-facing gear teeth extending therefrom, a mounting surface of the rim rotatably mounted on the bearing surface of the first gear shaft, wherein the first and second walls position the first rim gear on the first gear shaft;
    wherein the first gear shaft comprises a first shaft segment having a first segregated arc, the first segregated arc forming a first circumferential portion of the bearing surface of the first gear shaft.

2. The gear drive of claim 1, wherein the first segregated arc has an arc length greater than 0 degrees and up to 90 degrees.

3. The gear drive of claim 1, further comprising:
    a second shaft extending into the gear drive space between the first and second walls;
    a second gear mounted on a second shaft and comprising a plurality of gear teeth engaged with the outward-facing gear teeth of the first rim gear;
    wherein the second gear exerts a first force on the first rim gear and the first gear shaft exerts a first reactionary force on the first rim gear corresponding to the first force, the first force aligned with the first shaft segment.

4. The gear drive of claim 3, wherein the first shaft segment exerts the first reactionary force.

5. The gear drive of claim 3, wherein the first gear shaft comprises a second shaft segment having a second segregated arc, the second segregated arc forming a second circumferential portion of the bearing surface of the first gear shaft.

6. The gear drive of claim 5, wherein the second shaft segment is located on an opposite side of the first gear shaft from the first shaft segment to stabilize rotation of the first rim gear.

7. The gear drive of claim 5, wherein the second shaft segment has an arc length of less than 60 degrees.

8. The gear drive of claim 5, wherein the first gear shaft comprises a third shaft segment having a third segregated arc, the third segregated arc forming a third circumferential portion of the bearing surface of the first gear shaft.

9. The gear drive of claim 1, wherein the first gear shaft comprises an internal lubrication line for delivering a lubricant to the bearing surface of the first gear shaft.

10. The gear drive of claim 1, wherein the bearing surface of the first gear shaft comprises a solid lubricant.

11. The gear drive of claim 10, wherein the solid lubricant comprises at least one of Teflon and lubricated nylon.

12. A gear drive comprising:
a first wall and a second wall spaced from the first wall;
a first gear shaft extending from one of the first wall and the second wall;
a first rim gear having a rim rotatably mounted on the first gear shaft, the rim comprising outward-facing gear teeth extending therefrom and a mounting surface, wherein the first and second walls position the first rim gear on the first gear shaft; and
a plurality of rollers mounted on the first gear shaft, the plurality of rollers engaged with the mounting surface of the first rim gear.

13. The gear drive of claim 12, wherein the first gear shaft comprises a first shaft segment having a first segregated arc, at least one of the plurality of rollers mounted on the first segregated arc.

14. The gear drive of claim 13, wherein the first gear shaft comprises a second shaft segment having a second segregated arc, at least one of the plurality of rollers mounted on the second segregated arc.

15. The gear drive of claim 14, wherein the second shaft segment is located on an opposite side of the first gear shaft from the first shaft segment to stabilize rotation of the first rim gear.

16. The gear drive of claim 12, wherein the plurality of rollers are arranged into a roller bearing.

17. The gear drive of claim 16, wherein the first gear shaft comprises a first shaft segment having a first segregated arc, the roller bearing mounted on the first segregated arc.

18. The gear drive of claim 17, wherein the first shaft segment is a first side of the first gear shaft and an opposite side of the first gear shaft from the first side includes a reduced-bearing surface to reduce friction between the roller bearing the opposite side of the first gear shaft.

19. The gear drive of claim 12, wherein the mounting surface includes a first beveled surface engaged with at least one of the plurality of rollers.

20. The gear drive of claim 19, wherein the mounting surface further includes a second beveled surface, the first and second beveled surfaces configured to maintain the first rim gear on the first gear shaft.

21. The gear drive of claim 19, wherein the first rim gear is a helical gear and the first beveled surface is engaged with at least one of the plurality of rollers.

22. The gear drive of claim 12, wherein the first gear shaft is a power takeoff shaft fixed to a faceplate and coupled with the rim.

23. The gear drive of claim 12, wherein the first wall comprises a first side roller engaged with a first sidewall of the rim.

24. The gear drive of claim 23, wherein the second wall comprises a second side roller engaged with a second sidewall of the rim, the first and second side rollers configured to position the first rim gear on the first gear shaft.

* * * * *